US012422081B2

(12) United States Patent
Horikawa et al.

(10) Patent No.: US 12,422,081 B2
(45) Date of Patent: Sep. 23, 2025

(54) BRANCH PIPE FORMING APPARATUS, LID DOUBLING AS VALVE ELEMENT, BRANCH PIPE FORMING APPARATUS WITH LID DOUBLING AS VALVE ELEMENT, AND BRANCH PIPE FORMATION METHOD

(71) Applicant: WATERWORKS TECHNOLOGY DEVELOPMENT ORGANIZATION CO., LTD., Osaka (JP)

(72) Inventors: Gou Horikawa, Osaka (JP); Daisuke Kuwagaki, Osaka (JP)

(73) Assignee: WATERWORKS TECHNOLOGY DEVELOPMENT ORGANIZATION CO., LTD., Osaka (JP)

( * ) Notice: Subject to any disclaimer, the term of this patent is extended or adjusted under 35 U.S.C. 154(b) by 175 days.

(21) Appl. No.: 17/921,386

(22) PCT Filed: Apr. 27, 2021

(86) PCT No.: PCT/JP2021/016746
§ 371 (c)(1),
(2) Date: Oct. 26, 2022

(87) PCT Pub. No.: WO2021/221045
PCT Pub. Date: Nov. 4, 2021

(65) Prior Publication Data
US 2023/0194030 A1    Jun. 22, 2023

(30) Foreign Application Priority Data

Apr. 28, 2020  (JP) .................................. 2020-079115
Oct. 14, 2020  (JP) .................................. 2020-173127

(51) Int. Cl.
*F16L 41/06*   (2006.01)
*F16L 41/02*   (2006.01)
*F16L 41/16*   (2006.01)

(52) U.S. Cl.
CPC ............. *F16L 41/021* (2013.01); *F16L 41/06* (2013.01); *F16L 41/16* (2013.01)

(58) Field of Classification Search
CPC ............ F16L 41/04; F16L 41/06; F16L 41/16
See application file for complete search history.

(56) References Cited

U.S. PATENT DOCUMENTS 4,415,000 A * 11/1983 Odmann ................. F16L 41/06
285/197
4,730,636 A * 3/1988 Volgstadt ................ F16L 41/06
137/315.36
(Continued)

FOREIGN PATENT DOCUMENTS

CN   209466345 U   10/2019
JP   1977-142288 U  10/1977
(Continued)

OTHER PUBLICATIONS

English translation of JPS60201808A (Year: 1985).*
(Continued)

*Primary Examiner* — Zachary T Dragicevich
*Assistant Examiner* — Fannie Kee
(74) *Attorney, Agent, or Firm* — Dilworth & Barrese, LLP.; Michael J. Musella, Esq.

(57) ABSTRACT

The branch pipe forming apparatus 100 includes a first split member 3 and a second split member 4, which include split surfaces 3a and 4a along a plane including an axial center X of the existing pipe W and an axial center Y of a branch pipe 2, and which are connected to each other in a sealed state by a fastening member B. An axial center Z of a tube part 31 is located closer to the branch pipe 2 than to the outer circumferential surface of an existing pipe W in a cutter accommodation space Sp. The first split member 3 and the second split member 4 are coupled to each other at respective coupling portions with respective coupling openings
(Continued)

opposite to each other across the drilled hole Wa and the cutter accommodation space Sp and holding therebetween an end portion 2A of the branch pipe 2 in a sealed state.

5 Claims, 36 Drawing Sheets

(56) References Cited

U.S. PATENT DOCUMENTS

| | | | | |
|---|---|---|---|---|
| 5,924,436 | A * | 7/1999 | Kitani | F16L 41/04 408/110 |
| 6,776,184 | B1 * | 8/2004 | Maichel | F16L 41/06 251/327 |
| 7,104,572 | B1 * | 9/2006 | Kane | F16L 41/06 285/411 |
| 2004/0222399 | A1 * | 11/2004 | Maichel | F16L 41/06 251/326 |
| 2005/0287327 | A1 | 12/2005 | Ishikawa et al. | |
| 2009/0065070 | A1 * | 3/2009 | Jaehyun | F16L 41/06 137/318 |
| 2012/0192962 | A1 | 8/2012 | Asai | |
| 2012/0312391 | A1 * | 12/2012 | Moran | F16L 41/06 29/890.11 |
| 2013/0000749 | A1 * | 1/2013 | Sato | F16L 41/06 137/318 |
| 2016/0281897 | A1 * | 9/2016 | Yoneda | F16L 41/06 |
| 2021/0123553 | A1 * | 4/2021 | Kuwagaki | F16L 41/06 |

FOREIGN PATENT DOCUMENTS

| | | | |
|---|---|---|---|
| JP | 60-201808 | A | 10/1985 |
| JP | 1987-022391 | U | 2/1987 |
| JP | 1988-94611 | U | 6/1988 |
| JP | 1988-175391 | U | 11/1988 |
| JP | 1993-41611 | U | 6/1993 |
| JP | 6-174185 | A | 6/1994 |
| JP | 6-265087 | A | 9/1994 |
| JP | 7-37605 | U | 7/1995 |
| JP | 7-190274 | A | 7/1995 |
| JP | 2000-120889 | A | 4/2000 |
| JP | 2003-236715 | A | 8/2003 |
| JP | 2006-010047 | A | 1/2006 |
| JP | 2006-283945 | A | 10/2006 |
| JP | 2011-038584 | A | 2/2011 |
| JP | 2013-170641 | A | 9/2013 |
| JP | 2018-123963 | A | 8/2018 |
| JP | 2019-95038 | A | 6/2019 |
| WO | WO-2007135873 | A1 * | 11/2007 ............. F16L 41/06 |

OTHER PUBLICATIONS

English translation of JPH07190274A (Year: 1995).*
Search Report issued Jun. 24, 2024 in European appln. No. 21797067.2.
Office Action issued on Nov. 7, 2024 from corresponding Chinese Application.

* cited by examiner

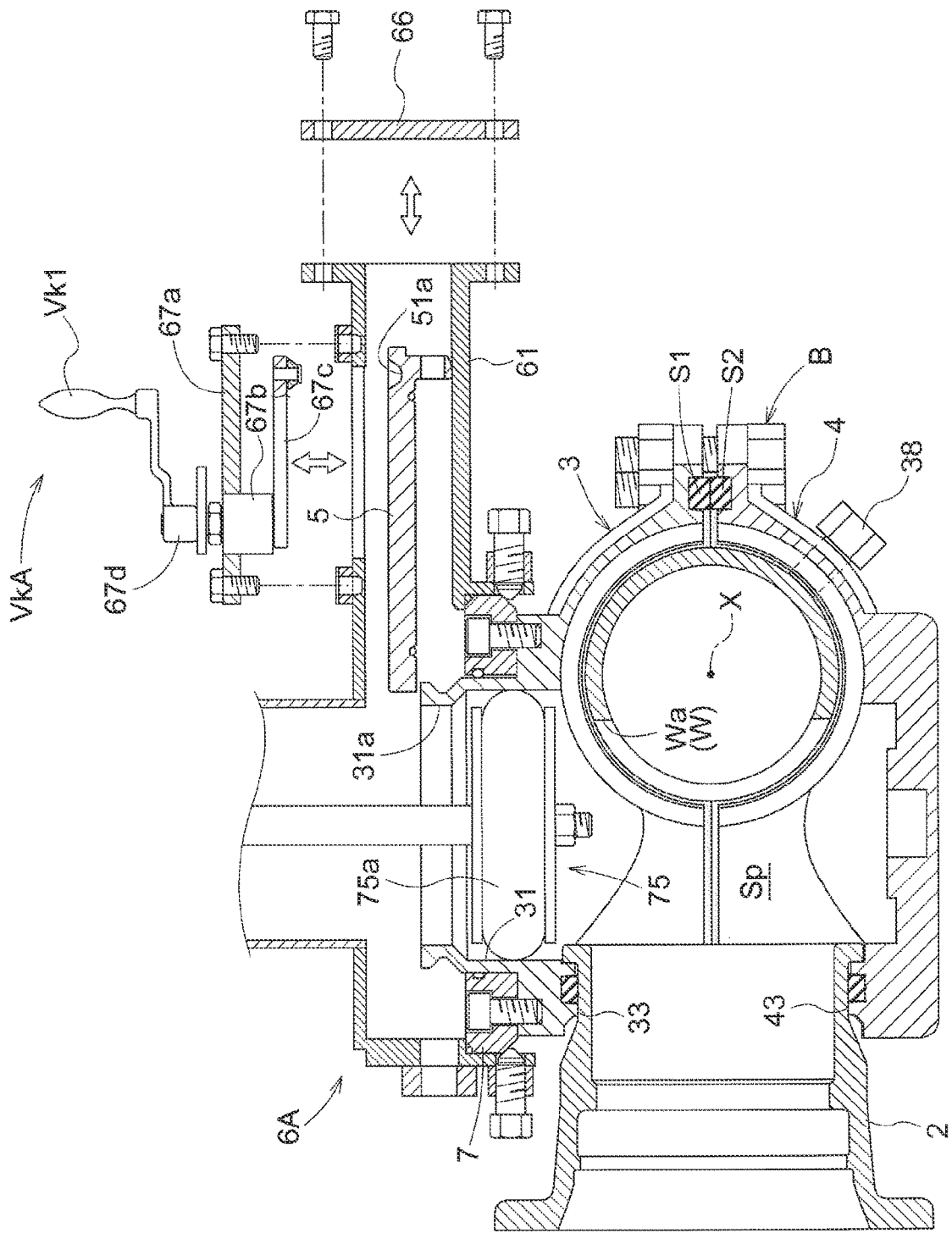

BRANCH PIPE FORMING APPARATUS, LID DOUBLING AS VALVE ELEMENT, BRANCH PIPE FORMING APPARATUS WITH LID DOUBLING AS VALVE ELEMENT, AND BRANCH PIPE FORMATION METHOD

TECHNICAL FIELD

The present invention relates to a branch pipe forming apparatus fitted on an existing pipe in order to form a branch pipe communicating with a drilled hole formed by drilling a part of an outer circumferential surface of the existing pipe in an uninterrupted flow state by using a drilling machine, and a branch pipe formation method.

BACKGROUND ART

The branch pipe forming apparatus is used when, for example, a water pipe (existing pipe) in an existing aging facility is replaced with a new water pipe in the uninterrupted flow state. The branch pipe formation method is the following method. The branch pipe forming apparatus is disposed in a water-tight state on an outer periphery of the existing water pipe, and a connection pipe formed integrally with the branch pipe forming apparatus is connected to a branch pipe. Subsequently, a cutter of a drilling machine is inserted into a cutter accommodation space disposed in the branch pipe forming apparatus, and a drilled hole is formed by drilling (half-cutting) a part of an outer circumferential surface of the existing water pipe, and a flow path can be switched upon communication between the drilled hole and the branch pipe. Then, an aging segment of the existing water pipe can be replaced with the branch pipe (new water pipe) by removing the existing pipe between two branch pipe forming apparatuses disposed on the existing water pipe.

A branch pipe forming apparatus discussed in Patent Literature 1 (referred to as a connection case in the literature) is formed by welding joint of half-split members split in a direction perpendicular to a plane including an axial center of an existing pipe and an axial center of a branch pipe. Both flanges of a connection pipe integrally formed with the connection case (referred to as a tube part in the literature) and the branch pipe are fixed with bolts and nuts. A valve device (a tube case in the literature) is flangedly connected to the connection case, and a work case (bottomed case in the literature) is flangedly connected to the work case. The work case is used as a case of a lid insertion device for closing a drilling machine and the connection case after drilling. A tubular guide tube (holding member in the literature) by which a center drill of the drilling machine is inserted and guided is fixed to a cutter accommodation space of the connection case by a bolt screwed from below into a bottom wall of the connection case.

Patent Literature 2 discloses a valve device that also serves as a conventional lid insertion device.

The valve device discussed in Patent Literature 2 includes a lid doubling as a valve element which lid serves as a valve to block a flow path of pipeline (branch tube part in the literature), and which also serves as a closing lid to close the pipeline. The lid doubling as the valve element is fixed as the closing lid by carrying out the following operations including: inserting a bolt from below into a through hole of a flange of the branch pipe part; inserting a nut from above with respect to an insertion hole of a top plate of a housing body of the valve device; and screwing the bolt and the nut.

CITATION LIST

Patent Literature

Patent Literature 1
Japanese Unexamined Patent Application Publication, Tokukai, No. 60-201808.
Patent Literature 2
Japanese Unexamined Patent Application Publication, Tokukai, No. 2018-123963.

SUMMARY OF INVENTION

Technical Problem

Operating efficiency may decrease because the half-split members of the branch pipe forming apparatus discussed in Patent Literature 1 are joined together by welding. Additionally, because bending force and tensile force are applied due to an earthquake or the like to the branch pipe connected to the branch pipe forming apparatus, water leakage can occur from a flangedly connected portion between the connection pipe of the connection case and the branch pipe, and welded portion of the half-split members.

Further, operating efficiency may decrease if the lid to close the connection case is attached by a lid insertion device as in the branch pipe forming apparatus discussed in patent Literature 1. Although the lid insertion device is omittable in the valve device discussed in Patent Literature 2, it is necessary to screw the nut by inserting the nut from above with respect to the insertion hole of the top plate of the housing body in a state where the bolt is inserted in the through hole of the flange of the branch pipe part. A screwing operation is time consuming, and there is still room for improvement in terms of higher operating efficiency.

Hence there remains a desire for a branch pipe forming apparatus, a lid doubling as a valve element, a branch pipe forming apparatus with the lid doubling as the valve element, and a branch pipe formation method, each of which contributes to high operating efficiency.

Solution to Problem

A branch pipe forming apparatus of the present invention has the following characteristic configurations. The branch pipe forming apparatus is configured to be fitted on an existing pipe in order to form a branch pipe communicating with a drilled hole formed by drilling a part of an outer circumferential surface of the existing pipe in an uninterrupted flow state. The branch pipe forming apparatus includes a first split member and a second split member which include split surfaces along a plane including an axial center of the existing pipe and an axial center of the branch pipe, and which are connected to each other in a sealed state by a fastening member. The first split member includes a tube part with an opening to permit passage of a cutter of the drilling machine. A cutter accommodation space is formed between the first split member and the second split member, the cutter accommodation space capable of accommodating the cutter at a position adjacent to the drilled hole formed along a direction perpendicular to the plane. An axial center of the tube part is located closer to the branch pipe than to the outer circumferential surface of the existing pipe in the cutter accommodation space. The first split member and the second split member are coupled to each other at respective coupling portions with respective coupling openings opposite to each other across the drilled hole and the cutter accommodation space and holding therebetween an end portion of the branch pipe in a sealed state.

With this configuration, the first split member and the second split member constituting the branch pipe forming apparatus are connected to each other in the sealed state by the split surfaces along the plane including the axial center of the existing pipe and the axial center of the branch pipe. It is therefore possible to fit the first split member onto the second split member, for example, in a state where the second split member is arranged on a lower side in a vertical direction. Consequently, the cutter accommodation space inside the second split member is observable, and the first split member can be connected to the second split member by operating the fastening member from above. This makes it possible to enhance operating efficiency when replacing the existing pipe.

Additionally, the end portion of the branch pipe is held in the sealed state at the coupling openings in the first split member and the second split member. Hence, even if a bending force and a tensile force are exerted on the branch pipe due to an earthquake or the like, the branch pipe becomes flexibly movable slightly, thereby reducing load exerted on the coupling openings. Furthermore, the tube part with the opening that permits passage of the cutter is formed in the first split member, and the split surfaces (connection surfaces) of both split members extend along the plane including the axial center of the existing pipe and the axial center of the branch pipe. Therefore, as compared to cases where the split surfaces (connection surfaces) are perpendicular to the plane, vibration of the drilling machine does not directly act on the split surfaces, resulting in less shaft misalignment of the cutter in a drilling operation. Because the axial center of the tube part is located closer to the branch pipe than to the outer circumferential surface of the existing pipe in the cutter accommodation space, the drilled hole drilled by the cutter occupies a sectional region that is less than half of the existing pipe, thus making it possible to maintain strength of the existing pipe. These contribute to providing the branch pipe forming apparatus having high operating efficiency and excellent earthquake resistance.

As other characteristic configuration, the cutter having a smaller diameter than an outer diameter of the existing pipe is accommodated in the cutter accommodation space.

With this configuration, the cutter accommodation space can be made smaller, so that the branch pipe forming apparatus can be downsized.

As other characteristic configuration, the apparatus further includes a tubular guide tube to guide a center drill of the drilling machine internally inserted into the guide tube. The guide tube is extended from the second split member to a side closer to the opening than the split surfaces.

If the guide tube extends closer to the opening that permits passage of the cutter than the split surfaces as in this embodiment, the center drill can be surely guided to eliminate the shaft misalignment of the cutter, thereby precisely forming the drilled hole.

As other characteristic configuration, the apparatus further includes a tubular guide tube to guide a center drill of the drilling machine internally inserted into the guide tube. An axial center of the guide tube is perpendicular to the split surfaces.

With this embodiment where the axial center of the guide tube is perpendicular to the split surfaces, the vibration of the drilling machine is less likely to directly act on the split surfaces, resulting in less shaft misalignment of the cutter in a drilling operation.

As other characteristic configuration, the apparatus further includes a tubular guide tube to guide a center drill of the drilling machine internally inserted into the guide tube, and a flat plate member mounted on a bottom part of the second split member and connected to the guide tube. The bottom part of the second split member includes an accommodating recess to accommodate the flat plate member, and an engaging recess or engaging protrusion which is disposed at a central portion of the accommodating recess and with which an end portion of the guide tube is engaged.

With this embodiment where the second split member includes the accommodating recess to accommodate the flat plate member, and an engaging recess or engaging protrusion which is disposed at a central portion of the accommodating recess and with which the end portion of the guide tube is engaged, positioning of the guide tube is easy, and the shaft misalignment of the cutter can be eliminated to precisely form the drilled hole. Additionally, because the end portion of the guide tube is engaged by the accommodating recess disposed in the second split member, it is unnecessary to fix the guide tube by screwing the bolt from below the second split member, thus leading to high operating efficiency.

As other characteristic configuration, the flat plate member is configured with a plurality of split plates.

With this embodiment where the flat plate member is configured with the split plates, the split plates can be sequentially set while observing the cutter accommodation space in a state where the second split member is set on the lower side in the vertical direction, thereby improving operating efficiency.

As other characteristic configuration, an annular protrusion protruding toward the drilled hole is formed on an outer edge portion of the flat plate member.

With this embodiment where the annular protrusion protruding toward the drilled hole is disposed on the outer edge portion of the flat plate member, chips generated in forming the drilled hole in the existing pipe can be accommodated in an internal space of the annular protrusion, thereby preventing the chips from flowing in the existing pipe and the branch pipe. Further, manufacturing costs can be reduced by only adding the annular protrusion on the outer edge portion of the flat plate member.

As other characteristic configuration, a protrusion protruding radially outward and connected to the flat plate member is formed at an end portion of the guide tube. The protrusion accommodates therein an engaging member engageable with an annular recess formed on an outer circumference surface of the center drill, and an urging member to urge the engaging member radially inward toward the annular recess.

With this embodiment where the engaging member and the urging member are disposed in the interior of the protrusion for connecting the flat plate member and the guide tube, when the drilling machine is removed with the engaging member engaged with the center drill, the guide tube and the flat plate member can also be removed at the same time. Further, because the engaging member and the urging member are accommodated in the interior of the protrusion, a shaft length of the guide tube can be reduced to downsize the branch pipe forming apparatus.

As other characteristic configuration, the engaging member includes a tapered surface abuttable against a tip of the center drill, and the tip of the center drill abuts against the tapered surface, so that the engaging member moves radially outward against an urging force of the urging member.

With this embodiment where the engaging member includes the tapered surface, the guide tube and the flat plate member can be engaged with the drilling machine by only inserting the center drill into the guide tube, thereby enhancing operating efficiency.

As other characteristic configuration, a bolt configured to abut against a lower side in a vertical direction on the outer circumferential surface of the existing pipe is screwed in the guide tube.

With this embodiment where the bolt configured to abut against the lower side in the vertical direction on the outer circumferential surface of the existing pipe is screwed in the guide tube, an attitude of the guide tube can be stabilized even under vibration of the drilling machine, thereby surely preventing the shaft misalignment of the cutter.

A branch pipe forming apparatus of the present invention has the following characteristic configurations. The branch pipe forming apparatus is configured to be fitted on an existing pipe in order to form a branch pipe communicating with a drilled hole formed by drilling a part of an outer circumferential surface of the existing pipe in an uninterrupted flow state. The apparatus includes a first split member and a second split member connected to each other in a sealed state by a fastening member. A cutter accommodation space is formed between the first split member and the second split member, the cutter accommodation space is capable of accommodating a cutter of the drilling machine at a position adjacent to the drilled hole. The cutter includes a cylindrical hole saw whose tip includes a cutting tip. A disk-shaped damping member to absorb vibration is internally inserted into the hole saw, and an elastic member configured to abut against an inner circumferential surface of the hole saw is fixed to an outer circumferential end surface of the damping member.

With this embodiment where the elastic member configured to abut against the inner circumferential surface of the hole saw is fixed to the outer circumferential end surface of the damping member configured to be internally inserted into the hole saw, the elastic member absorbs the vibration of the hole saw, and the vibration of the hole saw can be reduced to carry out the drilling operation quickly and smoothly. This leads to the branch pipe forming apparatus having high operating efficiency.

As other characteristic configuration, the elastic member is split into a plurality of portions so as not to overlap with the cutting tip as viewed in a direction of a rotation axis of the hole saw.

With this embodiment where the elastic member is split and arranged at positions not overlapping with the cutting tip, the damping member can be inserted into the interior of the hole saw without damaging the elastic member.

As other characteristic configuration, the apparatus further includes a fitting tool for fitting an anticorrosive member in the drilled hole. The fitting tool includes a telescopic mechanism which is capable of pushing the anticorrosive member in the drilled hole from an axial direction of the branch pipe, and which is disengageable from the anticorrosive member.

With this embodiment where the fitting tool for fitting the anticorrosive member in the drilled hole includes the telescopic mechanism, the coupling openings opposite to the drilled hole are useful to push the anticorrosive member in the drilled hole from the axial direction of the branch pipe, thereby surely fitting the anticorrosive member. Additionally, the fitting tool does not obstruct the flow path of a branch flow path by using the telescopic mechanism to disengage and remove the fitting tool from the anticorrosive member.

As other characteristic configuration, the anticorrosive member includes an annular anticorrosive seal along a shape of the drilled hole, and an expansion member to expand the annular anticorrosive seal by a tapered surface configured to abut against an inner circumferential surface of the annular anticorrosive seal.

With this embodiment where the anticorrosive member includes the expansion member to expand the annular anticorrosive seal, the annular anticorrosive seal can be surely in close contact with the drilled hole.

A branch pipe formation method of the present invention uses any one of the foregoing branch pipe forming apparatuses. The method includes: arranging the first split member and the second split member on the existing pipe; holding an end portion of the branch pipe between the first split member and the second split member, and connecting the first split member and the second split member to each other in a sealed state by a fastening member fitting the drilling machine on the first split member; closing a gate valve disposed in the branch pipe; and forming the drilled hole at a position adjacent to the cutter accommodation space by moving the cutter to the cutter accommodation space. This leads to the branch pipe formation method having high operating efficiency.

A branch pipe formation method of the present invention is intended to form a branch pipe communicating with a drilled hole formed by drilling a part of an outer circumferential surface of the existing pipe in an uninterrupted flow state. The method includes: arranging the first split member and the second split member on the existing pipe so that a split surface of the first split member and a split surface of the second split member extend along a plane including an axial center of the existing pipe and an axial center of the branch pipe; holding an end portion of the branch pipe between the first split member and the second split member, and connecting the first split member and the second split member to each other in a sealed state by a fastening member; fitting the drilling machine on the first split member; closing a gate valve disposed in the branch pipe; and forming the drilled hole at a position adjacent to a cutter accommodation space formed between the first split member and the second split member by moving the cutter of the drilling machine to the cutter accommodation space.

With this method, the first split member and the second split member that constitute the branch pipe forming apparatus are connected to each other in the sealed state on the split surfaces along the plane including the axial center of the existing pipe and the axial center of the branch pipe. Therefore, for example, in a state where the second split member is disposed on a lower side in the vertical direction, the first split member can be fitted onto the second split member. Consequently, the cutter accommodation space in the interior of the second split member is observable, and the first split member can be connected to the second split member by operating the fastening member from above. This makes it possible to enhance operating efficiency when replacing the existing pipe.

Additionally, the end portion of the branch pipe is held in the sealed state at the coupling openings in the first split member and the second split member. Hence, even if a bending force and a tensile force are exerted on the branch pipe due to an earthquake or the like, the branch pipe is flexibly movable slightly, thereby reducing load exerted on the coupling openings. Furthermore, the gate valve is disposed in the branch pipe held between the coupling openings, and the drilled hole is formed after the branch flow path is closed by closing the gate valve. This makes it possible to independently dispose a plurality of drilled holes in the existing pipe, thus offering high operating efficiency. These contribute to providing the branch pipe formation method having high operating efficiency and excellent earthquake resistance.

A lid doubling as a valve element of the present invention has the following characteristic configurations. The lid doubling as the valve element serves as a valve element to block a flow path of pipeline and also serves as a closing lid to close the pipeline. The lid doubling as the valve element includes a bottom wall and a side wall standing on an outer edge portion of the bottom wall. An engaging part engageable with a valve operation member is formed on at least one of the bottom wall and the side wall. The side wall includes a screw hole into which an abutting bolt configured to abut against an end outer peripheral surface of the pipeline is screwed.

In this configuration, the engaging part engageable with the valve operation member is formed on at least one of the bottom wall and the side wall. Hence, by moving the lid doubling as the valve element, which lid serves as the valve element, from the outside by a movement operation member, the flow path of pipeline can be blocked, thus leading to high operating efficiency.

Additionally, the side wall in the above configuration includes the screw hole into which the abutting bolt configured to abut against the end outer peripheral surface of the pipeline is screwed. Therefore, if the lid doubling as the valve element, which lid serves as the closing lid, is fixed to the pipeline, all one need to do is operate the abutting bolt from the outside so as to be screwed into the screw hole, thus offering extremely high operating efficiency. This contributes to providing the lid doubling as the valve element having high operating efficiency.

As other characteristic configuration, the side wall is disposed on a part of the outer edge portion of the bottom wall, and this configuration further includes a side wall piece on a portion of the outer edge portion of the bottom wall on which portion the side wall is not present.

With this configuration including the part where the side wall is not present, the end portion of the pipeline can be passed through the part where the side wall is not present, so that the lid doubling as the valve element, which lid serves as the valve element, can be slidingly moved by the movement operation member. Meanwhile, a fixed attitude of the lid doubling as the valve element becomes stable by including the side wall piece on a portion of the outer edge portion of the bottom wall on which portion the side wall is not present.

As other characteristic configuration, the bottom wall includes a through hole into which a fixing bolt to fix the side wall piece is inserted.

With this embodiment where the side wall piece is fixed by inserting the fixing bolt into the through hole in the bottom wall, the lid doubling as the valve element, which lid serves as the closing lid, can be firmly fixed to the pipeline. Further, the through hole formed in the bottom wall makes it possible to operate the fixing bolt from above, thereby enhancing the operating efficiency.

A branch pipe forming apparatus of the present invention has the following characteristic configurations. The branch pipe forming apparatus includes the lid doubling as the valve element described above, and is configured to be fitted on an existing pipe in order to form a branch pipe communicating with a drilled hole formed by drilling a part of an outer circumferential surface of the existing pipe in an uninterrupted flow state. The branch pipe forming apparatus includes a first split member and a second split member connected to each other in a sealed state by a fastening member. The second split member is located on a lower side in a vertical direction than the first split member. The first split member includes a tube part with an opening to permit passage of a cutter of the drilling machine, and an annular recess against which a tip of the abutting bolt abuts is formed on an outer circumferential surface of the tube part.

With this configuration, the first split member can be fitted onto the second split member in a state where the second split member is arranged on the lower side in the vertical direction, and the first split member can be connected to the second split member by operating the fastening member from above. This makes it possible to enhance operating efficiency when replacing the existing pipe. Further, if the annular recess against which the tip of the abutting bolt abuts is formed on the tube part of the first split member, the tip of the abutting bolt firmly abuts against the annular recess, so that the fixed attitude of the lid doubling as the valve element, which lid serves as the closing lid, can become stable.

As other characteristic configuration, the apparatus further includes an attachment configured to permit fitting of a valve casing to accommodate the lid doubling as the valve element so as to surround the outer circumferential surface of the tube part. A columnar part including a seating surface configured to mount the attachment thereon is formed on the first split member. The attachment is fixed to the first split member with a bolt screwed into the columnar part.

With the attachment in this configuration, the attitude of the valve casing can be stabilized, so that the lid doubling as the valve element, which lid serves as the valve element, can be smoothly moved. Further, the attachment can be fixed by only screwing the bolt into the columnar part in the first split member, thus offering extremely high operating efficiency.

As other characteristic configuration, the valve casing includes a valve casing body, the valve operation member connected to the valve casing body, and a closing plate detachably connected to the valve casing body on further outer side than the valve operation member.

With this configuration where the closing plate is detachably connected to the valve casing body, even if there is a problem with the lid doubling as the valve element, quick replacement is possible.

A branch pipe formation method using the above branch pipe forming apparatus includes: arranging the first split member and the second split member on the existing pipe so that a split surface of the first split member and a split surface of the second split member extend along a plane including an axial center of the water pipe and an axial center of the branch pipe; holding an end portion of the branch pipe at a coupling opening between the first split member and the second split member, and connecting the first split member and the second split member to each other in a sealed state by a fastening member; conducting a sealing test by fixing the lid doubling as the valve element to the first split member by the abutting bolt, and by supplying a fluid into the first split member and the second split member; fitting the valve casing by removing the abutting bolt after discharging the fluid in the sealing test step; fitting the drilling machine on the first split member; closing a gate valve disposed in the branch pipe; and forming the opening by moving the lid doubling as the valve element, followed by forming the drilled hole at a position adjacent to the cutter accommodation space by moving the cutter to the cutter accommodation space formed between the first split member and the second split member.

With this method, the first split member and the second split member that constitute the branch pipe forming apparatus are connected to each other in the sealed state on the split surfaces along the plane including the axial center of the existing pipe and the axial center of the branch pipe. Therefore, for example, in a state where the second split member is disposed on a lower side in the vertical direction, the first split member can be fitted onto the second split member. Consequently, the cutter accommodation space in the interior of the second split member is observable, and the first split member can be connected to the second split member by operating the fastening member from above. This makes it possible to enhance operating efficiency when replacing the existing pipe.

After the sealing test is carried out by fixing the lid doubling as the valve element to the first split member with the abutting bolt, the valve casing is fitted by removing the abutting bolt, and the lid doubling as the valve element is therefore also servable for the sealing test. Additionally, high operating efficiency is attainable because the drilled hole is formed by moving the cutter of the drilling machine through the opening formed by moving the lid doubling as the valve element. This contributes to providing the branch pipe formation method offering high operating efficiency.

BRIEF DESCRIPTION OF DRAWINGS

FIG. 39 is a sectional view illustrating a lid replacement step in a different embodiment 9.

DESCRIPTION OF EMBODIMENTS

Embodiments of a branch pipe forming apparatus, a lid doubling as a valve element, a branch pipe forming apparatus including a lid doubling as a valve element, and a branch pipe formation method according to the present invention are described below with reference to the drawings. The present embodiments illustrate, as an example of the branch pipe forming apparatus and an example of the branch pipe formation method, a branch pipe forming apparatus 100 fitted on a water pipe W (an example of existing pipes) constituting a fluid piping system during replacement or earthquake resistance construction of the water pipe W, and a branch pipe formation method using the branch pipe forming apparatus 100. It is however not intended to limit the invention to the following embodiments, but various modification can be made without departing from the scope of the invention.

Figure 1:
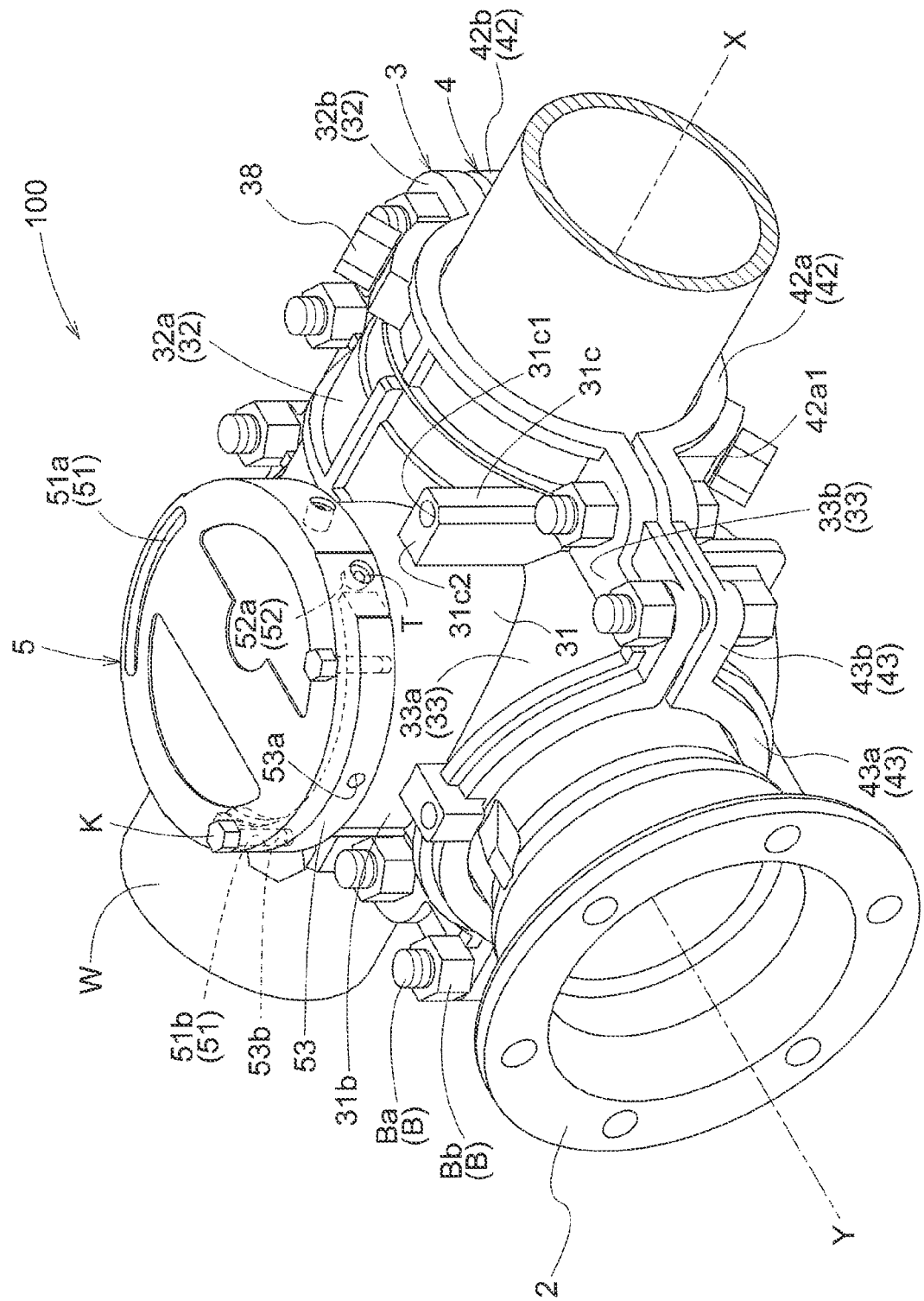
FIG. 1 is a general perspective view of a branch pipe forming apparatus.
Figure 2:
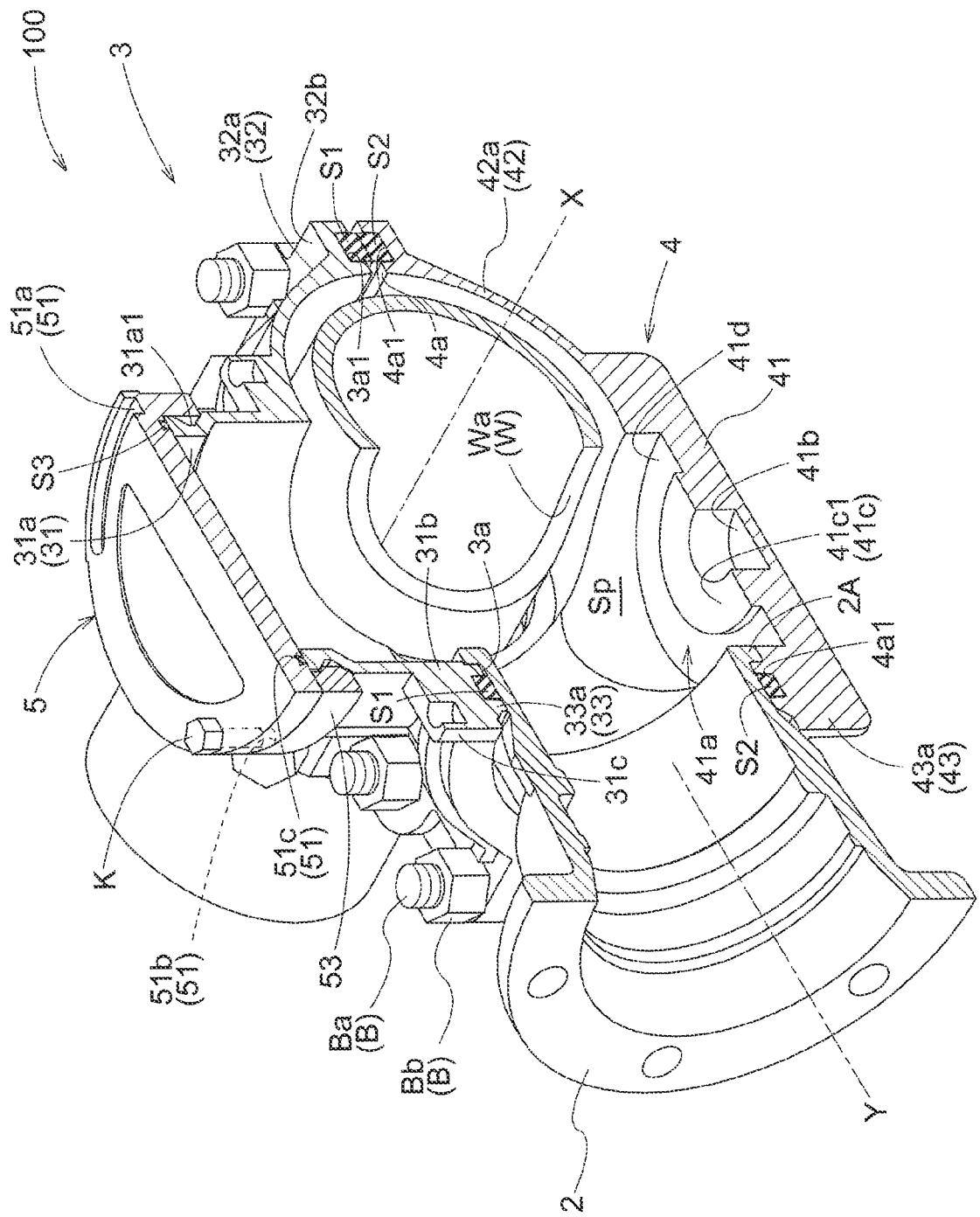
FIG. 2 is a cross-sectional perspective view obtained by cutting the branch pipe forming apparatus in a vertical direction.

As illustrated in FIGS. 1 and 2, the branch pipe forming apparatus 100 is configured with a split T-shaped pipe having a split structure that is fitted on the water pipe W in order to form a branch pipe 2 to be communicated with a drilled hole Wa formed by drilling a part of an outer circumferential surface of the water pipe W (an example of existing pipes) in an uninterrupted flow state by a drilling machine 1. The branch pipe 2 forming apparatus 100 includes a first split member 3 and a second split member 4, and a lid member 5 (an example of lid doubling as a valve element). The first split member 3 and the second split member 4 respectively have split surfaces 3a and 4a along a plane including an axial center X of the water pipe W and an axial center Y of a branch pipe, and are connected in a mutually sealed state by a fastening member B. The lid member 5 closes an opening 31a (end portion) of a tube part 31 (an example of pipeline) of the first split member 3. The phrase that "split surfaces 3a and 4a along the plane including the axial center X of the water pipe W and the axial center Y of the branch pipe 2" means that the split surfaces 3a and 4a lie on the plane including the axial center X of the water pipe W and the axial center Y of the branch pipe 2, or a plane approximately parallel to the plane. The water pipe W, the branch pipe 2 and the branch pipe forming apparatus 100 in the present embodiment are molded using the same kind of material configured with a cast iron pipe, steel pipe or the like. The water pipe W and the branch pipe 2 or the branch pipe forming apparatus 100 may be molded using a different material.

The branch pipe forming apparatus 100 in the present embodiment is fitted along the outer circumferential surface of the water pipe W so that the first split member 3 is disposed on an upper side in a vertical direction and the second split member 4 is disposed on a lower side in the vertical direction. The first split surface 3a of the first split member 3 and the second split surface 4a of the second split member 4 are extended along a horizontal surface parallel to the ground. Hereinafter, a description may be given by regarding a gravity direction as being below and a direction opposite thereto as being above.

Figure 3:
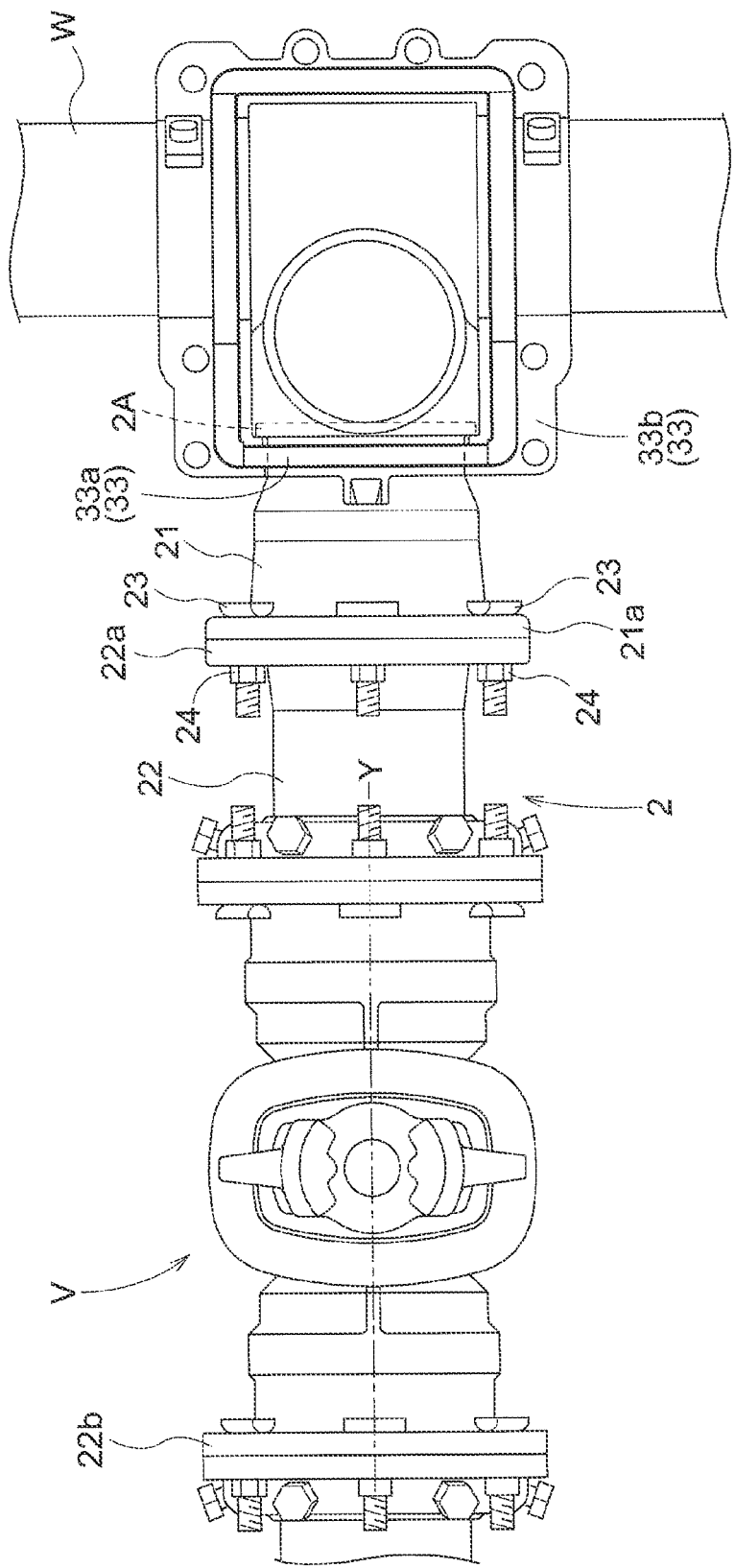
FIG. 3 is a plan view illustrating a state where the branch pipe forming apparatus is fitted on a water pipe.

As illustrated in FIGS. 2 and 3, an end flange 2A of the branch pipe 2 is held between coupling openings 33 and 43 respectively in the first split member 3 and the second split member 4. Both flanges 21a and 22a respectively in a short pipe 21 and a coupling pipe 22 including a gate valve V are connected to each other by a bolt 23 and a nut 24 in the branch pipe 2 in the present embodiment. Other coupling pipe is connected to a flange 22b on a side opposite to the flange 22a of the coupling pipe 22.

Figure 4:
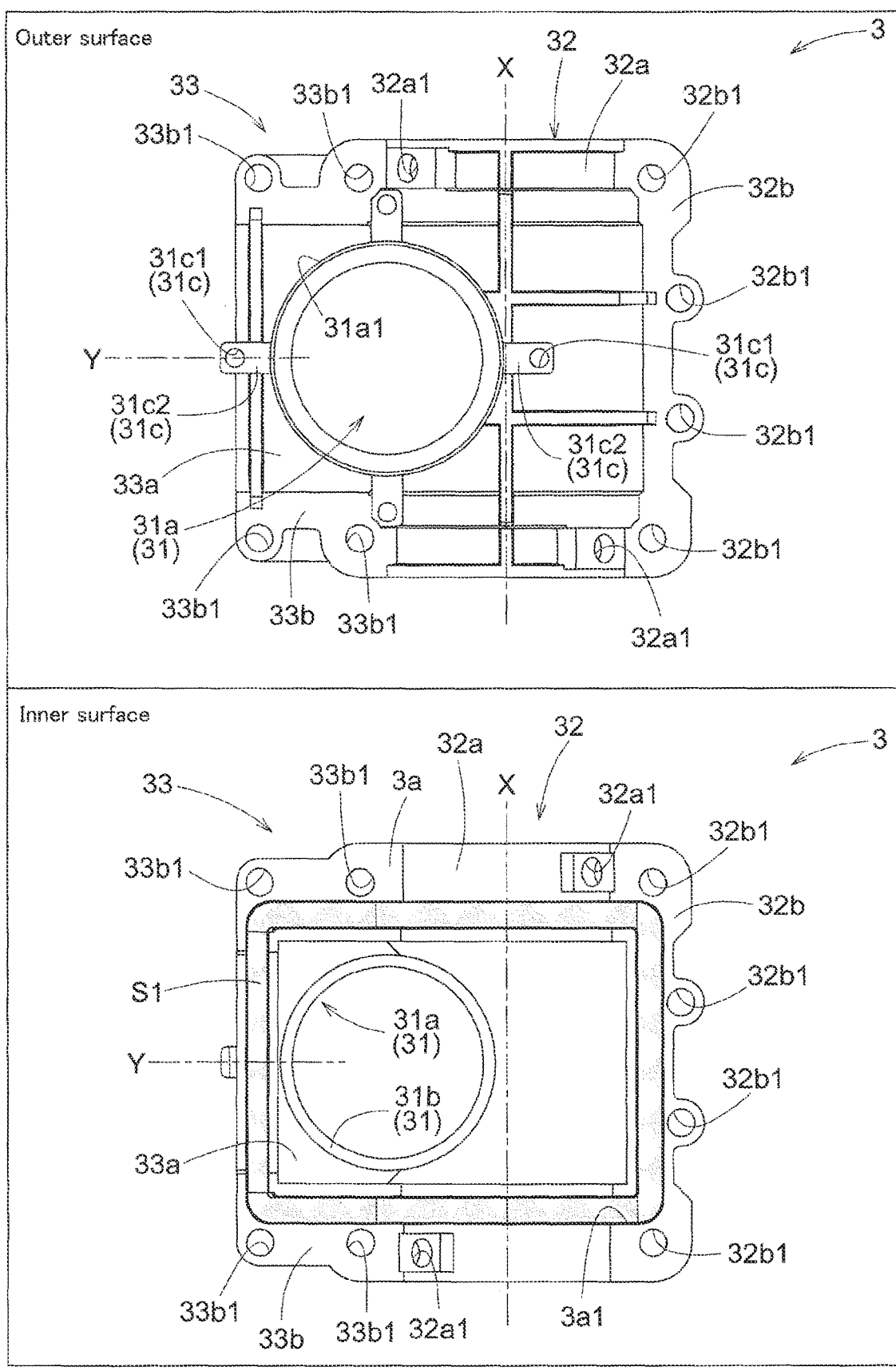
FIG. 4 is a diagram illustrating a first split member.
Figure 6:
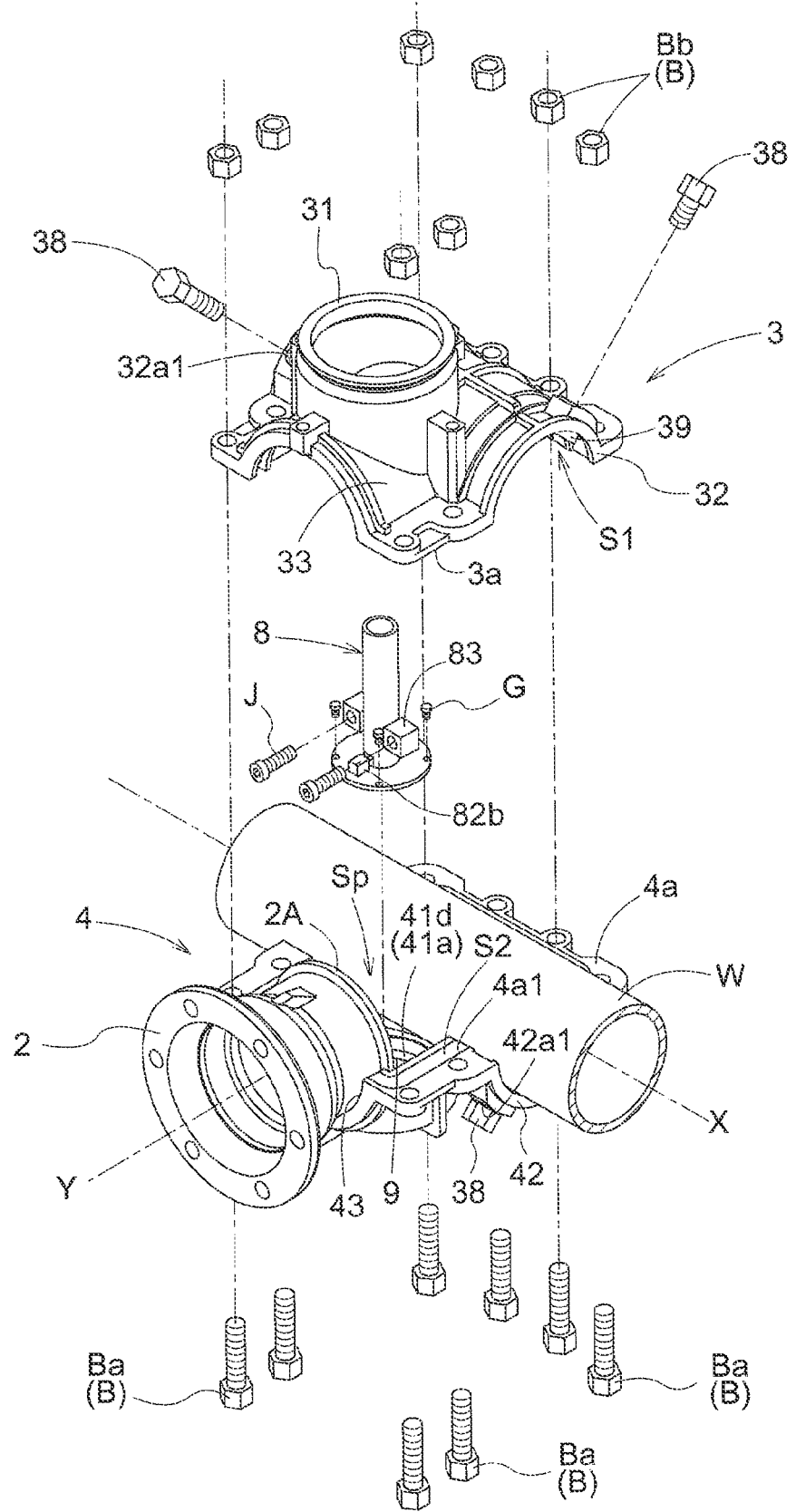
FIG. 6 is an exploded perspective view illustrating a split member arrangement step.

As illustrated in FIGS. 4 and 6, the first split member 3 is formed of a half member, and includes a first body part 32 having a half-cylindrical shape along the outer circumferential surface of the water pipe W, a first coupling opening 33 having a half-cylindrical shape which is extended from the first body part 32 toward the branch pipe 2 and is extended along the outer circumferential surface of the branch pipe 2, and a tube part 31 having a cylindrical shape extended upward across the first body part 32 and the first coupling opening 33.

The first body part 32 includes a first curved portion 32a curved along the outer circumferential surface of the water pipe W, and a first flange portion 32b formed protrudingly from the first curved portion 32a toward a lateral part of the water pipe W. The first curved portion 32a includes a pair of through holes 32a1 on a diagonal that intersects the axial center X of the water pipe W in a plan view. A position fixing bolt 38 whose tip abuts against the outer circumferential surface of the water pipe W is inserted into the pair of through holes 32a1 and is screwed onto a nut 39 accommodated in a non-rotating state on an inner surface of the first body part 32 (also refer to FIG. 6). The first split member 3 is positionally fixed unrotatably to the water pipe W by ensuring that the position fixing bolt 38 abuts against the outer circumferential surface of the water pipe W. The first flange portion 32b includes, along the axial center X, a plurality of first through hole portions 32b1 (four pieces in the present embodiment) where a bolt Ba constituting a fastening member B is inserted and a nut Bb that permits screwing of the bolt Ba is disposed (also refer to FIG. 1).

The first coupling opening 33 includes a first branch curved portion 33a curved along an outer circumferential surface of the end flange 2A of the branch pipe 2, and a pair of first branch flange portions 33b protruding from the first branch curved portion 33a along the axial center X of the water pipe W. The pair of first branch flange portion 33b includes a plurality of first through hole portions 33b1 (two pieces for each of the first branch flange portions 33b in the present embodiment) where the bolt Ba constituting the fastening member B is inserted and the nut Bb that permits screwing of the bolt Ba is disposed (also refer to FIG. 1).

A first split surface 3a having a rectangular shape in a plan view is formed on the first flange portion 32b of the first body part 32 and an outer edge portion of an inner surface of the first coupling opening 33. A first seal groove 3a1 having a rectangular shape in a plan view, which permits fitting of the first seal member S1, is formed across the first split surface 3a and an inner surface of the first curved portion 32a. The first seal member S1 is in close contact with the outer circumferential surface of the water pipe W and the outer circumferential surface of the end flange 2A of the branch pipe 2, thereby ensuring a sealed state of the first split member 3 with respect to the water pipe W and the branch pipe 2.

The tube part 31 includes an opening portion 31a having an opening that permits passage of a hole saw 11 (an example of cutters) of the drilling machine 1, and a base end portion 31b provided connectedly to the first body part 32 and the first coupling opening 33. An axial center Z of the tube part 31 coincides with a rotation axis of the hole saw 11, and corresponds to a position which is closer to the branch pipe 2 than the axial center X of the water pipe W and is not overlapped with the water pipe W in a plan view (also refer to FIGS. 8 and 12). In other words, the axial center Z of the tube part 31 is located closer to the branch pipe 2 than to the outer circumferential surface of the water pipe W. Consequently, a drilled hole Wa drilled by the hole saw 11 occupies a cross-sectional region that is less than half of the water wipe W, thereby making it possible to maintain strength of the water pipe W. The opening portion 31a includes an annular recess 31a1 (an example of distal outer circumferential surfaces) against which a tip of an abutting bolt T described later abuts (also refer to FIG. 2). A plurality of columnar portions 31c (four columnar portions disposed at equal intervals in a circumferential direction in the present embodiment) into each of which the embedded bolt U that fixing the attachment 7 described below are screwed, are protrudingly formed outward in a radial direction at the base end portion 31b. Top surfaces of these columnar portions 31c constitute seating surfaces 31c2 on which an attachment 7 is mounted, and these seating surfaces 31c2 are disposed in the same flat surface in order to keep an attitude of the attachment 7 horizontally.

Figure 5:
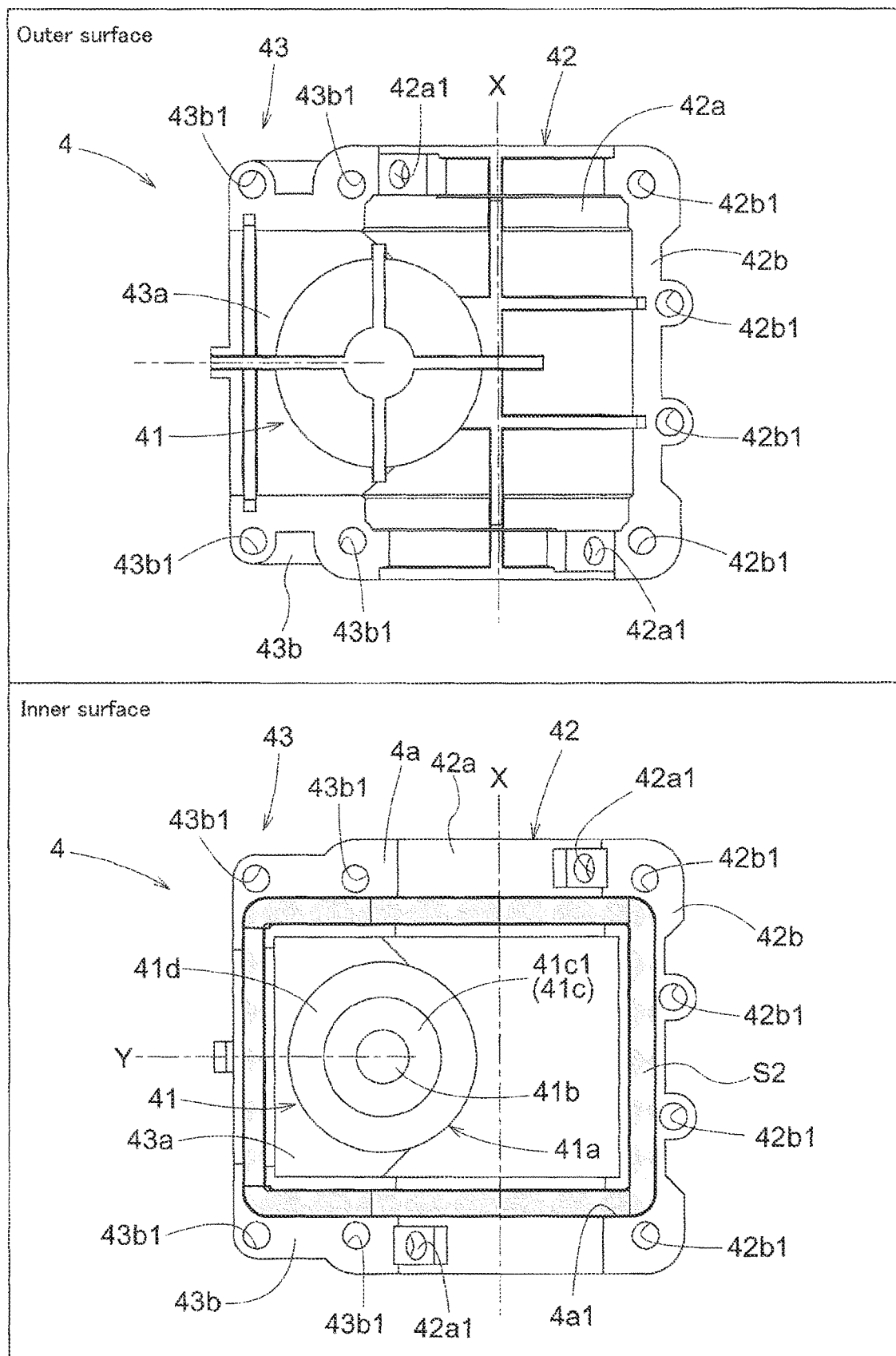
FIG. 5 is a diagram illustrating a second split member.

As illustrated in FIGS. 5 and 6, the second split member 4 is formed of a half member, and includes a second body part 42 having a half-cylindrical shape along the outer circumferential surface of the water pipe W, a second coupling opening 43 having a half-cylindrical shape which is extended from the second body part 42 toward the branch pipe 2 and is extended along the outer circumferential surface of the branch pipe 2, and a bottom part 41 downwardly recessed in a circular shape in a plan view as viewed from an inner surface side, across the second body part 42 and the second coupling opening 43.

The second body part 42 includes a second curved portion 42*a* curved along the outer circumferential surface of the water pipe W, and a second flange portion 42*b* formed protrudingly from the second curved portion 42*a* toward the lateral part of the water pipe W. The second curved portion 42*a* includes a pair of through holes 42*a*1 on a diagonal that intersects the axial center X of the water pipe W in the plan view. Similarly to the first split member 3, the position fixing bolt 38 whose tip abuts against the outer circumferential surface of the water pipe W is inserted into the pair of through holes 42*a*1 and is screwed onto the nut 39 accommodated in a non-rotating state on an inner surface of the second body part 42. The second split member 4 is positionally fixed unrotatably to the water pipe W by ensuring that the position fixing bolt 38 abuts against the outer circumferential surface of the water pipe W. The second flange portion 42*b* includes, along the axial center X, a plurality of second through hole portions 42*b*1 (four pieces in the present embodiment) which permits insertion of the bolt Ba constituting the fastening member B.

The second coupling opening 43 includes a second branch curved portion 43*a* curved along the outer circumferential surface of the end flange 2A of the branch pipe 2, and a pair of second branch flange portions 43*b* protruding from the second branch curved portion 43*a* along the axial center X of the water pipe W. The pair of second branch flange portion 43*b* includes a plurality of second through hole portions 43*b*1 (two pieces for each of the second branch flange portions 43*b* in the present embodiment) where the bolt Ba constituting the fastening member B is inserted.

A second split surface 4*a* having a rectangular shape in a plan view is formed on the second flange portion 42*b* of the second body part 42 and an outer edge portion of an inner surface of the second coupling opening 43. A second seal groove 4*a*1 having a rectangular shape in a plan view, which permits fitting of the second seal member S2, is formed across the second split surface 4*a* and an inner surface of the second curved portion 42*a*. The second seal member S2 is in close contact with the outer circumferential surface of the water pipe W and the outer circumferential surface of the end flange 2A of the branch pipe 2, thereby ensuring a sealed state of the second split member 4 with respect to the water pipe W and the branch pipe 2. The first seal member S1 fitted into the first seal groove 3*a*1 of the first split surface 3*a* and the second seal member S2 fitted into the second seal groove 4*a*1 of the second split surface 4*a* are pressed against each other to seal a clearance between the first split member 3 and the second split member 4.

The bottom part 41 includes an accommodating recess 41*a* having a circular shape in a plan view which accommodates a flat plate member 9 described later, and an engaging recess 41*b* having a circular shape in a plan view which is disposed at a central portion of the accommodating recess 41*a* and with which an end portion of a guide tube 8 described later is engaged (also refer to FIG. 8). The accommodating recess 41*a* is formed by denting the bottom part 41 downwardly, and the engaging recess 41*b* is formed by denting the central portion of the accommodating recess 41*a* further downward. The accommodating recess 41*a* includes an annular protrusion 41*c* having an annular shape in a plan view which is protruded upward on an outer peripheral side adjacent to the engaging recess 41*b*. An upper surface of the circular ring-shaped protrusion 41*c* serves as a mounting surface 41*c*1 for mounting thereon a protrusion 82 of the guide tube 8 described later (also refer to FIG. 11). The mounting surface 41*c*1 is a flat surface parallel to the plane including the axial center X of the water pipe W and the axial center Y of the branch pipe 2. With this configuration, an annular groove 41*d* is formed on an outer peripheral side of the annular protrusion 41*c*, and the flat plate member 9 is mounted on the annular groove 41*d*.

As illustrated in FIGS. 1 and 2, a lid member 5 to close the opening portion 31*a* of the tube part 31 of the first split member 3 includes a bottom wall 51 and a side wall 52 standing on an outer edge portion of the bottom wall 51. The lid member 5 serves as a valve element to block a flow path of the tube part 31 as a pipeline, and also serves as a closing lid to close the tube part 31. Hereinafter, a valve casing 6 to accommodate the lid member 5 is integrally referred to as "a lid doubling as a valve element" in some cases.

Figure 13:
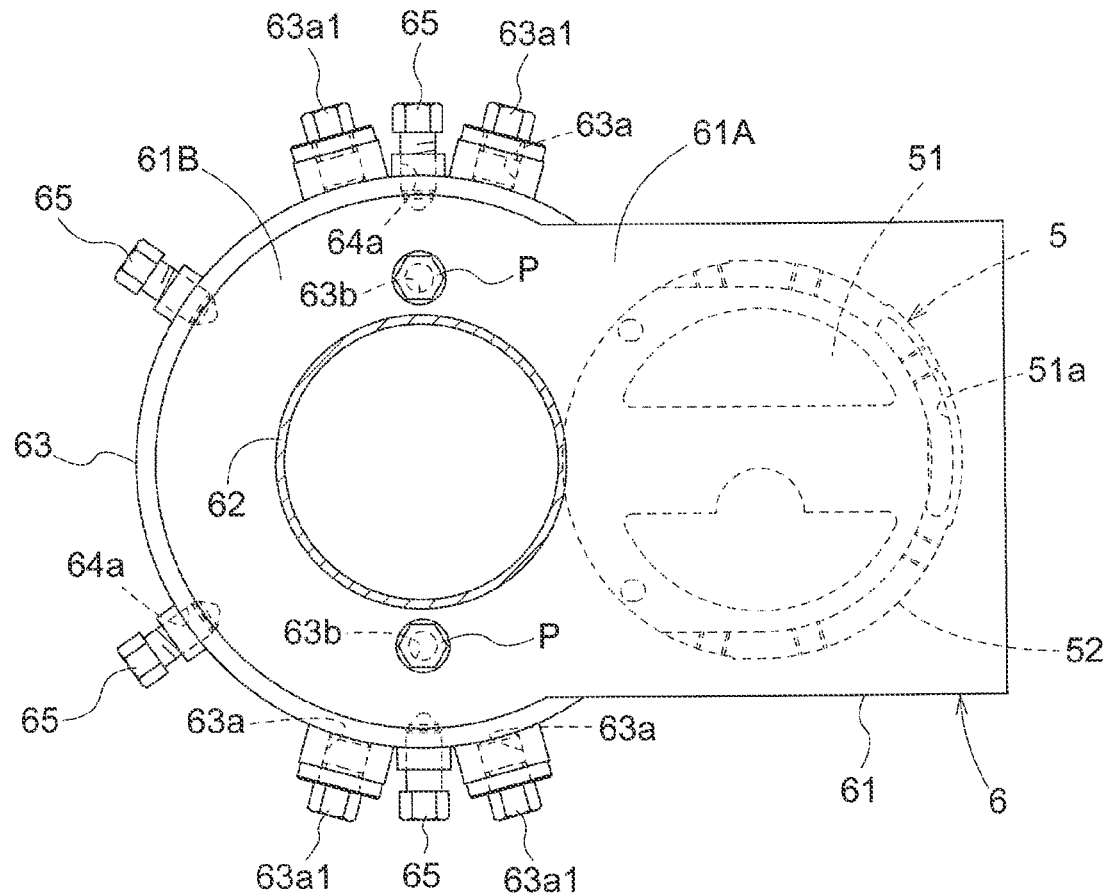
FIG. 13 is a plan view illustrating a valve closing step.
Figure 14:
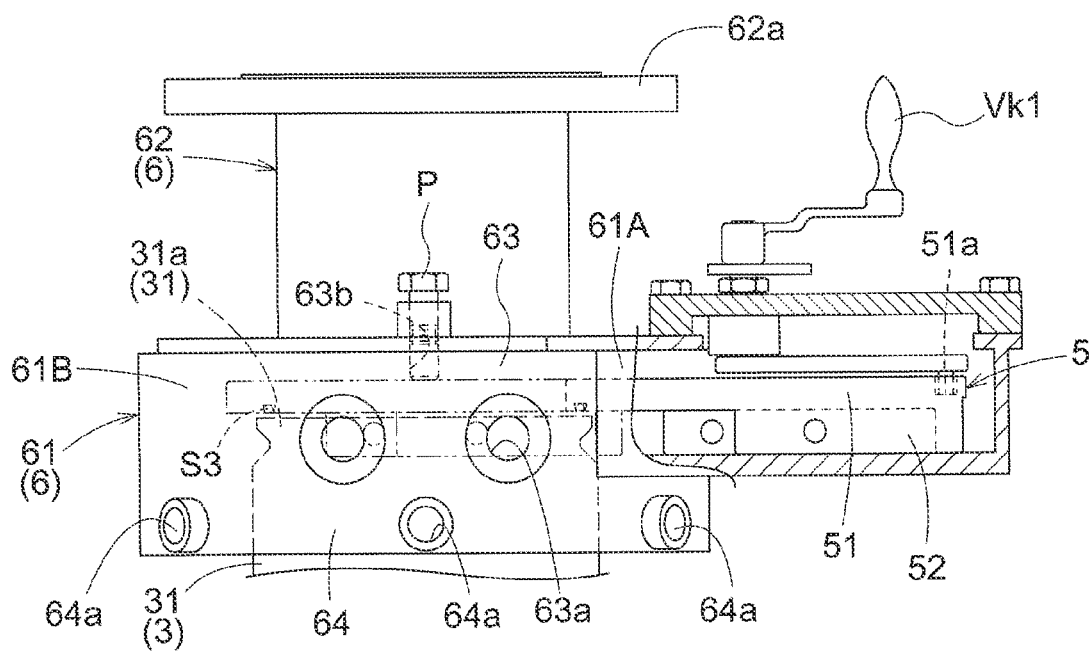
FIG. 14 is a side view illustrating the valve closing step.

The bottom wall 51 is a flat plate member having a circular shape in a plan view, and includes, on an outer surface thereof, an arc-shaped long groove 51*a* (an example of engaging part) engageable with a valve operation member Vk (also refer to FIGS. 13 and 14). The lid member 5 is slidingly moved in an interior of the valve casing 6 by rotation of the end portion of the valve operation member Vk from one end to the other end of the long groove 51*a*. This ensures switching between a valve closed state where the lid member 5 closes the opening of the tube part 31, and a valve opened state where the lid member 5 is separated from the opening of the tube part 31. A plurality of through holes 51*b* (two pieces in the present embodiment), which permits insertion of a fixing bolt K to fix a side wall piece 53 described later, are formed on a region of the outer edge portion of the bottom wall 51 which is located opposite to the long groove 51*a*. An annular seal groove 51*c*, which permits fitting of an annular seal member S3, is formed on an inner surface of the outer edge portion of the bottom wall 51. The annular seal member S3 is in close contact with an upper surface of the opening portion 31*a* of the tube part 31, so that the lid member 5 can seal the tube part 31 of the first split member 3. The bottom wall 51 may be formed in, for example, a rectangular shape in a plan view without being limited to the circular shape in the plan view.

The side wall 52 is configured with a protruded portion which is disposed at a part of the outer edge portion of the bottom wall 51 and is integrally protruded across a region of a semicircle or more (180 degrees or more) of the bottom wall 51. A side wall piece 53 is on a portion of the outer edge portion of the bottom wall 51 on which portion the side wall 52 is not present.

Two screw holes 52*a* are disposed at each of regions opposing one another along the axial center X of the water pipe W on the side wall 52. A plurality of abutting bolts T (four pieces in the present embodiment), which abut against the annular recess 31*a*1 formed on the outer circumferential surface of the opening portion 31*a* of the tube part 31, are respectively screwed into the screw holes 52*a*. The abutting bolts T are configured with socket head cap screws in the present embodiment. By screwing the abutting bolts T into the screw holes 52*a*, a tip of each of the abutting bolts T bites into the annular recess 31*a*1 so as to fix the lid member 5 to the tube part 31 of the first split member 3 (also refer to FIG. 19). Alternatively, no annular recess 31*a*1 may be formed on the outer circumferential surface of the opening portion 31*a* of the tube part 31, but the abutting bolts T may be configured to abut against a smooth outer circumferential surface of the opening portion 31*a* of the tube part 31.

The side wall piece 53 is configured with an arc-shaped member and is inserted into a portion of the outer edge portion of the bottom wall 51 on which portion the side wall 52 is not present. The side wall piece 53 includes a first screw hole 53*a* which penetrates in a horizontal direction along the axial center X of the water pipe W, and which permits screwing of the abutting bolt T, and a plurality of second screw holes 53*b* (two pieces in the present embodiment) which penetrates in a direction perpendicular to the axial center X of the water pipe W and the axial center Y of the branch pipe 2, and which permits screwing of the fixing bolt K (also refer to FIG. 18). The side wall piece 53 inserted into a portion of the outer edge portion of the bottom wall 51 on which portion the side wall 52 is not present can be integrated with the lid member 5 by inserting the fixing bolt K from a through hole 51*b* of the bottom wall 51 so as to be screwed into the second screw holes 53*b*, and the tip of each of the abutting bolts T bites into the annular recess 31*a*1 so as to be fixed to the tube part 31 of the first split member 3 (also refer to FIG. 19). Alternatively, the first screw hole 53*a* into which the abutting bolt T is screwed may be omitted.

Figure 12:
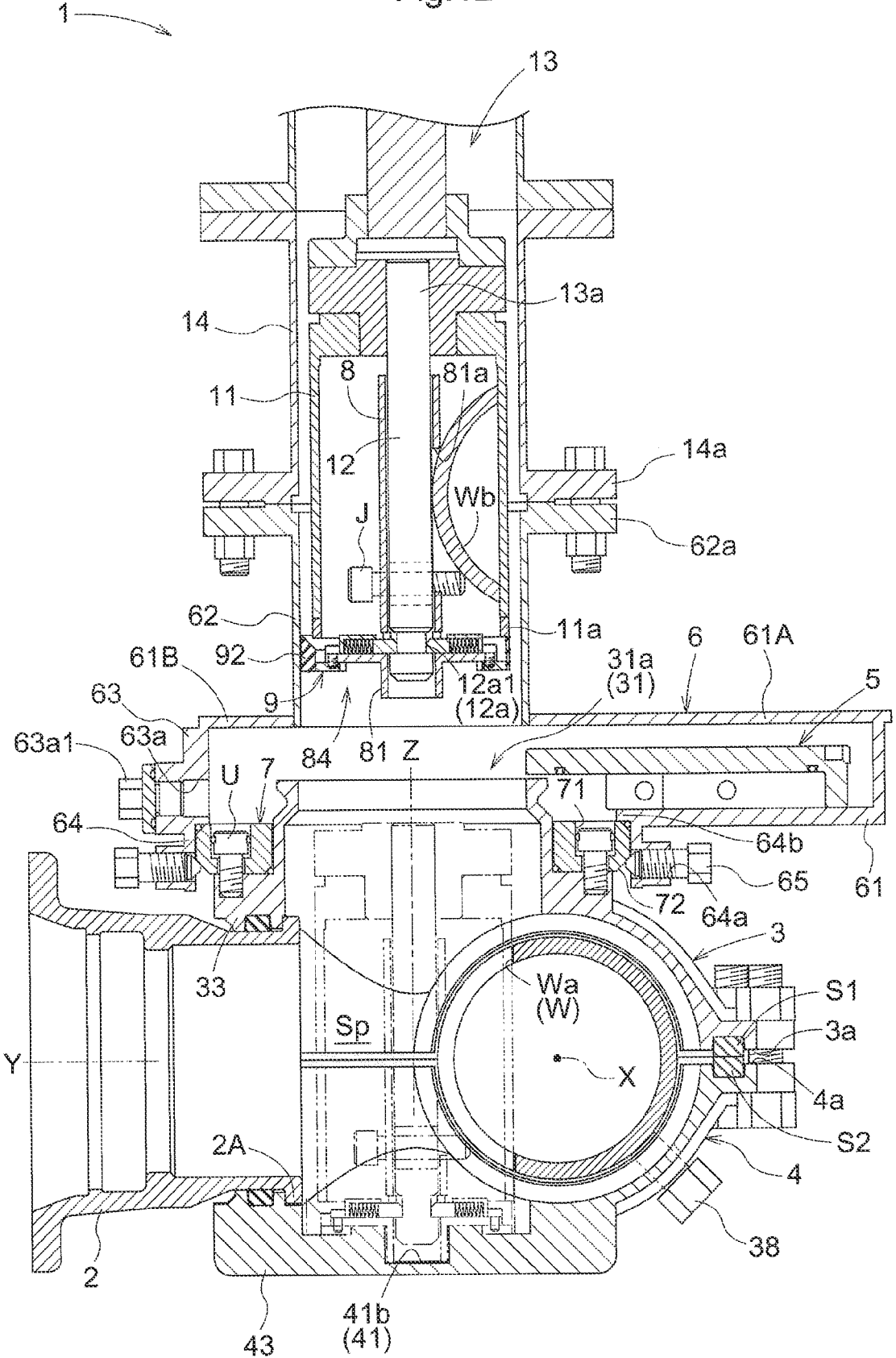
FIG. 12 is a sectional view illustrating the drilling step.

Work equipment used in a branch pipe formation method using the branch pipe forming apparatus 100 is described below. Examples of the work equipment used in the present embodiment include, as illustrated in FIG. 12, the drilling machine 1, the valve casing 6 accommodating the lid member 5 serving as the valve to block the flow path of the tube part 31, the attachment 7 to stably fix the valve casing 6, the guide tube 8 to guide a center drill 12 of the drilling machine 1, and the flat plate member 9 connected to the guide tube 8. Hereinafter, one which includes any one of the drilling machine 1, the valve casing 6, the attachment 7, the guide tube 8 and the flat plate member 9 is referred to as the branch pipe forming apparatus 100 in some cases.

Figure 11:
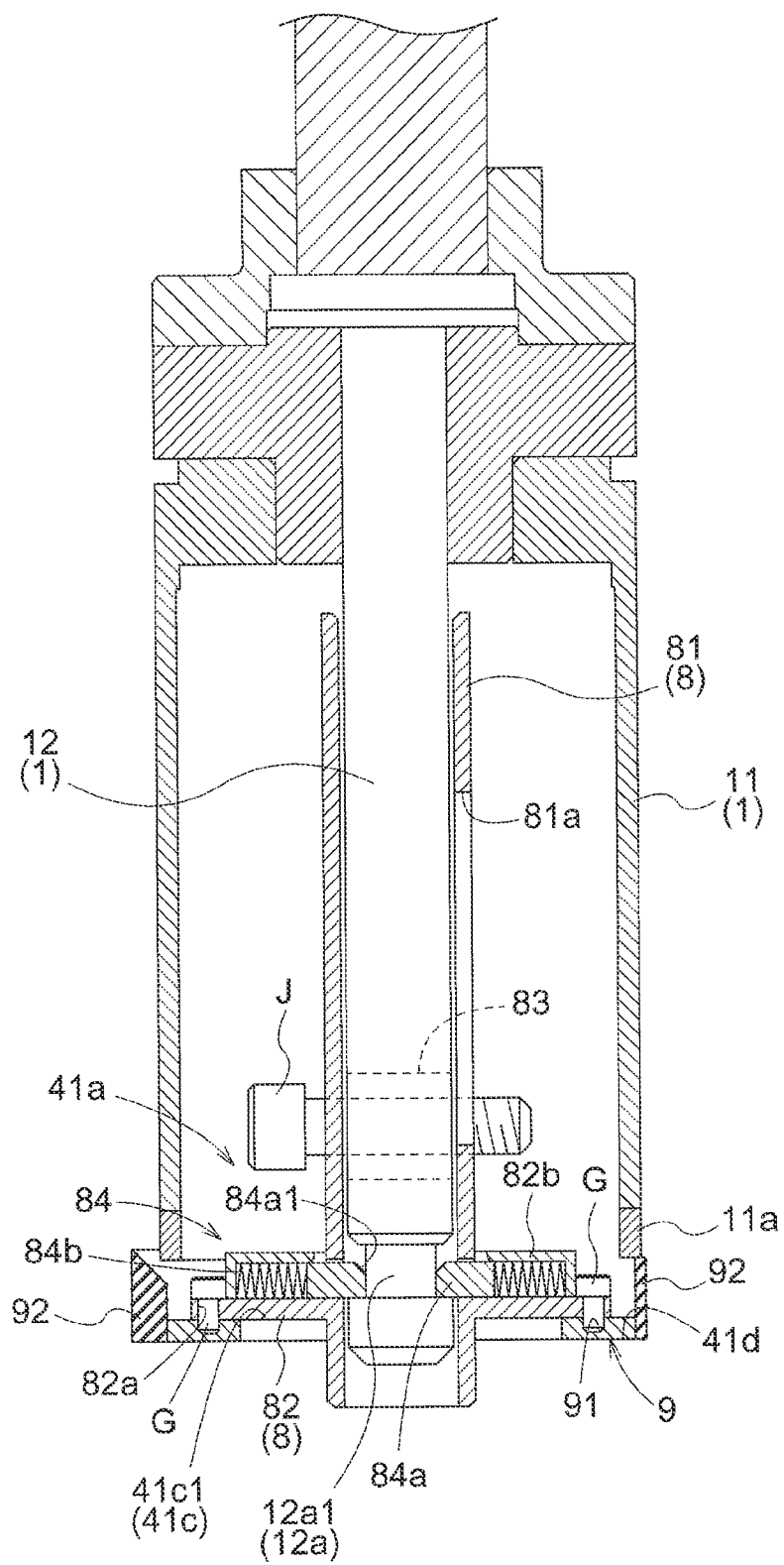
FIG. 11 is an enlarged sectional view illustrating the drilling step.

As illustrated in FIGS. 11 and 12, the drilling machine 1 includes the cylindrical hole saw 11 (an example of cutter) with a cutting tip 11*a*, the center drill 12 protruding from a center position of the hole saw 11 more outward than the cutting tip 11*a*, a rotary drive mechanism 13 with a motor for rotationally driving the hole saw 11 and the center drill 12, and a drilling case 14 to accommodate the hole saw 11 and the center drill 12. Alternatively, only the hole saw 11 may be rotated by the rotary drive mechanism 13, and the center drill 12 may not be rotated.

The hole saw 11 of the present embodiment whose outer diameter is smaller than an outer diameter of the water pipe W is intended to cut out a part of the outer circumferential surface of the water pipe W. The hole saw 11 and the center drill 12 are connected to a pivot 13*a* of the rotary drive mechanism 13, and moved forward and backward while rotating in a direction perpendicular to a plane including the axial center X of the water pipe W and the axial center Y of the branch pipe 2. The rotary drive mechanism 13 causes the hole saw 11 to move forward in a downward direction while rotating toward the water pipe W, so that a part (lateral surface) of the outer circumferential surface of the water pipe W can be cut out to form a drilled hole Wa along the perpendicular direction by the cutting tip 11*a* of the hole saw 11 (also refer to FIG. 2). The drilled hole Wa along the direction perpendicular to the plane including the axial center X of the water pipe W and the axial center Y of the branch pipe 2 has a shape corresponding to an outer shape of the hole saw 11, specifically a semi-arcuate shape along the axial center X of the water pipe W in a plan view. The hole saw 11 may be configured to have an outer diameter larger than the outer diameter of the water pipe W.

When the rotary drive mechanism 13 causes the hole saw 11 and the center drill 12 to move forward, a cutter accommodation space Sp that can accommodate the hole saw 11 is formed at a position adjacent to the drilled hole Wa, between the first split member 3 and the second split member 4. With this configuration, coupling openings 33 and 43 opposite to each other by interposing therebetween the drilled hole Wa and the cutter accommodation space Sp are formed at a coupling portion of the first split member 3 and the second split member 4. The coupling openings 33 and 43 hold therebetween the end flange 2A of the branch pipe 2 in a sealed state. In the center drill 12 of the present embodiment, corner parts all over a whole area in a circumferential direction of a tip surface of a tip portion 12*a* are formed in a tapered shape, and an annular recess 12*a*1 is formed on a lateral surface of the tip portion 12*a*.

As illustrated in FIGS. 12 to 14, the valve casing 6 includes a valve casing body 61 to accommodate the lid member 5, and a valve casing tube part 62 which is protruded in a cylindrical shape from the valve casing body 61 and permits passage of the hole saw 11 and the center drill 12. The valve casing body 61 includes a lid accommodation part 61A that accommodates the lid member 5 in a valve opened state, and a valve casing fixing part 61B that accommodates the lid member 5 in a valve closed state and is fixed to the attachment 7. A valve casing flange 62*a* fixed by a drilled hole flange 14*a* of the drilled hole case 14 of the drilling machine 1, a bolt and a nut are protrudingly formed in an annular shape at an end portion of the valve casing tube part 62.

The lid accommodation part 61A is a box having a rectangular shape in a plan view, and the valve operation member Vk is fixed in a sealed state to an upper wall. By a rotation operation of the operation lever Vk1 in the valve operation member Vk, an end portion of the valve operation member Vk is rotated from one end to the other end of the long groove 51*a*, thereby causing the lid member 5 to slidingly move in the valve casing 6.

The valve casing fixing part 61B includes a valve casing cylindrical part 63 having a circular shape in a plan view which forms a moving space of the lid member 5 together with the lid accommodation part 61A, and a valve casing extending part 64 extending from the valve casing cylindrical part 63 along an outer circumferential surface of the attachment 7. The valve casing cylindrical part 63 includes a plurality of through holes 63*a* for operation (four pieces in the present embodiment) which permits insertion of an operation tool (not illustrated) for screwing the abutting bolt T configured with a hex socket head cap bolt for fixing the lid member 5 to the tube part 31 of the first split member 3. A closing bolt 63*a*1 for closing in a water-tight state except when inserting the operation tool is screwed into the through holes 63*a* for operation. There are also provided a plurality of through holes 63*b* for tap bolts (two pieces in the present embodiment) into which a tap bolt P is screwed. The tap bolt P presses an outer edge portion of the lid member 5 closing the opening portion 31*a* of the tube part 31 in an upper wall of the valve casing cylindrical part 63. The valve casing extending part 64 includes a plurality of valve fixing through holes 64*a* (four pieces in the present embodiment) into which a valve casing fixing bolt 65 that abuts against a lower part of the attachment 7 is screwed. An annular protrusion 64*b* is protrudingly formed in an annular shape at a boundary with the valve casing cylindrical part 63 on an inner circumferential surface of the valve casing extending part 64. The annular protrusion 64b and the valve casing fixing bolt 65 hold the attachment 7 therebetween, thereby fixing the valve casing 6 to the attachment 7.

Figure 8:
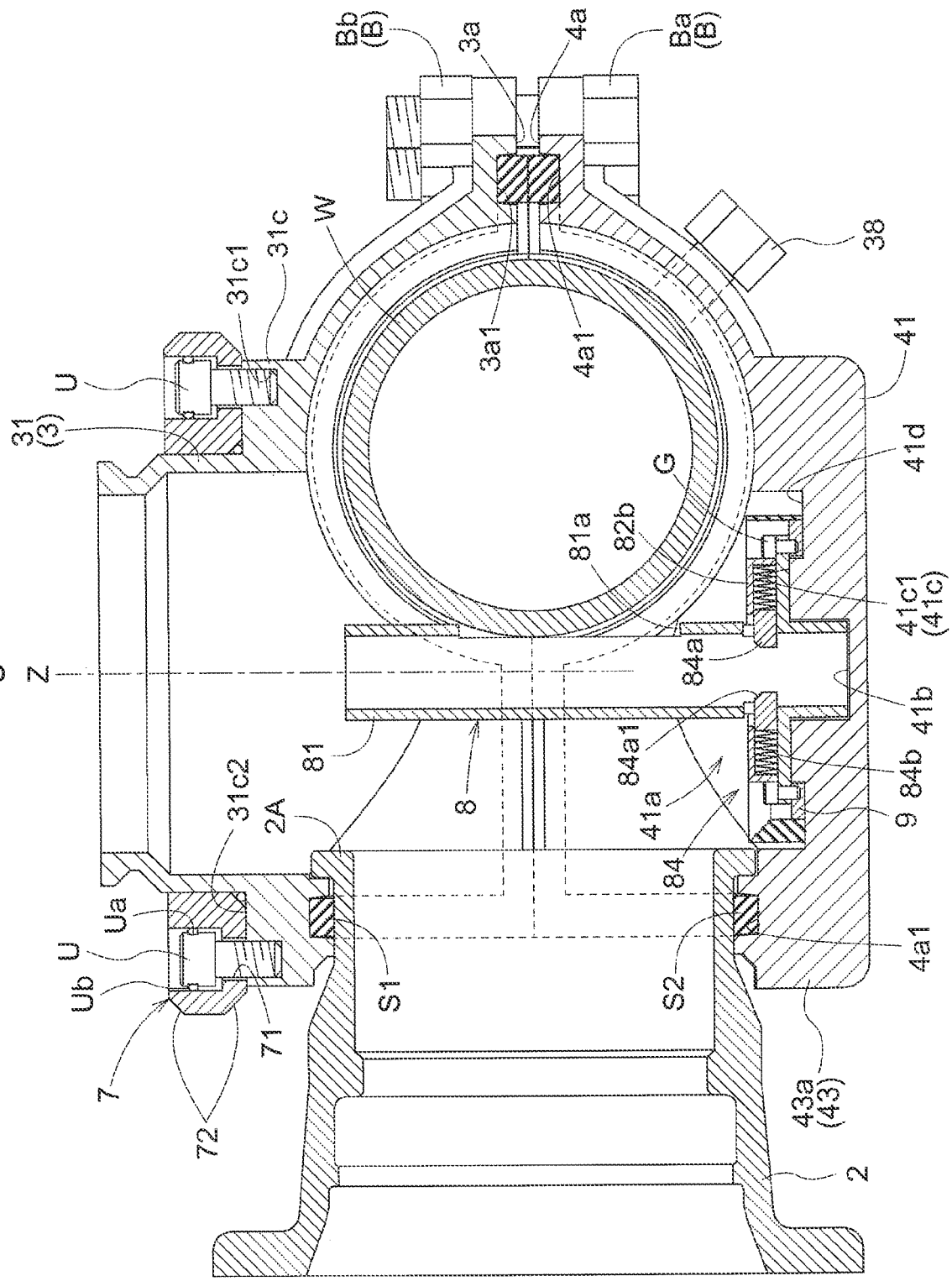
FIG. 8 is a sectional view of the branch pipe forming apparatus with an attachment fitted therein.
Figure 9:
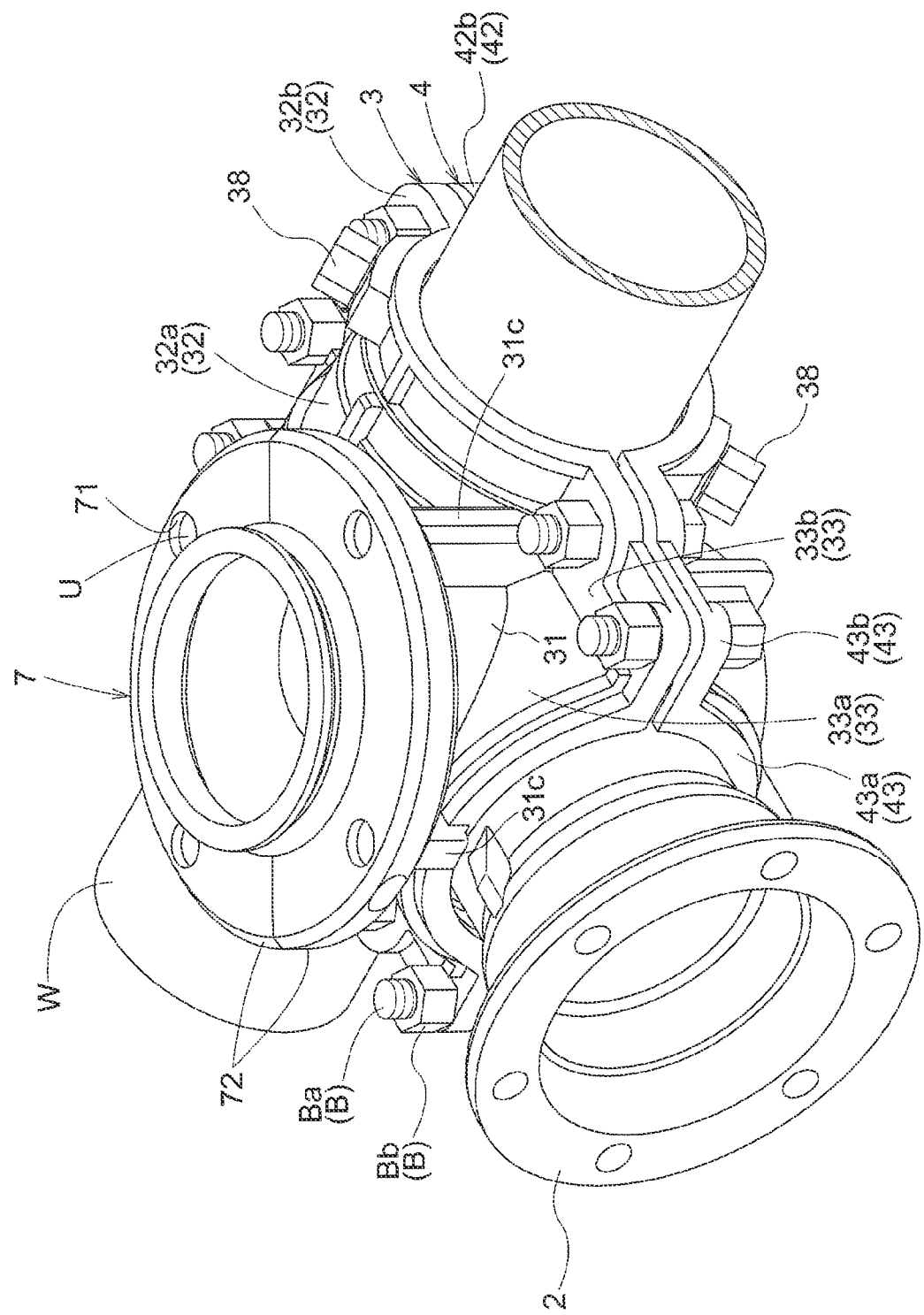
FIG. 9 is a perspective view illustrating an attachment fitting step.

As illustrated in FIGS. 8 and 9, the attachment 7 is configured with an annular member surrounding an outer circumferential surface of the tube part 31 of the first split member 3. The attachment 7 in the present embodiment is a split structure configured with a pair of semi-circular members each of which includes a plurality of fixing through holes 71 along a vertical direction (two pieces for each of the semi-circular members in the present embodiment) which permits insertion of an embedded bolt U for fixing the attachment 7 to the first split member 3. The embedded bolt U is internally inserted into the fixing through hole 71, and the embedded bolt U is screwed into a hole 31c1 of the columnar portion 31c of the first split member 3, thereby fixing the attachment 7 to the first split member 3. An annular seal groove Ua is disposed at a head of the embedded bolt U in the present embodiment, an O-ring Ub is fitted in the seal groove Ua. An annular tapered surface 72 is formed at each of upper and lower outer edges on an outer circumferential surface of the attachment 7. A tip portion of the valve casing fixing bolt 65 abuts against the annular tapered surface 72 on the lower side, so that the annular protrusion 64b of the valve casing 6 and the valve casing fixing bolt 65 hold the attachment 7 therebetween, thereby fixing the valve casing 6 to the attachment 7 (also refer to FIG. 12). The attachment 7 is not limited to the annular member, but the outer shape thereof may be formed in, for example, a polygonal shape in a plan view.

Figure 10:
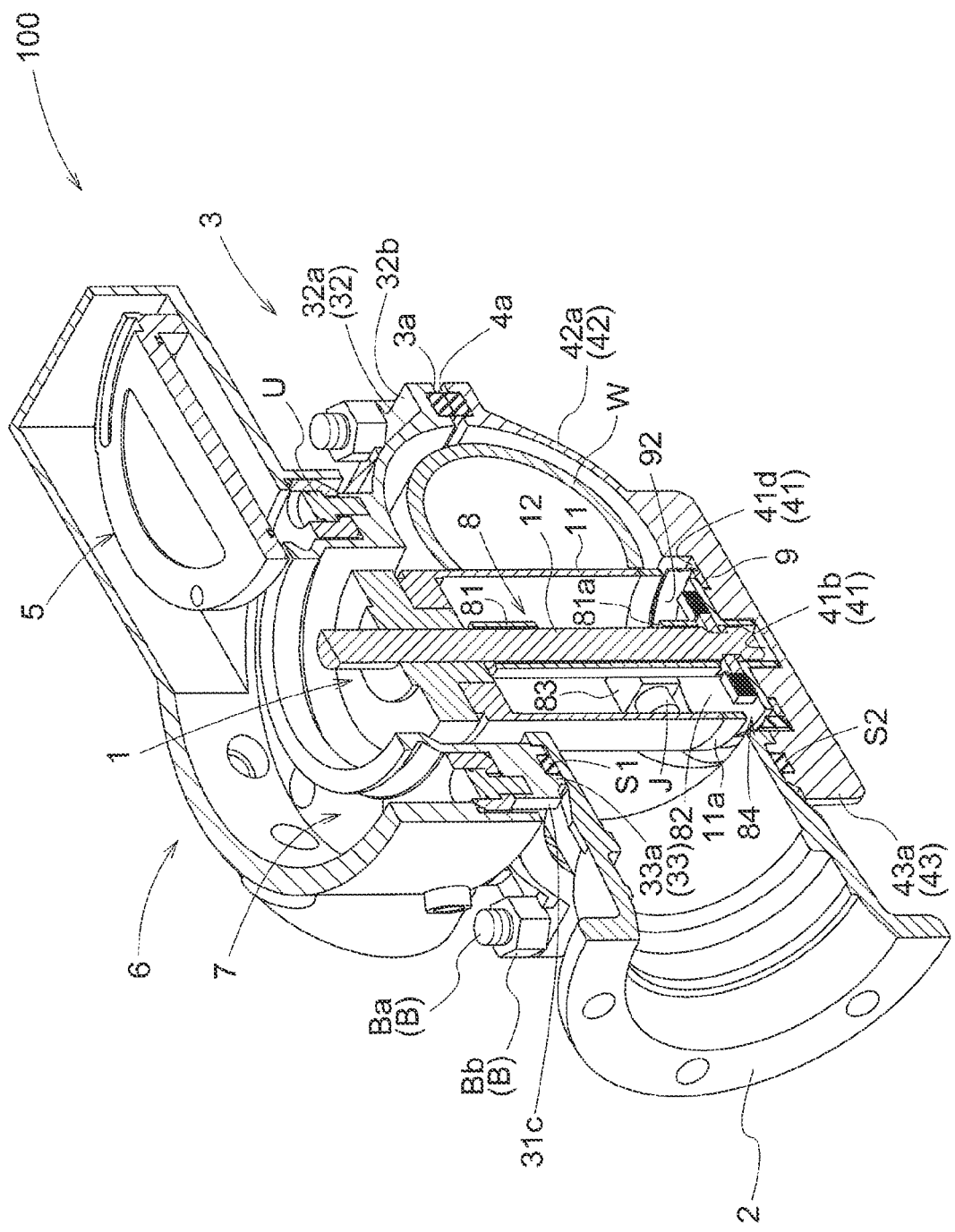
FIG. 10 is a cross-sectional perspective view obtained by cutting the branch pipe forming apparatus, which illustrates a drilling step.

As illustrated in FIGS. 10 to 12, the guide tube 8 permits insertion of the center drill 12 of the drilling machine 1, and guides forward and backward movement of the center drill 12 in a vertical direction. The guide tube 8 includes a cylindrical circumferential wall part 81 having an inner diameter approximately identical to an outer diameter of the center drill 12, and the annular protrusion 82 that is protruded radially outward from an end portion of the circumferential wall part 81 and is connected to the flat plate member 9. The guide tube 8 can be positioned by causing the end portion of the circumferential wall part 81 to engage with an engaging recess 41b formed at the bottom part 41 of the second split member 4. An upper end of the circumferential wall part 81 of the guide tube 8 is protruded more upward than split surfaces 3a and 4a, and is located on a side of the opening portion 31a of the tube part 31. In other words, the guide tube 8 is extended from the second split member 4 so as to come closer to the opening portion 31 of the tube part 31 than the split surfaces 3a and 4a. This ensures the guide of the center drill 12, so that shaft misalignment of a cutter can be eliminated to precisely form the drilled hole Wa. An axial center of the circumferential wall part 81 of the guide tube 8 coincides with the axial center Z of the tube part 31, and is perpendicular to the split surfaces 3a and 4a. Consequently, vibration of the drilling machine 1 is less likely to directly act on the split surfaces 3a and 4a, resulting in less shaft misalignment of the cutter in a drilling operation. The guide tube 8 may have any shape if the guide tube 8 is capable of guiding the forward and backward movement of the center drill 12 in the vertical direction.

The circumferential wall part 81 includes a circumferential wall through hole 81a that holds a cut portion Wb to be separated from the water pipe W when the drilled hole Wa of the water pipe W has been formed. The cut portion Wb is held by being sandwiched between the circumferential wall through hole 81a and an inner circumferential surface of the hole saw 11. A pair of block parts 83 that permits engagement of an axial center holding bolt J, which prevents the shaft misalignment of the drilling machine 1 by abutting against a lower side in a vertical direction on the outer circumferential surface of the water pipe W (cut portion Wb), are protrudingly formed on both lateral portions along the axial center X of the water pipe W of the circumferential wall part 81. The axial center holding bolt J also serves to prevent the cut portion Wb from falling because the bolt J abuts against the lower side in the vertical direction on the outer circumferential surface of the water pipe W (cut portion Wb). For example, an axial center holding pin may be employed instead of the axial center holding bolt J as a non-limiting embodiment of axial center holding member to prevent the shaft misalignment of the drilling machine 1.

The protrusion 82 includes a plurality of bolt insertion holes 82a (four pieces in the present embodiment) each of which permits insertion of an outer circumferential fixing bolt G inserted into an outer circumferential portion in order to fix the flat plate member 9. Holding mechanisms 84 to hold the center drill 12 of the drilling machine 1 are respectively disposed inside the bolt insertion holes 82a. Each of the holding mechanisms 84 includes an accommodation box 82b formed at the protrusion 82, an engaging member 84a engageable with the annular recess 12a1 formed on the outer circumferential surface of the center drill 12, and a compression coil spring 84 (an example of urging member) to urge the engaging member 84a in a radially inward direction toward the annular recess 12a1. Alternatively, the outer circumferential fixing bolt G may be configured with a pin so that the protrusion 82 and the flat plate member 9 are fitted together with the pin.

The accommodation box 82b is a pair of box-shaped members that are integrally formed on an upper surface of the protrusion 82 and include an opening on a radially inward portion, and accommodates a compression coil spring 84b and the engaging member 84a that are inserted in this order from the opening. The engaging member 84a is configured with a parallelepiped block-shaped member. The engaging member 84a includes, on a tip upper surface thereof, a tapered surface 84a1 abuttable against a tapered tip corner portion formed on a tip surface of the tip portion 12a of the center drill 12. The tip corner portion of the center drill 12 abuts against the tapered surface 84a1, so that the engaging member 84a moves in a radially outward direction against an urging force of the compression coil spring 84b. By further forward movement of the center drill 12, the engaging member 84a engages with the annular recess 12a1 by the urging force of the compression coil spring 84b, and the center drill 12 is held by the holding mechanism 84.

The flat plate member 9 is formed in an annular shape in a plan view, and is connected to the guide tube 8 in a state where the flat plate member 9 is mounted on the annular groove 41d formed at the accommodating recess 41a of the second split member 4. The flat plate member 9 includes a plurality of outer circumferential fixing bolt screwing holes 91 (four pieces in the present embodiment), each of which permits screwing of the outer circumferential fixing bolt G for fixing the guide tube 8 to the flat plate member 9. An annular protrusion 92 protruding toward the drilled hole Wa is formed on an outer edge portion of the flat plate member 9. Although the annular protrusion 92 is configured with an elastic member, such as rubber, fixed to an upper surface of the flat plate member 9 with an adhesive or the like, the annular protrusion 92 may be formed integrally with the flat plate member 9. The flat plate member 9 is not limited to the annular shape in the plan view, but may be formed in, for example, a rectangular shape in a plan view.

The flat plate member 9 is configured with one integrally-formed member in the present embodiment, but is preferably configured with a plurality of (for example, two) split plates. In cases where the flat plate member 9 is configured with the split plates, when inserting into the accommodating recess 41a of the second split member 4, one split plate is mounted on the annular groove 41d so as not to interfere with the water pipe W and then is rotated toward a lower side of the water pipe W, so that the other split plate can be mounted on the annular groove 41d so as not to interfere with the water pipe W. In cases where the flat plate member 9 is configured with a single member, it is necessary to insert the flat plate member 9 in a tilted state into the accommodating recess 41a of the second split member 4.

Next, a branch pipe formation method using the branch pipe forming apparatus 100 is described below with reference to FIGS. 6 to 19. With the present embodiment, a branch pipe 2 communicating with the water pipe W is formed by attaching a branch pipe forming apparatus 100 to a predetermined portion of a water pipe W. Then, a branch pipe 2 communicating with the water pipe W is formed by attaching another branch pipe forming apparatus 100 to another portion of the water pipe W. The water pipe W is replaced with the branch pipe 2 (new water pipe W) by removing the decrepit water pipe W located between these two branch pipe forming apparatuses 100.

Figure 7:
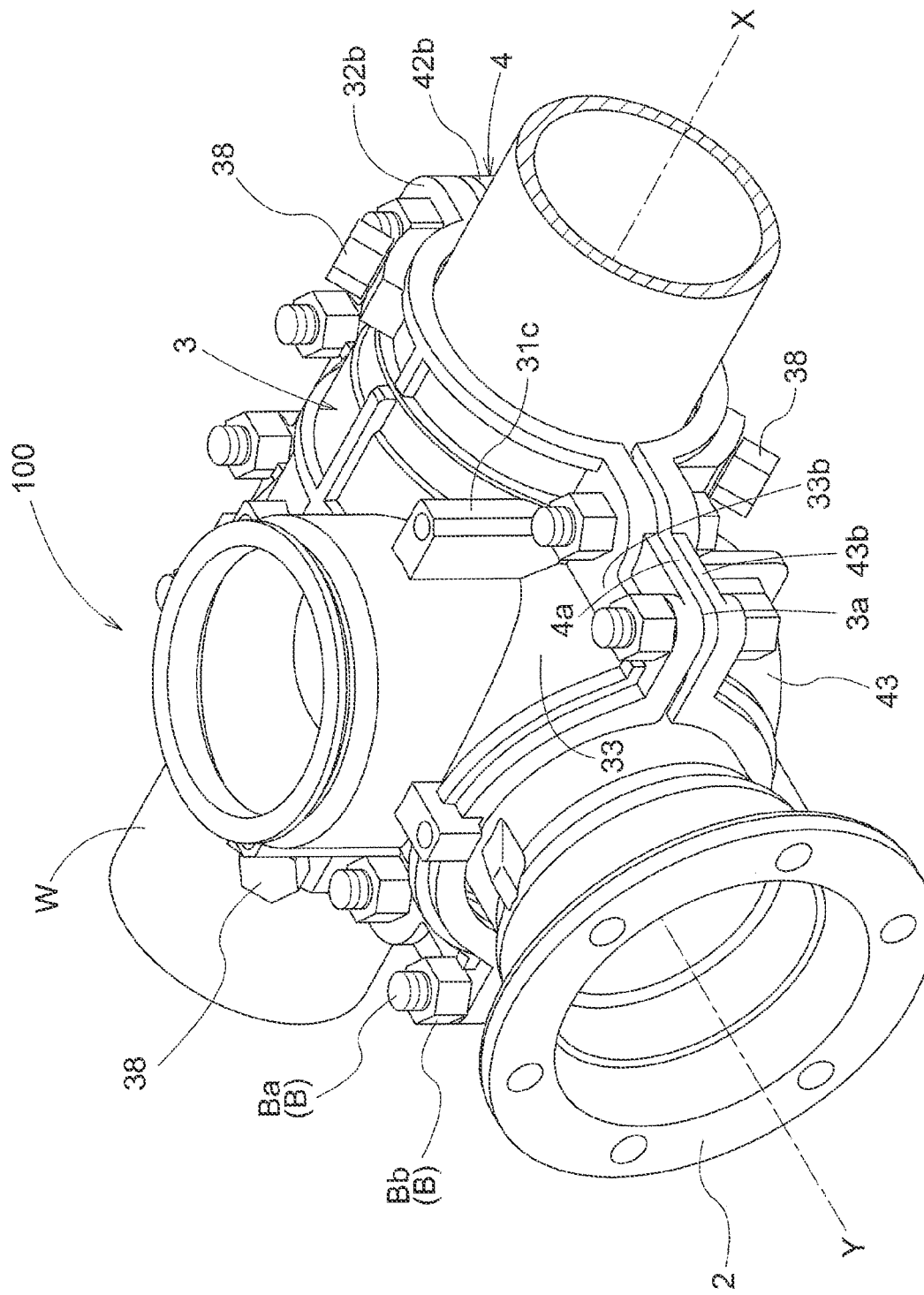
FIG. 7 is a perspective view illustrating a split member connection step.
Figure 15:
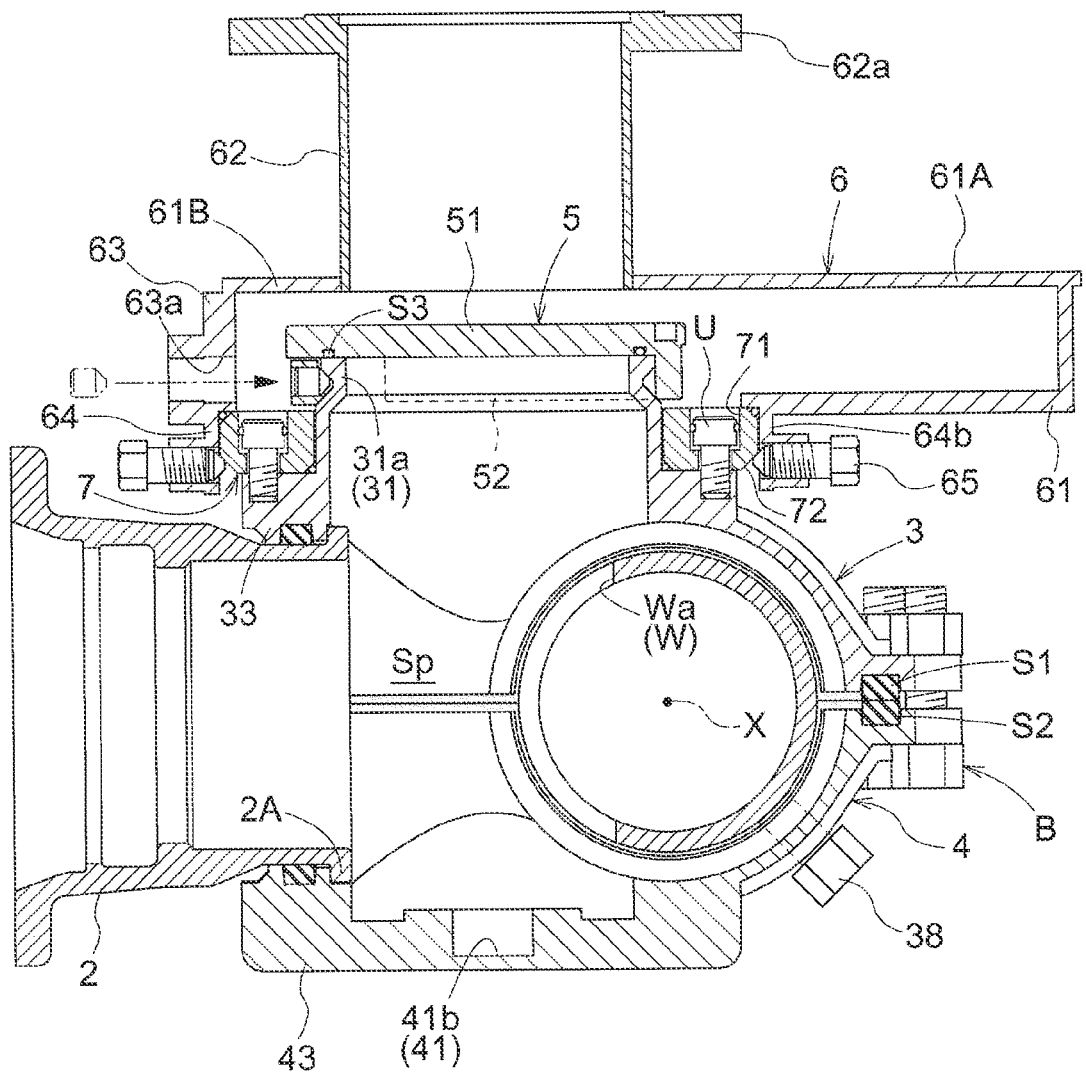
FIG. 15 is a sectional view illustrating the valve closing step.
Figure 16:
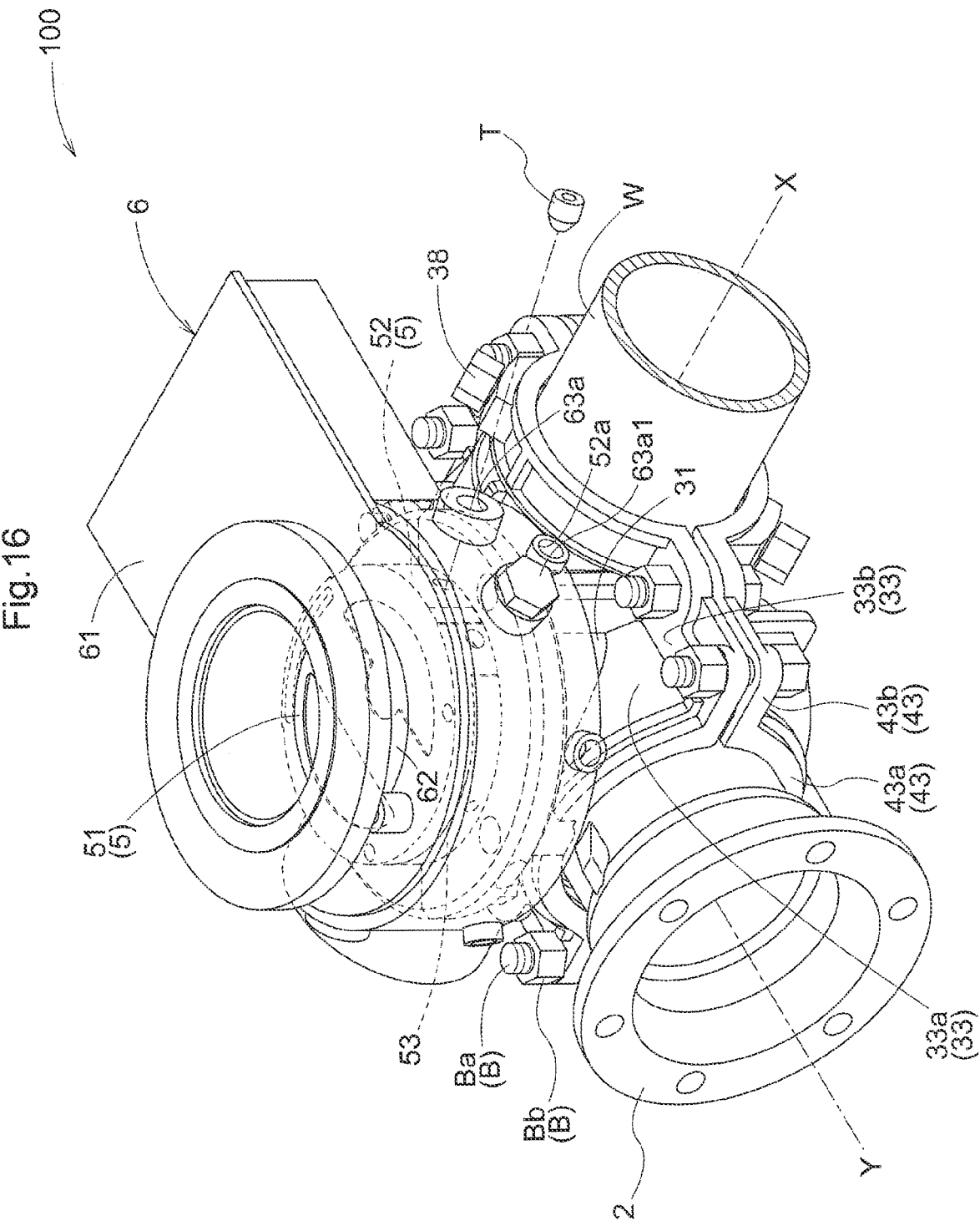
FIG. 16 is a perspective view illustrating a lid fixing step.
Figure 17:
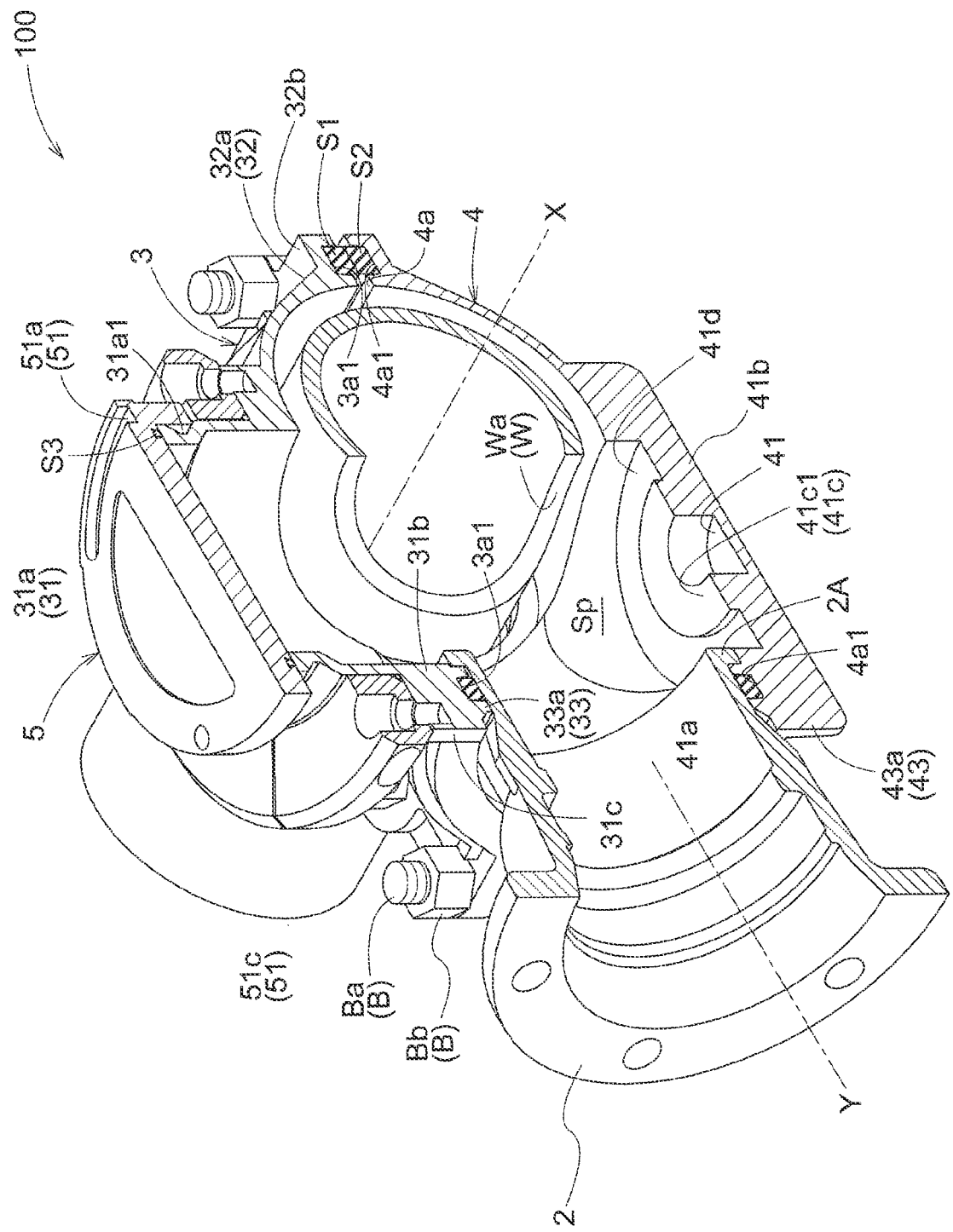
FIG. 17 is a cross-sectional perspective view obtained by cutting the branch pipe forming apparatus after removing a work equipment.
Figure 18:
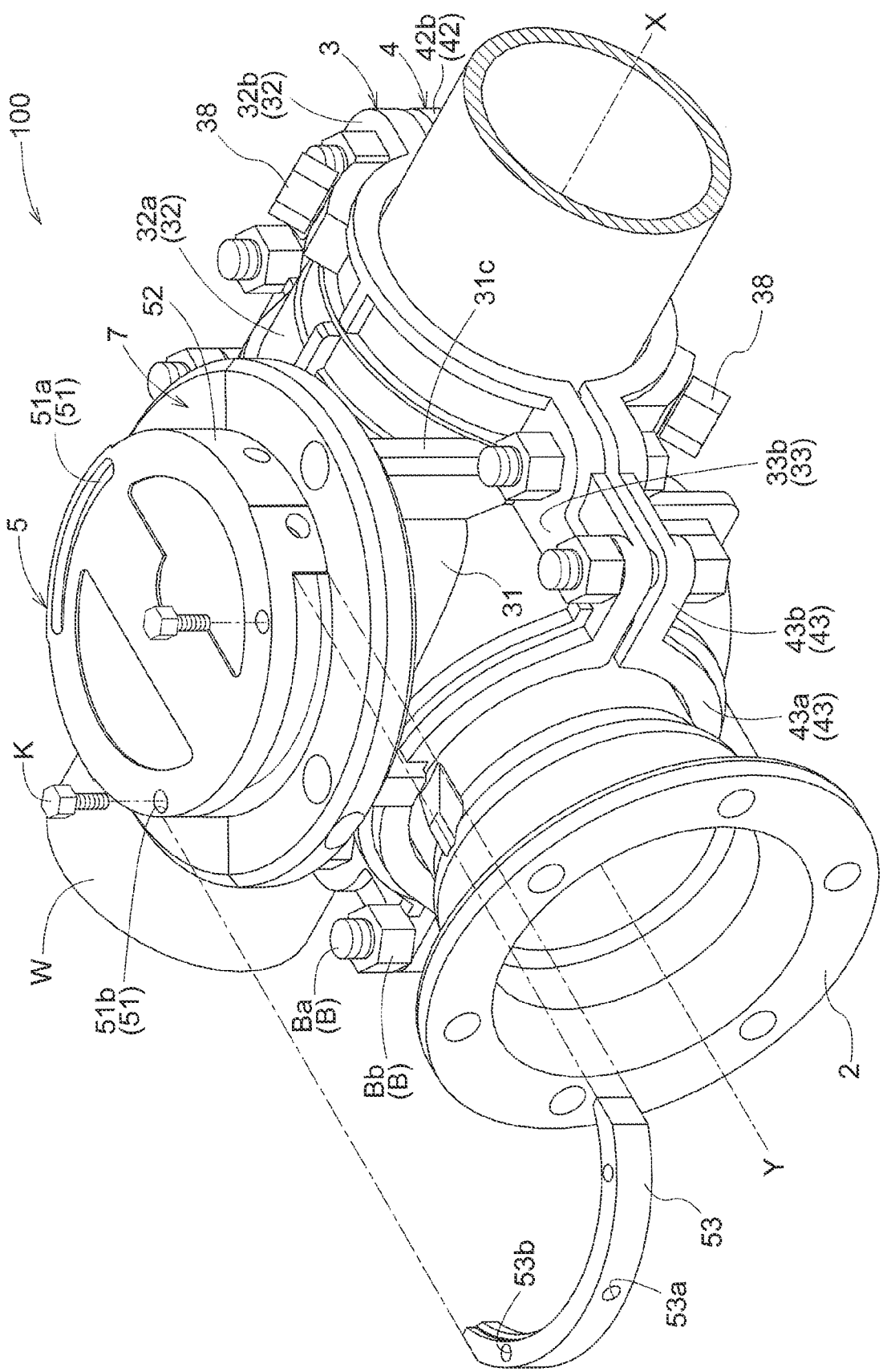
FIG. 18 is a perspective view illustrating a side wall piece fixing step.
Figure 19:
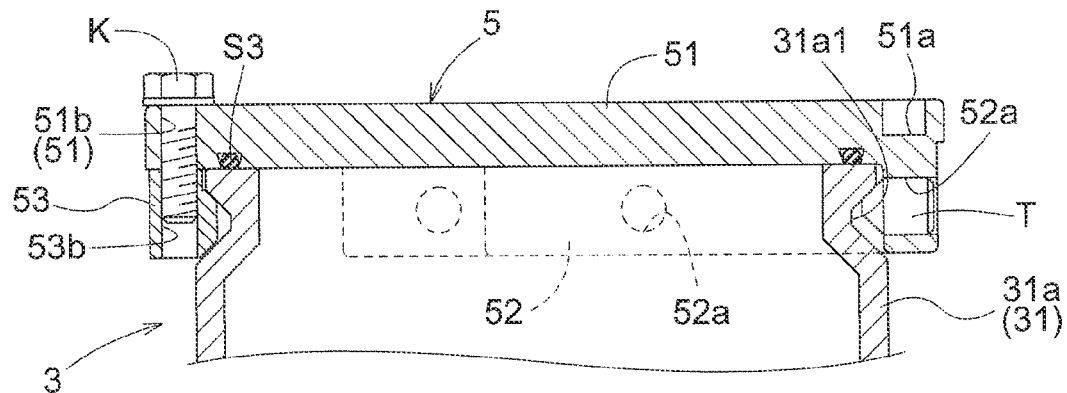
FIG. 19 is an enlarged sectional view illustrating a fixed state of a lid.

The branch pipe formation method in the present embodiment includes (1) a split member arrangement step illustrated in FIG. 6, (2) a split member connection step illustrated in FIG. 7, (3) an attachment fitting step illustrated in FIGS. 8 and 9, (4) a drilling step illustrated in FIGS. 10 to 12, (5) a valve closing step illustrated in FIGS. 13 to 15, (6) a lid fixing step illustrated in FIG. 16, (7) a valve casing removing step illustrated in FIGS. 17, and (8) a side wall piece fitting step illustrated in FIGS. 18 and 19.

(1) Split Member Arrangement Step

As illustrated in FIG. 6, the first split member 3 and the second split member 4 are arranged so that the split surface 3a of the first split member 3 and the split surface 4a of the second split member 4 extend along a plane including the axial center X of the water pipe W and the axial center Y of the branch pipe 2.

Specifically, firstly, the second split member 4 in which the second seal member S2 is fitted in the second seal groove 4a1 is disposed below the water pipe W, and the end flange 2A of the branch pipe 2 is disposed at the second coupling opening 43 of the second split member 4. If there is a receiving table by which the second split member 4 can be kept in a horizontal state, an operation to accommodate the flat plate member 9 and a guide tube 8 into a cutter accommodation space Sp in (2) the split member connection step described later may be carried out.

In a state where the water pipe W and the branch pipe 2 (including the flat plate member 9 and the guide tube 8 if there is the receiving table for the second split member 4) are arranged above the second split member 4, the first split member 3 in which a first seal member S1 is fitted in a first seal groove 3a1 (refer to FIG. 4) is brought near from above the second split member 4 so that the split surface 3a of the first split member 3 and the split surface 4a of the second split member 4 are opposite to each other. Thus, the first split member 3 and the second split member 4 that constitute the branch pipe forming apparatus 100 are configured with the split surfaces 3a and 4a along the plane including the axial center X of the water pipe W and the axial center Y of the branch pipe 2. It is therefore easy to fit the first split member 3 onto the second split member 4 in a state where the second split member 4 is disposed on a lower side in a vertical direction.

(2) Split Member Connection Step

As illustrated in FIGS. 6 and 7, in a state where the end flange 2A of the branch pipe 2 is held between the coupling openings 33 and 43 respectively in the first split member 3 and the second split member 4, the first split member 3 and the second split member 4 are connected to each other in a sealed state by a fastening member B. The fastening member B is disposed at the following eight portions in total: four portions at a first flange portion 32b of the first split member 3 and the second flange portion 42b of the second split member 4; and four portions at a first branch flange portion 33b of the first split member 3 and a second branch flange portion 43b of the second split member 4. By a fastening operation using the fastening members B, the first seal member S1 fitted in the first seal groove 3a1 of the first split surface 3a and a second seal member S2 fitted in the second seal groove 4a1 of the second split surface 4a are pressed against each other. This ensures that spacing between the first split member 3 and the second split member 4 can be tightly closed to achieve a sealed state against the water pipe W and the branch pipe 2 (also refer to FIG. 8). Then, the first split member 3 and the second split member 4 are positionally fixed unrotatably to the water pipe W by inserting the position fixing bolt 38 into a pair of through hole portions 32a1 of the first split member 3 and a pair of through hole portions 42a1 of the second split member 4.

Subsequently, as illustrated in FIG. 6, the flat plate member 9 and the guide tube 8 are accommodated in the cutter accommodation space Sp through the opening portion 31a of the tube part 31 of the first split member 3 or an opening of the branch pipe 2. Specifically, the flat plate member 9 is mounted on the annular groove 41d of the accommodating recess 41a of the second split member 4, and the flat plate member 9 is connected to the guide tube 8 with an outer circumferential fixing bolt G (also refer to FIG. 11). Then, the axial center holding bolt J previously inserted into a block part 83 of the guide tube 8 is fastened to cause the tip of the axial center holding bolt J to abut against a lower side in the vertical direction of the outer circumferential surface of the water pipe W (cut portion Wb) (also refer to FIG. 12). A connection operation of the flat plate member 9 and the guide tube 8 by using the outer circumferential bolt G, and the fastening operation of the axial center holding bolt J can be carried out from above while facing the cutter accommodation space Sp. Additionally, positioning of the guide tube 8 is easy because all one need to do is cause an end portion of the guide tube 8 to be engaged with the engaging recess 41b formed at a central portion of the accommodating recess 41a. In cases where the flat plate member 9 is configured with the split plates at the time of mounting the flat plate member 9, when inserting into the accommodating recess 41a of the second split member 4, one split plate is mounted on the annular groove 41d so as not to interfere with the water pipe W, and then is rotated toward a lower side of the water pipe W, so that the other split plate can be mounted on the annular groove 41d so as not to interfere with the water pipe W.

In the present embodiment, the first split member 3 and the second split member 4 that constitute the branch pipe forming apparatus 100 are configured with the split surfaces 3a and 4a along the plane including the axial center X of the water pipe W and the axial center Y of the branch pipe 2. This makes it possible to connect the first split member 3 to the second split member 4 by operating the fastening member B from above, thereby enhancing operating efficiency. In other words, this eliminates the need for a bolt fastening operation below the water pipe W and the branch pipe 2. Additionally, the end flange 2A of the branch pipe 2 is held in the sealed state at the coupling openings 33 and 43 respectively in the first split member 3 and the second split member 4. Hence, even if a bending force and a tensile force are exerted on the branch pipe 2 due to an earthquake or the like, it becomes possible to receive a load by the first split member 3 and the second split member 4, thereby reducing the load exerted on the fastening member B. Even if the bending force and the tensile force are exerted on the branch pipe 2 due to the earthquake or the like, the branch pipe 2 can be flexibly subjected to micromovement, thereby reducing the load exerted on the coupling openings 33 and 43. Particularly, because the first split member 3 and the second split member 4 that constitute the branch pipe forming apparatus 100 are configured with the split surfaces 3a and 4a along the plane including the axial center X of the water pipe W and the axial center Y of the branch pipe 2, there is no joint in the perpendicular direction, thus leading to high strength against the load (tensile force) in the axial center Y direction of the branch pipe 2. This leads to the branch pipe forming apparatus 100 excellent in seismic performance.

(3) Attachment Fitting Step

As illustrated in FIGS. 8 and 9, in a state where the attachment 7 having a two-split structure is individually mounted on the seating surfaces 31c2 of a plurality of columnar portions 31c formed on the tube part 31 of the first split member 3, the embedded bolt U inserted into the fixing through hole 71 of the attachment 7 is screwed into the hole portion 31c1 of the columnar portion 31c. Because these seating surfaces 31c2 are arranged on the same flat surface so as to keep the attitude of the attachment 7 horizontally, it is easy to carry out a fixing operation of the attachment 7 to the first split member 3. Additionally, because the first split member 3 and the second split member 4 that constitute the branch pipe forming apparatus 100 are configured with the split surfaces 3a and 4a along the plane including the axial center X of the water pipe W and the axial center Y of the branch pipe 2, the attachment 7 can be fixed by operating the embedded bolt U from above.

(4) Drilling Step

As illustrated in FIGS. 10 to 12, the drilling step includes a drilling machine fitting step of fitting the drilling machine 1 to the first split member 3, a branch flow path closing step of closing the gate valve V disposed in the branch pipe 2 (refer to FIG. 3), and a drilled hole formation step of forming the drilled hole Wa at a position adjacent to the cutter accommodation space Sp by moving the hole saw 11 of the drilling machine 1 to the cutter accommodation space Sp formed between the first split member 3 and the second split member 4.

In the drilling machine fitting step, the valve casing 6 is fixed to the attachment 7 (first split member 3), and the drilling machine 1 is fitted to the valve casing 6. When fixing the valve casing 6 to the attachment 7, the valve box fixing bolt 65 is screwed into the valve fixing through hole 64a of the valve casing extending part 64 of the valve casing 6 so as to cause the tip portion of the valve casing fixing bolt 65 to abut against the annular tapered surface 72 on the lower side of the attachment 7. Consequently, the annular protrusion 64b of the valve casing 6 and the valve casing fixing bolt 65 hold the attachment 7 therebetween so as to fix the valve casing 6 to the attachment 7. Subsequently, the valve casing flange 62a of the valve casing tube part 62 and the drilled hole flange 14a of the drilling case 14 of the drilling machine 1 are fixed together by a bolt and a nut, and the drilling machine 1 is fitted on the first split member 3 through the valve casing 6.

In the branch flow path closing step, the gate valve V disposed in the branch pipe 2 is closed to prevent the flow path from being changed from the water pipe W to the branch pipe 2 through the drilled hole Wa formed by a subsequent drilled hole formation step (refer to FIG. 3). Thus, the gate valve V is disposed in the branch pipe 2 held between the coupling openings 33 and 43, and the drilled hole Wa is formed after the branch flow path of the branch pipe 2 is closed by closing the gate valve V. Therefore, a piping construction for downstream of the gate valve V can be carried out in advance. That is, it becomes possible to form the drilled hole Wa in the water pipe W at arbitrary timing without causing trouble to the piping construction, thus leading to high operating efficiency.

In the drilled hole formation step, the rotary drive mechanism 13 causes the hole saw 11 and the center drill 12 to move forward in a downward direction while rotating, so that a part (lateral surface) of the outer circumferential surface of the water pipe W can be cut out to form a drilled hole Wa by the cutting tip 11a of the hole saw 11 while the center drill 12 is inserted into the guide tube 8. The cut portion Wb generated by the formation of the drilled hole Wa is held by being sandwiched between the circumferential wall through hole 81a formed on the circumferential wall part 81 of the guide tube 8 and the inner circumferential surface of the hole saw 11. Hereat, the axial center holding bolt J abuts against the lower side in the vertical direction on the outer circumferential surface of the water pipe W (cut portion Wb). This prevents the shaft misalignment of the drilling machine 1, and also surely prevents the cut portion Wb from falling. Additionally, the first split member 3 includes the tube part 31 having an opening that permits passage of the hole saw 11, and the split surfaces 3a and 4a in the first split member 3 and the second split member 4 extend along the plane including the axial center X of the water pipe W and the axial center Y of the branch pipe 2. Therefore, as compared with the case where the split surfaces 3a and 4a are perpendicular to the plane, the vibration of the drilling machine 1 does not directly act on the split surfaces 3a and 4a, resulting in less shaft misalignment of the cutter in a drilling operation. Furthermore, because the annular protrusion 92 is formed on the outer edge portion of the flat plate member 9, it becomes possible to accommodate chips in the internal space of the annular protrusion 92, thereby preventing the chips from flowing in the water pipe W and the branch pipe 2.

Also after the drilled hole Wa is formed, the rotary drive mechanism 13 causes the hole saw 11 and the center drill 12 to move forward in a downward direction, the tip corner portion of the center drill 12 abuts against the tapered surface 84a1 of the engaging member 84a, so that the engaging member 84a moves in a radially outward direction against the urging force of the compression coil spring 84b. Then, the rotary drive mechanism 13 causes the hole saw 11 and the center drill 12 to further move forward in the downward direction, so that the engaging member 84a engages with the annular recess 12a1 by the urging force of the compression coil spring 84b, and the center drill 12 is held by the holding mechanism 84 of the guide tube 8. In this state, the rotary drive mechanism 13 causes the hole saw 11 and the center drill 12 to move backward in an upward direction, the flat plate member 9 mounted on the annular groove 41d formed at the accommodating recess part 41a of the second split member 4, and the guide tube 8 fixed to the flat plate member 9 are moved upward together with the center drill 12. Consequently, the drilling machine 1, the flat plate member 9 and the guide tube 8 together with the cut portion Wb can be moved above the lid member 5 accommodated in the valve casing 6.

(5) Valve Closing Step

As illustrated in FIGS. 13 to 15, the valve closing step includes closing the opening of the tube part 31 by moving the lid member 5 accommodated in the valve casing 6 to the tube part 31 of the first split member 3. Specifically, firstly, by rotating the end portion of the valve operation member Vk from one end of the long groove 51a to the other end, the lid member 5 is slidingly moved in the valve casing 6, so that a part of the bottom wall 51 on which part the side wall 52 is not present can pass through the opening portion 31a of the tube part 31. Thus, because of the part of the bottom wall 51 on which part the side wall 52 is not present, it is possible to cause the part on which the side wall 52 is not present to pass through the opening portion 31a of the tube part 31. Therefore, the lid member 5 as the valve element can be slidingly moved by the valve operation member Vk. Subsequently, the outer edge portion of the lid member 5 is pushed by a push bolt P screwed into a push bolt through hole 63b of the valve casing fixing part 61B. Consequently, the annular seal member S3 disposed on the inner surface of the outer edge portion of the bottom wall 51 of the lid member 5 is in close contact with the upper surface of the opening portion 31a of the tube part 31, thereby ensuring that the lid member 5 seals the tube part 31 of the first split member 3. Accordingly, the interior of the first split member 3 and the interior of the second split member 4 are sealed, so that the drilling machine 1 can be removed.

The drilling machine removal step is set between (5) the valve closing step and (6) the lid fixing step in the present embodiment. In the drilling machine removal step, after the outer edge portion of the lid member 5 is pushed by the push bolt P so as to seal the interior of the first split member 3 and the interior of the second split member 4, the drilling machine 1, the flat plate member 9 and the guide tube 8 are removed together with the cut portion Wb (refer to FIG. 12). That is, after the drilling machine 1, the flat plate member 9 and the guide tub e8 are moved together with the cut portion Wb to a higher position than the lid member 5, the bolt and the nut used for fixing the flange 14a of the drilling case 14 and the valve casing flange 62a are removed, and the drilling machine 1, the flat plate member 9 and the guide tube 8 are removed together with the cut portion Wb. Thus, the valve casing 6 and the attachment 7 remain as a work equipment as illustrated in FIG. 15. Alternatively, the drilling machine removal step may be carried out in (7) the valve casing removal step described later.

(6) Lid Fixing Step

As illustrated in FIG. 16, the lid fixing step includes fixing the lid member 5 to the tube part 31 by causing the tip of the abutting bolt T to bite into the annular recess 31a1 of the tube part 31 of the first split member 3 (also refer to FIG. 19). Specifically, the closing bolt 63a1 of the operation through hole 63a is removed to insert an operation tool (not illustrated), and the abutting bolt T configured with the hex socket head cap bolt is screwed into the screw hole 52a formed on the side wall 52 of the lid member 5 by operating the operation tool from the outside of the valve casing 6 (also refer to FIG. 19). Then, the tip of the abutting bolt T bites into the annular recess 31a1 so as to fix the lid member 5 to the tube part 31 of the first split member 3. The abutting bolt T may be temporarily screwed in advance into the side wall 52 of the lid member 5, and then may be finally screwed by the operation tool. Alternatively, in a state where the abutting bolt T is fitted on the tip of the operation tool, the abutting bolt T may be inserted into the operation through hole 63a so as to be screwed into the screw hole 52a formed on the side wall 52 of the lid member 5. Thus, if the lid member 5 serving as a closing lid is fixed to the tube part 31, all one need to do is operate the abutting bolt T from the outside so as to be screwed into the screw hole 52a. Hence, operating efficiency is extremely high.

(7) Valve Casing Removal Step

As illustrated in FIG. 17, the valve casing removal step includes removing the valve casing 6 fixed to the attachment 7 fixed to the first split member 3, so that the branch pipe forming apparatus 100 including the attachment 7 is left. Specifically, the step includes removing the valve casing fixing bolt 65 that fixes the valve casing 6 to the attachment 7 (also refer to FIG. 12). At this time, the spacing between the first split member 3 and the second split member 4 is tightly closed to achieve the sealed state of the branch pipe forming apparatus 100 against the water pipe W and the branch pipe 2 by (2) the split member connection step, and the lid member 5 fixed to the tube part 31 in (6) the lid fixing step closes the interior of the first split member 3 and the interior of the second split member 4, thereby eliminating the possibility that water leaks outside the branch pipe forming apparatus 100.

(8) Side Wall Piece Fitting Step

As illustrated in FIGS. 18 and 19, the side wall piece fitting step includes fitting the side wall piece 53 to a portion of the outer edge portion of the bottom wall 51 of the lid member 5 on which portion the side wall 52 is not present. In the side wall piece fitting step, it is preferable to remove the attachment 7 after fitting the side wall piece 53, without removing the attachment 7 in (7) the valve casing removal step. This makes it possible to insert the side wall piece 53 into the lid member 5 along the upper surface of the attachment 7.

After inserting the side wall piece 53 into a portion of the outer edge portion of the bottom wall 51 of the lid member 5 on which portion the side wall 52 is not present, the fixing bolt K is inserted from the through hole 51b of the bottom wall 51 so as to be screwed into the second screw hole 53b, thereby integrating the side wall piece 53 with the lid member 5. Subsequently, by screwing the abutting bolt T into the first screw hole 53a, the tip of the abutting bolt T bites into the annular recess 31a1, so that the side wall piece 53 is fixed to the tube part 31 of the first split member 3. Then, the attachment 7 having the split structure is sequentially removed by removing the embedded bolt U that fixes the attachment 7 to the columnar portion 31c of the first split member 3. Thus, the side wall piece 53 fitted in the portion of the outer edge portion of the bottom wall 51 on which portion the side wall 52 is not present contributes to stabilizing a fixed attitude of the lid member 5 as a closing lid. Further, the lid member 5 as the closing lid can be firmly fixed by inserting the fixing bolt K into the through hole 51b of the bottom wall 51 so as to fix the side wall piece 53. The fixing bolt K can be operated from above by forming the through hole 51b on the bottom wall 51, thereby enhancing operating efficiency.

Other Embodiments

Other embodiments are described below by illustrating only configurations different from those of the branch pipe forming apparatus 100 in the foregoing embodiment. In order to facilitate understanding, configurations similar to those of the branch pipe forming apparatus 100 in the foregoing embodiment are described by using similar reference numerals to denote similar parts.

(1) In the foregoing embodiment, an end portion of the circumferential wall part 81 of the guide tube 8 is engaged with the engaging recess 41b formed on the bottom part 41 of the second split member 4. Instead of this, a recess may be disposed at the end portion of the circumferential wall part 81 of the guide tube 8, a protrusion (engaging protrusion) may be formed at the bottom part 41 of the second split member 4, and these recess and protrusion may be engaged with each other.

(2) The long groove 51a with which the end portion of the valve operation member Vk engages is disposed on the outer surface of the bottom wall 51 of the lid member 5, and the lid member 5 is slidingly moved by the valve operation member Vk in the foregoing embodiment. Alternatively, a tip of a pusher member may be engaged with an engaging groove disposed on the side wall 52 of the lid member 5, and the lid member 5 may be slidingly moved by the pusher member.

Figure 20:
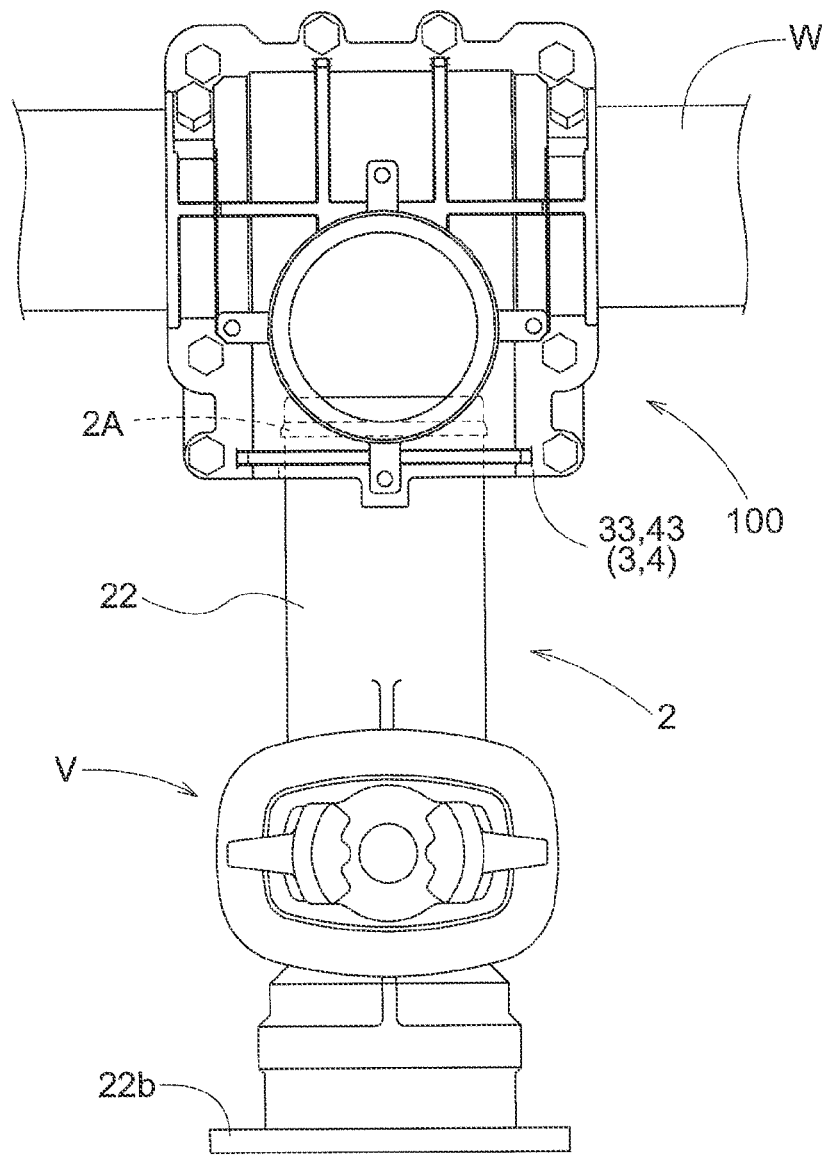
FIG. 20 is a plan view illustrating a state where the branch pipe forming apparatus is fitted on a water pipe.

(3) As illustrated in FIG. 20, the end flange 2A of the branch pipe 2 is held by the coupling openings 33 and 43 respectively in the first split member 3 and the second split member 4. The branch pipe 2 in the present embodiment includes the end flange 2A at the end portion of the coupling pipe 22 including the gate valve V while omitting the short pipe 21 in the foregoing embodiment. Other coupling pipe (not illustrated) is connected to the flange 22b on the side opposite to the end flange 2A of the coupling pipe 22.

Figure 21:
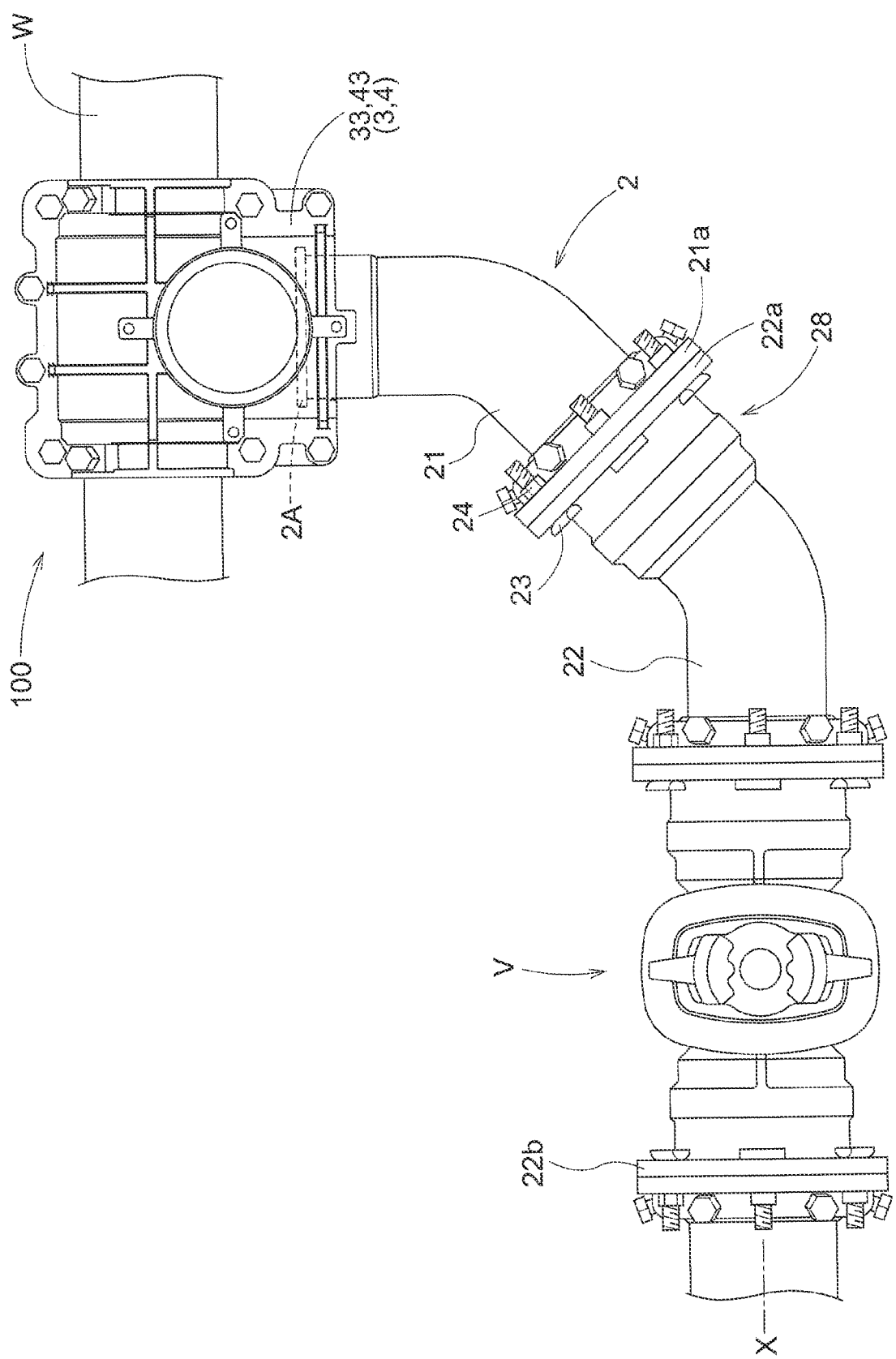
FIG. 21 is a plan view illustrating a state where the branch pipe forming apparatus is fitted on a water pipe.

(4) As illustrated in FIG. 21, the branch pipe 2 is configured with a bent pipe including a pipe joint 28, and the end flange 2A of the branch pipe 2 is held by the coupling openings 33 and 43 respectively in the first split member 3 and the second split member 4. In the branch pipe 2 in the present embodiment, the short pipe 21 and the coupling pipe 22 including the gate valve V are connected to each other by the pipe joint 28. Other coupling pipe is connected to the flange 22b on a side opposite to the pipe joint 28 of the coupling pipe 22.

(5) The existing pipe in the foregoing embodiment is not limited to the water pipe W, but it may be other fluid pipe.

Figure 22:
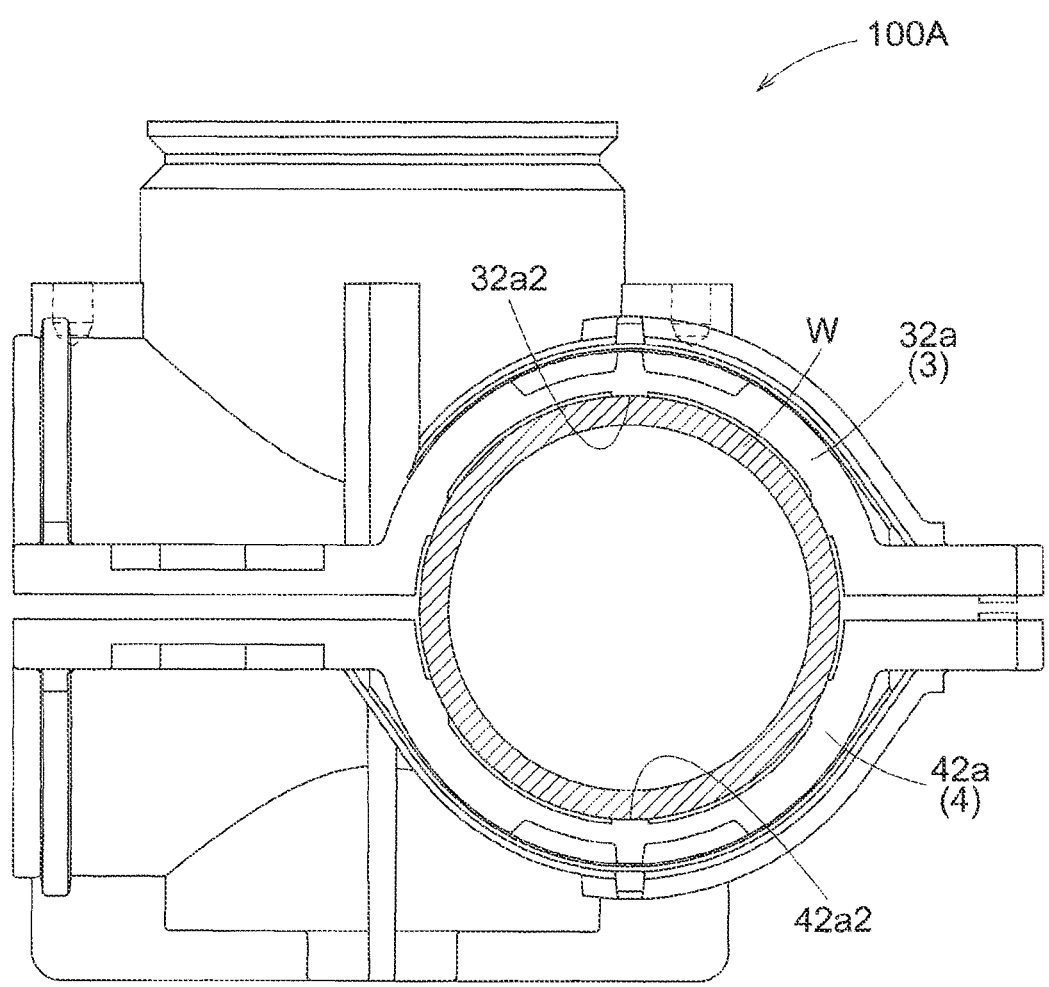
FIG. 22 is a side view of a branch pipe forming apparatus in a different embodiment 1.

(6) FIG. 22 illustrates a side view of a branch pipe forming apparatus 100A in a different embodiment 1. In the foregoing embodiment, the branch pipe forming apparatus 100 is unrotatably positionally fixed to the water pipe W by the position fixing bolt 38 whose tip abuts against the outer circumferential surface of the water pipe W. Instead of this, as illustrated in FIG. 22, a plurality of detent protrusions 32a2 and 42a2 (six pieces in the present embodiment) may be disposed on an inner circumferential surface of each of the first curved portion 32a of the first split member 3 and the second curved portion 42a of the second split member 4. These detent protrusions 32a2 and 42a2 are preferably disposed at equal intervals along the outer circumferential surface of the water pipe W. These detent protrusions 32a2 and 42a2 may have a rib shape integrally swelled from the internal surface of the first curved portion 32a and the internal surface of the second curved portion 42a, or alternatively may be a different member, such as a wedge and a screw fixed to a concave-shape groove on the internal surface of the first curved portion 32a and the internal surface of the second curved portion 42a.

Figure 23:
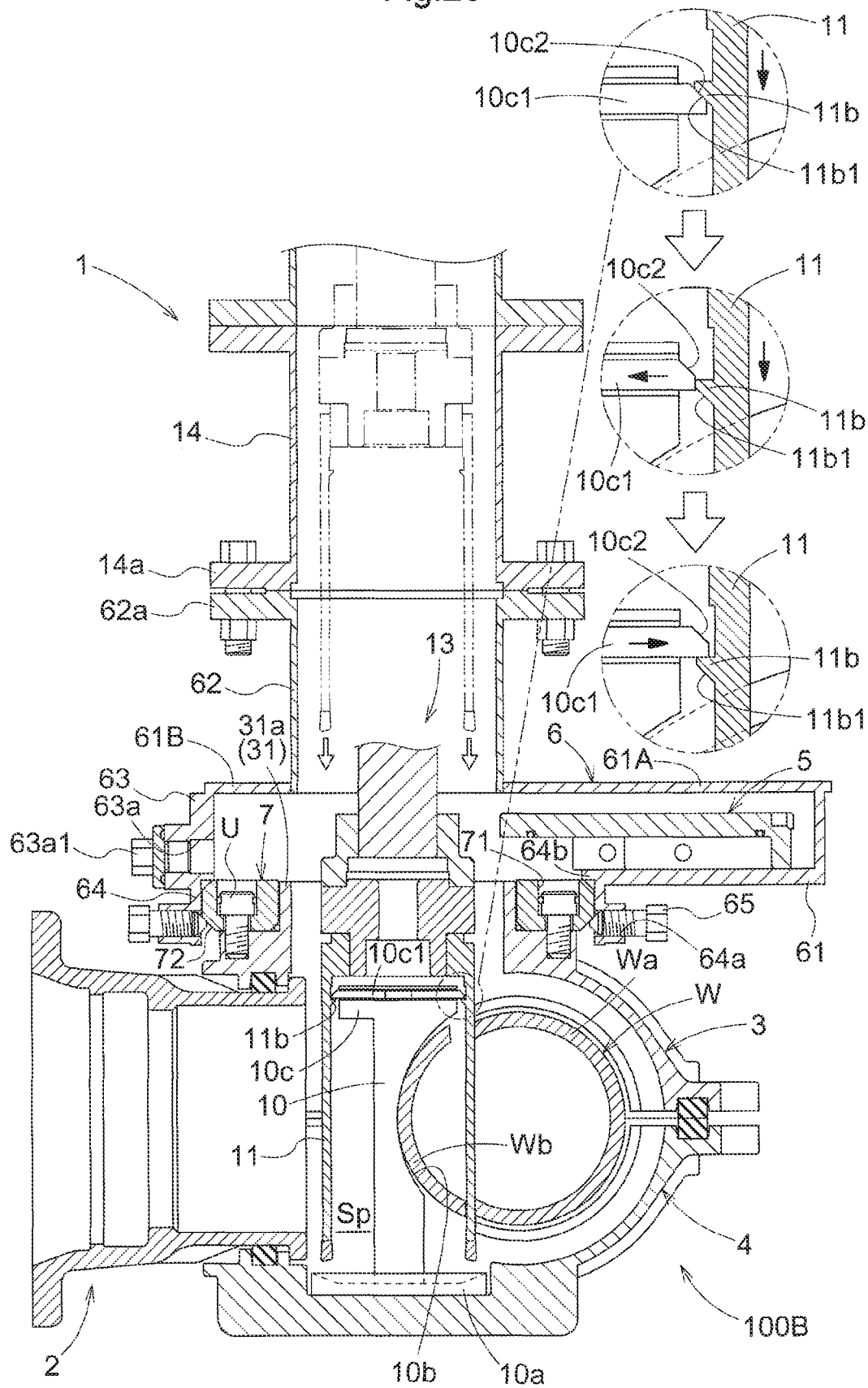
FIG. 23 is a sectional view illustrating a drilling step using a branch pipe forming apparatus in a different embodiment 2.

(7) FIG. 23 illustrates a sectional view illustrating a drilling step using a branch pipe forming apparatus 100B in a different embodiment 2. The branch pipe forming apparatus 100 in the foregoing embodiment includes the guide tube 8 to guide the center drill 12 of the drilling machine 1. Instead of this, as illustrated in FIG. 23, the center drill 12 of the drilling machine 1 may be omitted, and a rotation axis of the hole saw 11 may be arranged in an outer circumferential tangential direction of the water pipe W. The guide tube 8 and the flat plate member 9 connected to the guide tube 8 may be replaced with a cutter guide member 10 disposed inside the hole saw 11 and a flat plate member 10a integrally formed at one end (tip) of the cutting guide member 10. A curved recess 10b along the outer circumferential surface of the water pipe W is formed at an intermediate portion of the cutter guide member 10, and an annular flange 10c is formed at the other end (basal end) of the cutter guide member 10. Further, an engaging member 11b projecting annularly inward is formed inside the hole saw 11, and an engaged portion 10c1 engageable with the engaging member 11b is formed on the annular flange 10c. The engaged portion 10c1 may be a lock ring fitted on the annular flange 10c, or alternatively may be a block-shaped member urged by an elastic member, such as a spring. The hole saw 11 moves in a downward direction while rotating, so that an inclined surface 11b1 of the engaging member 11b abuts against an inclined surface 10c2 of the engaged portion 10c1, and the engaged portion 10c1 moves radially inward. Consequently, after the hole saw 11 passes through the annular flange 10c, the engaged portion 10c1 moves radially outward and the engaging member 11b and the engaged portion 10c1 engage with each other. Because the flat plate member 10a has a similar shape to the foregoing flat plate member 9, a detailed description thereof is omitted here. With the present embodiment, the hole saw 11 can be located closer to the water pipe W by omitting the center drill 12 of the drilling machine 1, and a cutting operation can be carried out at an opening width corresponding to a cutter diameter of the hole saw 11. That is, it is possible to decrease the cutter diameter of the hole saw 11, and the branch pipe forming apparatus 100B can be downsized by reducing the cutter accommodation space Sp.

In the split member connection step, the cutter guide member 10 is accommodated in the cutter accommodation space Sp through the opening portion 31a of the tube part 31 of the first split member 3 or the opening of the branch pipe 2. The cutter guide member 10 may be configured with a split body to facilitate accommodation in the cutter accommodation space Sp. In the drilled hole formation step, the rotary drive mechanism 13 causes the hole saw 11 to rotate and move forward in a downward direction, so that a part (lateral surface) of the outer circumferential surface of the water pipe W can be cut out to form a drilled hole Wa by a cutting tip 11a of the hole saw 11 while the hole saw 11 is externally inserted into the cutting guide member 10. At this time, the engaged portion 10c1 abuts against the inner circumferential surface of the hole saw 11, thereby reducing vibration of the hole saw 11. The cut portion Wb generated by forming the drilled hole Wa is held by being sandwiched between the curved recess 10b of the cutter guide member 10 and the inner circumferential surface of the hole saw 11. The rotary drive mechanism 13 causes the hole saw 11 to move forward in the downward direction also after the drilled hole Wa is formed, so that the engaging member 11b of the hole saw 11 and the engaged portion 10c1 engage with each other, and the hole saw 11 is held by the cutter guide member 10. In this state, the rotary drive mechanism 13 causes the hole saw 11 to move backward in an upward direction, so that the cutter guide member 10 holding the cut portion Wb moves together with the hole saw 11 in the upward direction.

Figure 24:
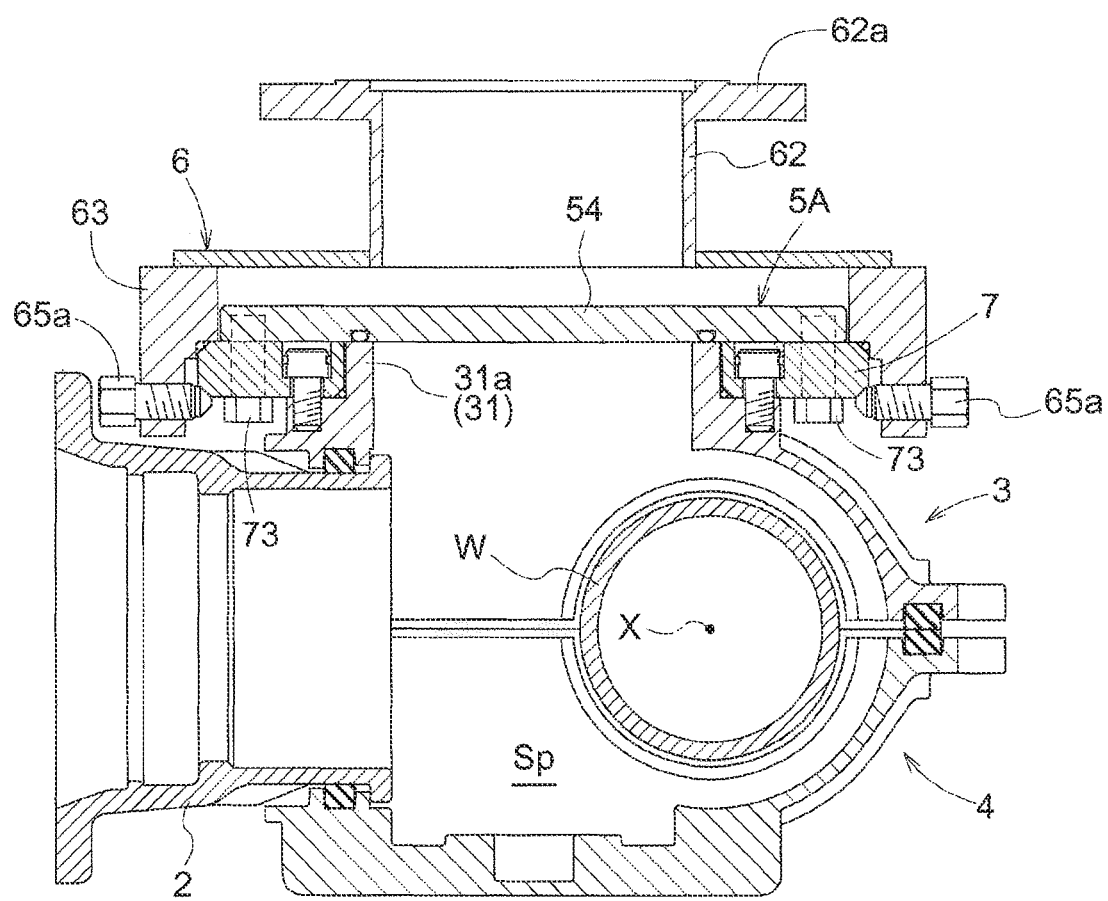
FIG. 24 is a sectional view illustrating a valve closing step using a valve lid in a different embodiment 3.

(8) FIG. 24 illustrates a sectional view illustrating the valve closing step using the lid member 5A in a different embodiment 3. In the foregoing embodiment, the lid member 5 to close the opening portion 31a of the tube part 31 of the first split member 3 includes the bottom wall 51 and the side wall 52 standing on the outer edge portion of the bottom wall 51. Instead of this, as illustrated in FIG. 24, the lid member 5A may be configured with a flat plate member 54 that does not include the side wall 52 and has a circular shape in a plan view. In the present embodiment, the attachment 7 serves as a detachable flange, and the lid member 5A is fixed to the attachment 7 by a lid fastening member 73 configured with a bolt or the like. The lid member 5A serves as a valve element to block a flow path of the tube part 31 as a pipeline, and also serves as a closing lid to close the tube part 31. In the present embodiment, the first split member 3 and the attachment 7 are separate elements. This eliminates the need for the flange formed integrally with the first split member 3 in order to fix the lid element 5A, and contributes to reducing manufacturing costs.

Figure 25:
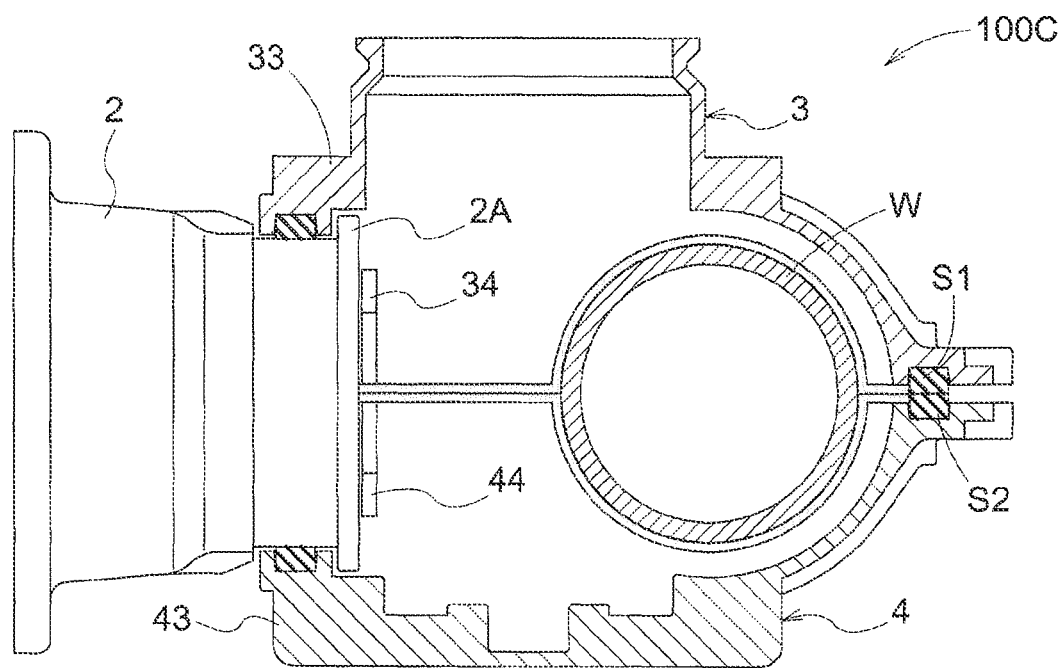
FIG. 25 is a sectional view illustrating a state where a branch pipe is fitted on a branch pipe forming apparatus in a different embodiment 4.
Figure 26:
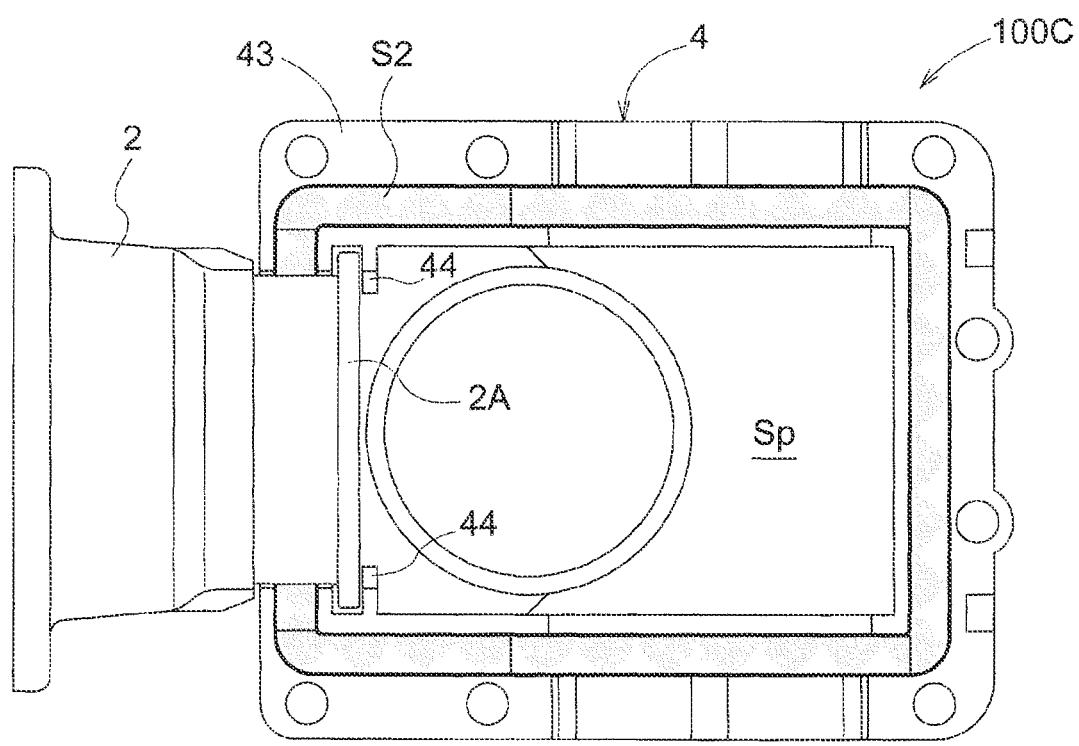
FIG. 26 is a plan view of a second split member illustrating the state where a branch pipe is fitted on a branch pipe forming apparatus in the different embodiment 4.

(9) FIGS. 25 and 26 respectively illustrate a sectional view illustrating a state where the branch pipe 2 is fitted on a branch pipe forming apparatus 100C in a different embodiment 4, and a plan view of the second split member 4. The branch pipe forming apparatus 100C in the present embodiment includes abutting protrusions 34 and 44 that abut against the end flange 2A. The abutting protrusions 34 and 44 are protrudingly formed from an internal surface to an inner side (toward the cutter accommodation space Sp) at the coupling openings 33 and 43 respectively in the first split member 3 and the second split member 4 in order to prevent movement of the branch pipe 2 to the cutter accommodation space Sp. These abutting protrusions 34 and 44 are formed by a curved member protruded inward from a pair of side walls of the coupling openings 33 and 43 along the end flange 2A, and are configured so as not to block a flow of water in a branch flow path of the branch pipe 2. Because the coupling openings 33 and 43 firmly hold therebetween the end flange 2A of the branch pipe 2 in a sealed state in the present embodiment, it is possible to prevent the branch pipe 2 from entering toward the cutter accommodation space Sp even if a bending force and a pressing force are exerted on the branch pipe 2 due to an earthquake or the like.

Figure 27:
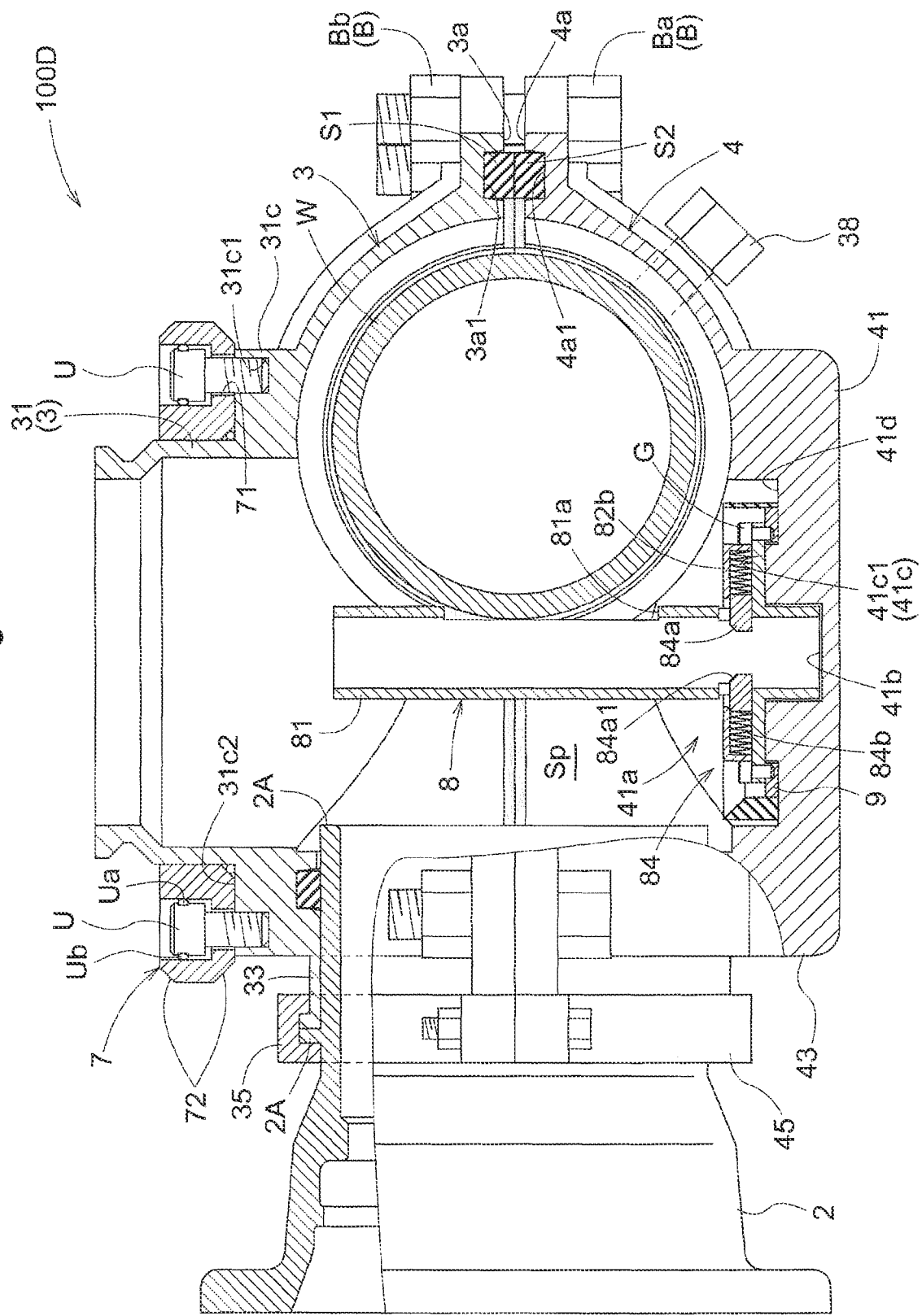
FIG. 27 is a sectional view illustrating a state where a branch pipe is fitted on a branch pipe forming apparatus in a different embodiment 5.

(10) FIG. 27 illustrates a sectional view illustrating a state where the branch pipe 2 is fitted on a branch pipe forming apparatus 100D in a different embodiment 5. In the foregoing embodiment, the end flange 2A of the branch pipe 2 is accommodated in an inner side of the coupling openings 33 and 43 (near the cutter accommodation space Sp). Instead of this, as illustrated in FIG. 27, the branch pipe 2 is inserted into the coupling openings 33 and 43, specifically, the end flange 2A of the branch pipe 2 may be disposed outside the coupling openings 33 and 43, and a pair of fixing members 35 and 45 for fixing the end flange 2A may be fitted in the pair of coupling openings 33 and 43. With the present embodiment, the branch pipe 2 is attachable and detachable without disassembling the branch pipe forming apparatus 100D.

Figure 28:
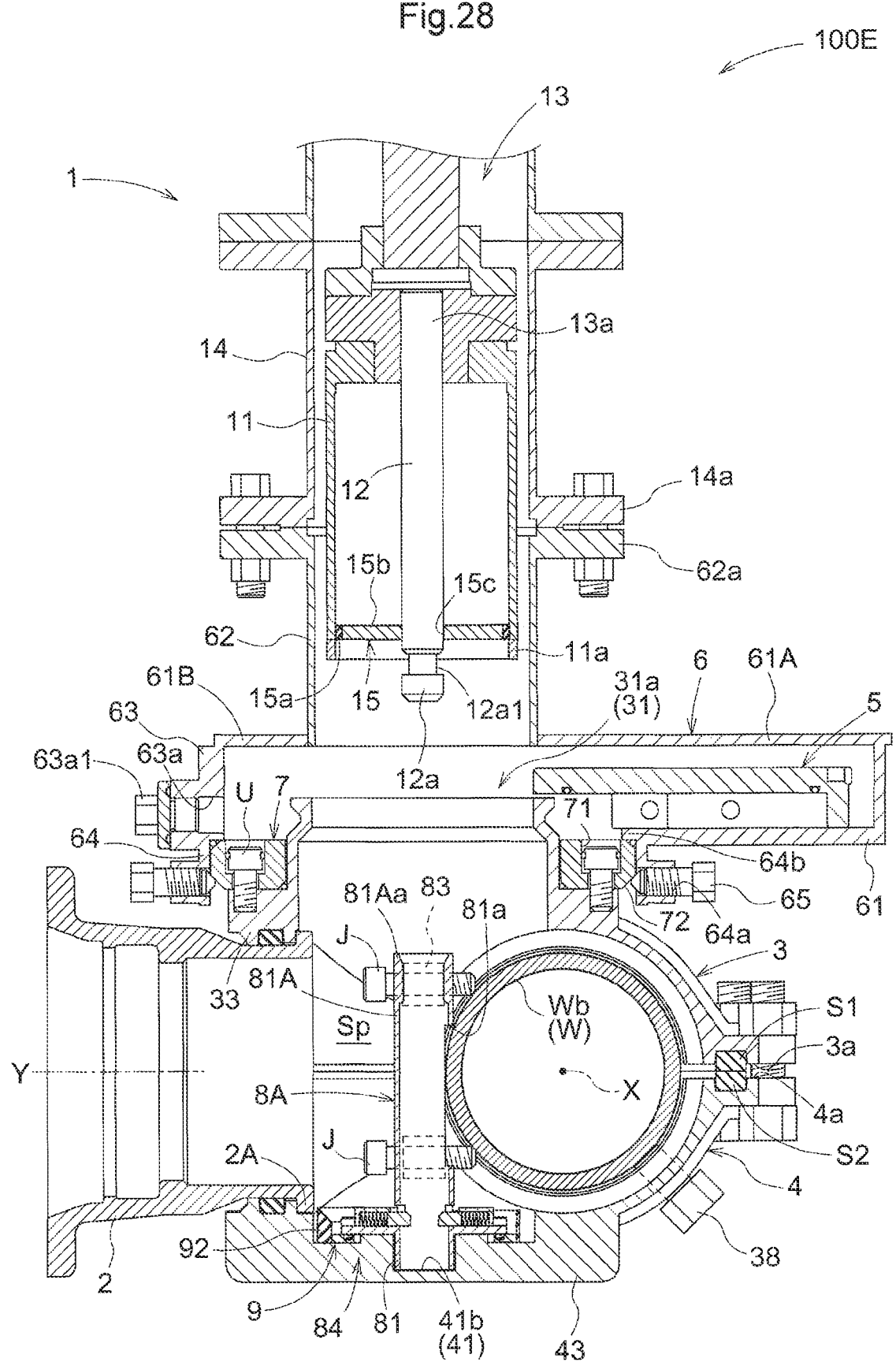
FIG. 28 is a sectional view illustrating a state where a drilling machine is fitted on a branch pipe forming apparatus in a different embodiment 6.
Figure 29:
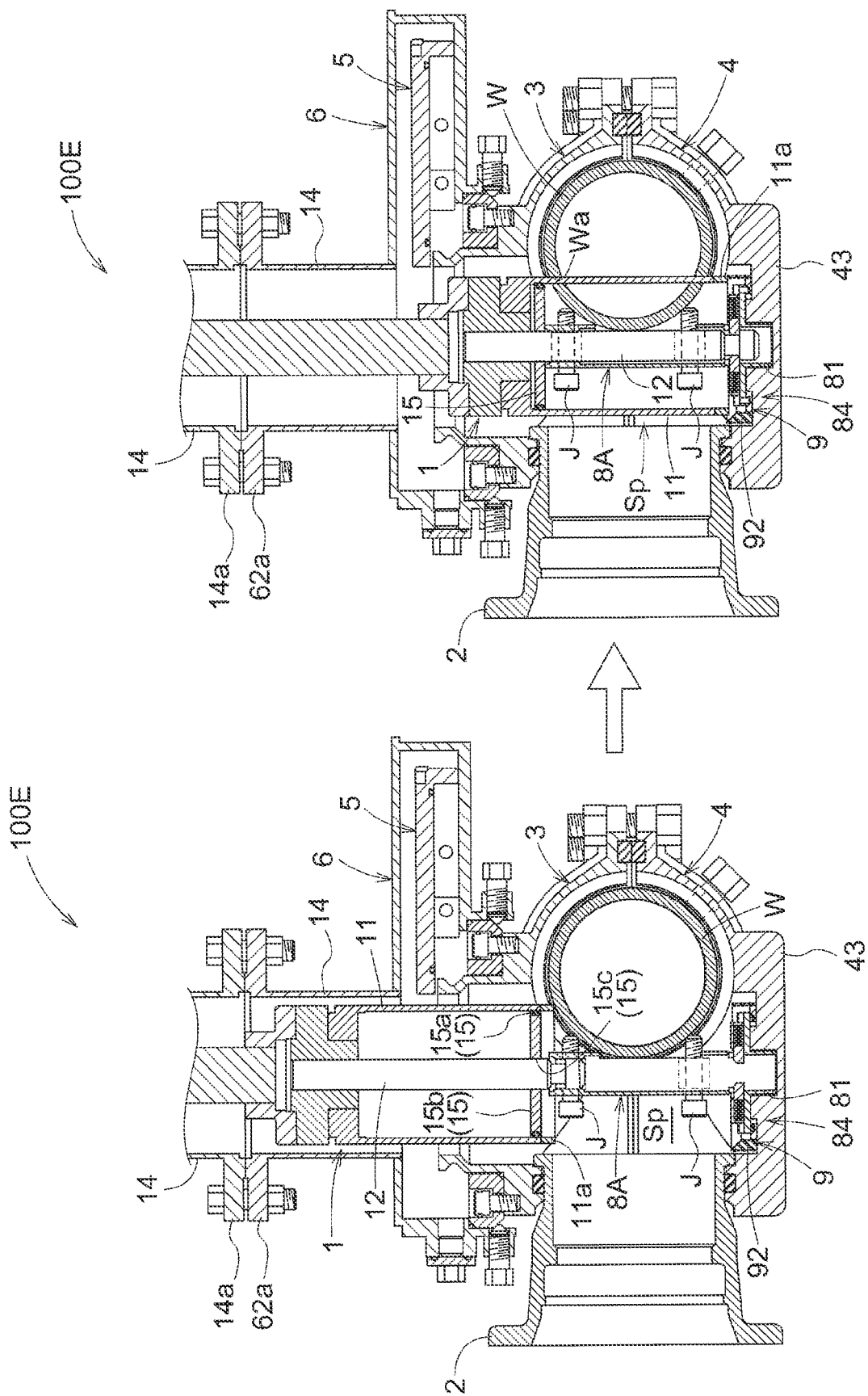
FIG. 29 is a sectional view illustrating a drilling step in the different embodiment 6.
Figure 30:
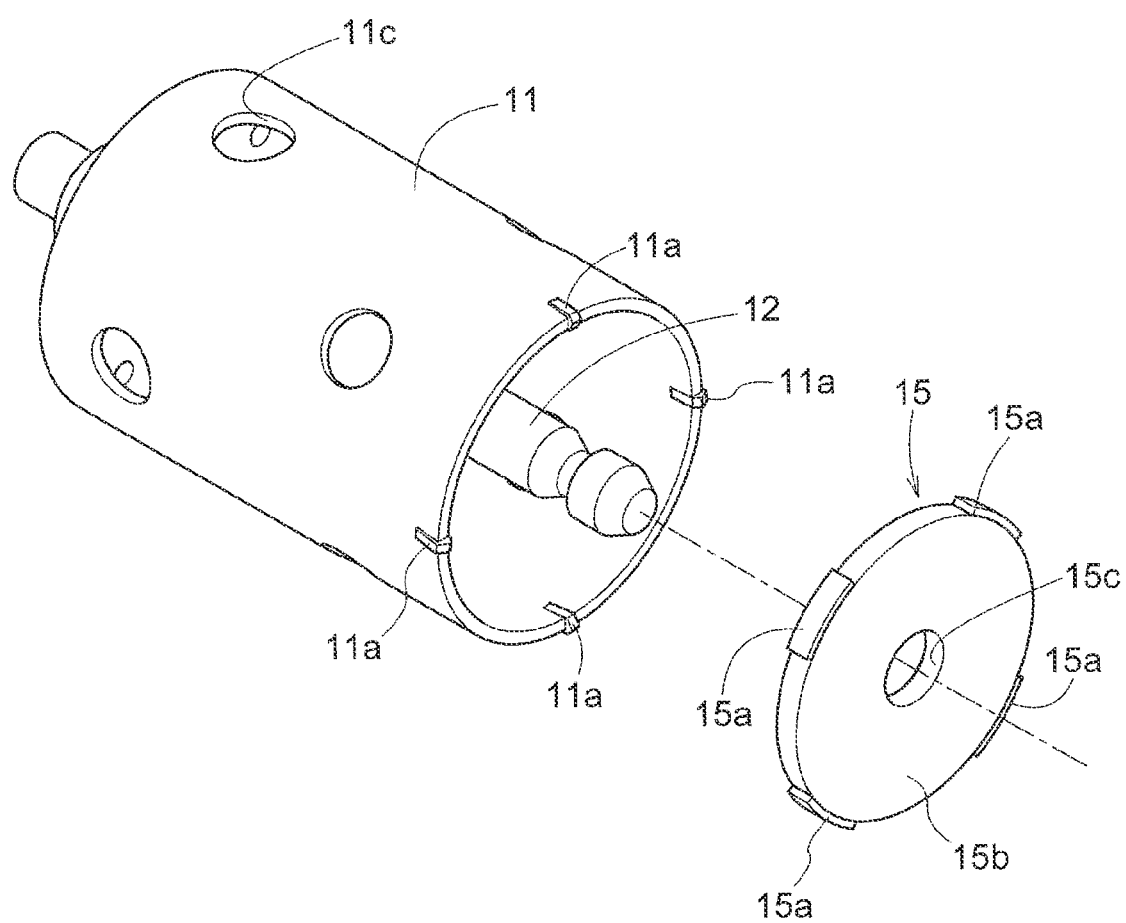
FIG. 30 is a perspective view illustrating a cutter and a damping member in the different embodiment 6.

(11) FIGS. 28 to 30 are diagrams illustrating a branch pipe forming apparatus 100E and a damping member 15 in a different embodiment 6. The hole saw 11 is formed in a cylindrical shape including a cutting tip 11a at a tip thereof as described above. A damping member 15 having a disk shape to absorb vibration is internally inserted into a hole saw 11 in the present embodiment. An elastic member 15a that abuts against the inner circumferential surface of the hole saw 11 is fixed to an outer circumferential end surface of the damping member 15.

As illustrated in FIG. 28, a branch pipe forming apparatus 100E in the present embodiment includes a pair of block parts 83 (four pieces in total) protrudingly formed on both lateral portions along the axial center X of the water pipe W in a circumferential wall part 81A of a guide tube 8A. The block parts 83 abut against each of an upper side in a vertical direction and a lower side in the vertical direction on the outer circumferential surface of the water pipe W (the cut portion Wb), and an axial center holding bolt J to prevent the shaft misalignment of the drilling machine 1 is screwed into each of the block parts 83. A guide protrusion 81Aa to guide along a tapered shape of a tip portion 12a of the center drill 12 is protrudingly formed over a circumferential direction on an inner circumferential surface on the upper side in the vertical direction in the circumferential wall part 81A of the guide tube 8A in the present embodiment.

As illustrated in FIG. 30, the damping member 15 includes a disk-shaped body 15b composed of the same kind of material as the hole saw 11, and a plurality of elastic member 15a (four pieces in the present embodiment) composed of rubber and resin or the like which are fixed to an outer circumferential surface of the disk-shaped body 15b. A through hole 15c is formed at a central portion of the disk-shaped body 15b, and a center drill 12 that does not have a cutting function is inserted into the through hole 15c, so that the damping member 15 is internally inserted into the hole saw 11. The disk-shaped body 15b is supported by the center drill 12 that does not have the cutter function, so that the damping member 15 is not subjected to misalignment due to vibration. The plurality of elastic members 15a are split into a plurality of elements so as not to overlap with the cutting tip 11a in a rotation axis direction view of the hole saw 11. This makes it possible to prevent the elastic member 15a from being damaged due to contact with the cutting tip 11a when the damping member 15 is internally inserted into the hole saw 11. Thus, because the elastic member 15a that abuts against the inner circumferential surface of the hole saw 11 is fixed to an outer circumferential end surface of the damping member 15 internally inserted into the hole saw 11, the elastic member 15a absorbs vibration of the hole saw 11. Additionally, a plurality of fluid passage holes 11c that permit passage of a fluid gushes out during drilling are formed penetratingly in the hole saw 11 in a staggered arrangement. The elastic member 15a may be disposed on the entire outer circumference of the disk-shaped body 15b, or the elastic member may be disposed between the through hole 15c and the center drill 12. Alternatively, a plurality of lightening holes may be disposed in the disk-shaped body 15b. Each of the cutting tips 11a in the hole saw 11 may have a shape partially projecting as illustrated in FIG. 30, or a shape that is inclined along a circumferential direction and has a pointed cutting portion.

As illustrated in FIG. 29, the drilled hole formation step in the drilling step includes forming a drilled hole Wa at a position adjacent to the cutter accommodation space Sp formed between the first split member 3 and the second split member 4 by moving the hole saw 11 of the drilling machine 1 to the cutter accommodation space Sp. At this time, a central portion (a circumferential edge portion of the through hole 15c) of the damping member 15 internally inserted into the hole saw 11 abuts against the upper end of the guide tube 8A, and the damping member 15 moves up in the interior of the hole saw 11 as the hole saw 11 moved in a downward direction. Because the elastic member 15a that abuts against the inner circumferential surface of the hole saw 11 is fixed to the outer circumferential end surface of the damping member 15 in the present embodiment, the elastic member 15a smoothly moves up while slidingly along the inner circumferential surface of the hole saw 11. Owing to the elastic member 15a, the disk-shaped body 15b of the damping member 15 does not amplify vibration of the hole saw 11, thereby preventing the vibration of the hole saw 11. Further, because the central portion of the disk-shaped body 15b abuts against the upper end of the guide tube 8A, a movement attitude of the damping member 15 can be stabilized to surely prevent the vibration of the hole saw 11. Consequently, the drilling operation can be carried out quickly and smoothly. Although the disk-shaped body 15b is set inside the hole saw 11 as illustrated in FIG. 28, it may be set at an upper end of the guide tube 8A. That is, the disk-shaped body 15b needs only to be located inside the hole saw 11 when the water pipe W is drilled by the hole saw 11.

FIGS. 31 to 35 are diagrams illustrating a branch pipe forming apparatus 100F and an anticorrosive member 93 in a different embodiment 7. The branch pipe forming apparatus 100F in the present embodiment further includes a fitting tool 46 for fitting the anticorrosive member 93 to the drilled hole Wa. The fitting tool 46 includes a telescopic mechanism 46A which can push the anticorrosive member 93 in the drilled hole Wa from an axial center Y direction of the branch pipe 2, and which is disengageable from the anticorrosive member 93, and a tool case 46B which is connected to the valve casing 6 and accommodates the telescopic mechanism 46A in sealed state.

The telescopic mechanism 46A includes a control rod 46a with a male screw formed on an outer periphery thereof, a pair of movable blocks 46b vertically movable by being screwed into the control rod 46a, a link member 46c whose one end is fixed to the movable block 46b so as to expand or contract by moving down or up of the upper movable block 46b, and so as to expand or contract by moving up or down of the lower movable block 46b, a cylindrical holding member 46d to hold the anticorrosive member 93, and a pair of abutting blocks 46e abuttable against the end flange 2A of the branch pipe 2. The pair of holding members 46d and the pair of abutting blocks 46e are fixed to the other end of the link member 46c so as to move in conjunction with expansion and contraction of the link member 46c.

Figure 34:
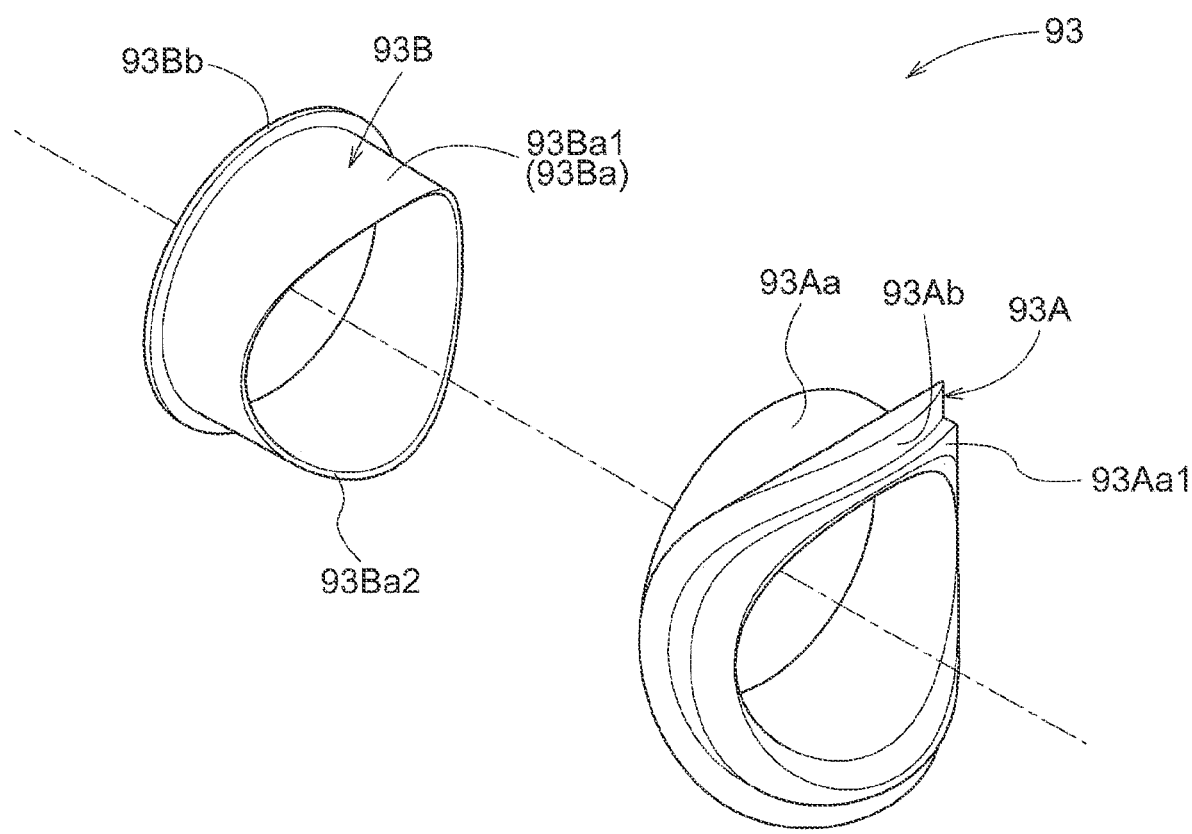
FIG. 34 is an exploded perspective view illustrating the anticorrosive member in the different embodiment 7.

As illustrated in FIG. 34, the anticorrosive member 93 includes an annular anticorrosive seal 93A having an end surface along the shape of the drilled hole Wa, and an expansion member 93B to expand the annular anticorrosive seal 93A by a tapered surface 93Ba1 that abuts against an inner circumferential surface of the annular anticorrosive seal 93A. The annular anticorrosive seal 93A includes a cylindrical portion 93Aa which is configured with an elastically deformable member, such as rubber, which expands by the expansion member 93B, and which has, at a tip thereof, a close contact portion 93Aa1 brought into close contact with the inner circumferential surface of the drilled hole Wa, and a sealing portion 93Ab which projects outward from the cylindrical portion 93Aa in an annular shape, and which seals the drilled hole Wa by abutting thereagainst. The expansion member 93B includes an annular base portion 93Bb against which the flange 46d1 of the holding member 46d abuts, and a projecting tube part 93Ba which is inserted along the inner circumferential surface of the cylindrical portion 93Aa and projects from the annular base portion 93Bb. A tapered surface 93Ba1 that further expands as being inserted along the inner circumferential surface of the cylindrical portion 93Aa is formed over the entire circumstance of the projecting tube part 93Ba, and a tip portion 93Ba2 has an arch shape in a side view along the shape of the drilled hole Wa and the shape of the close contact portion 93Aa1. Thus, if the anticorrosive member 93 includes the expansion member 93B to expand the annular anticorrosive seal 93A, the annular anticorrosive seal 93A can be surely in close contact with the drilled hole Wa.

Figure 35:
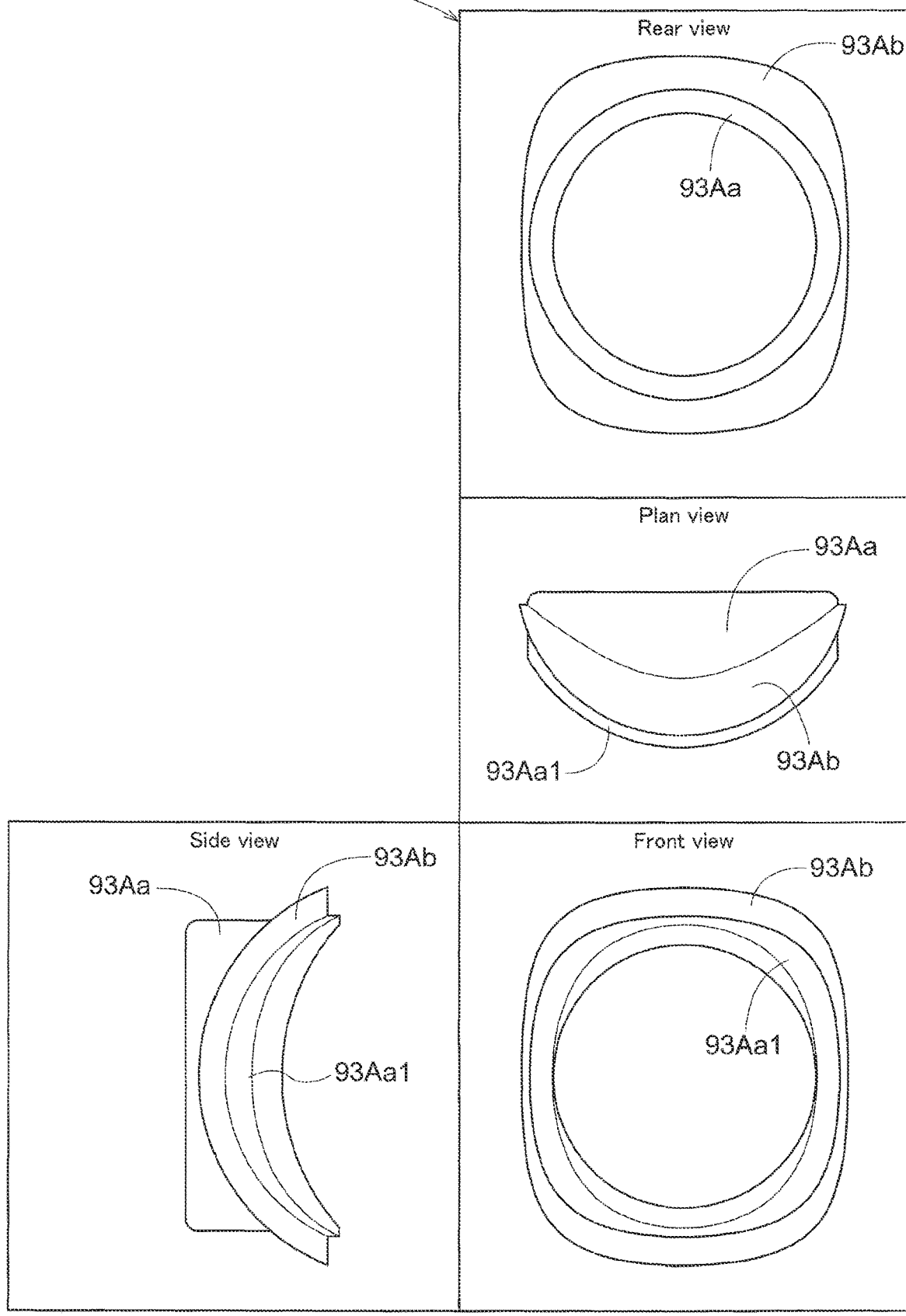
FIG. 35 is a diagram illustrating an annular anticorrosion seal in the different embodiment 7.

As illustrated in a front view in FIG. 35, a tapered surface whose thickness decreases toward a tip thereof is formed on the inner circumferential surface of the close contact portion 93Aa1 of the annular anticorrosive seal 93A. Owing to the tapered surface, the close contact portion 93Aa1 has a shape along the inner circumferential surface of the water pipe W when the close contact portion 93Aa1 is in close contact with the drilled hole Wa, thereby reducing flow path resistance (refer to FIG. 33). Further, as illustrated in a rear view in FIG. 35, the inner circumferential surface of the cylindrical portion 93Aa of the annular anticorrosive seal 93A is not inclined, but is formed parallel to the axial center Y of the branch pipe 2 so as to become an inner circumstance circle in the rear view. Therefore, upon insertion of the expansion member 93B into the cylindrical portion 93Aa, the cylindrical portion 93Aa is equally expanded along the tapered surface 93Ba1 of the expansion member 93B. Further, as illustrated in a plan view and a side view in FIG. 35, the annular anticorrosive seal 93A is formed in a circular arch shape so that the close contact portion 93Aa1 and the sealing portion 93Ab become a convex in a plan view and a concave in a side view. Thus, the close contact portion 93Aa1 and the sealing portion 93Ab have a shape along the shape of the drilled hole Wa, thereby achieving sure corrosion prevention.

Figure 31:
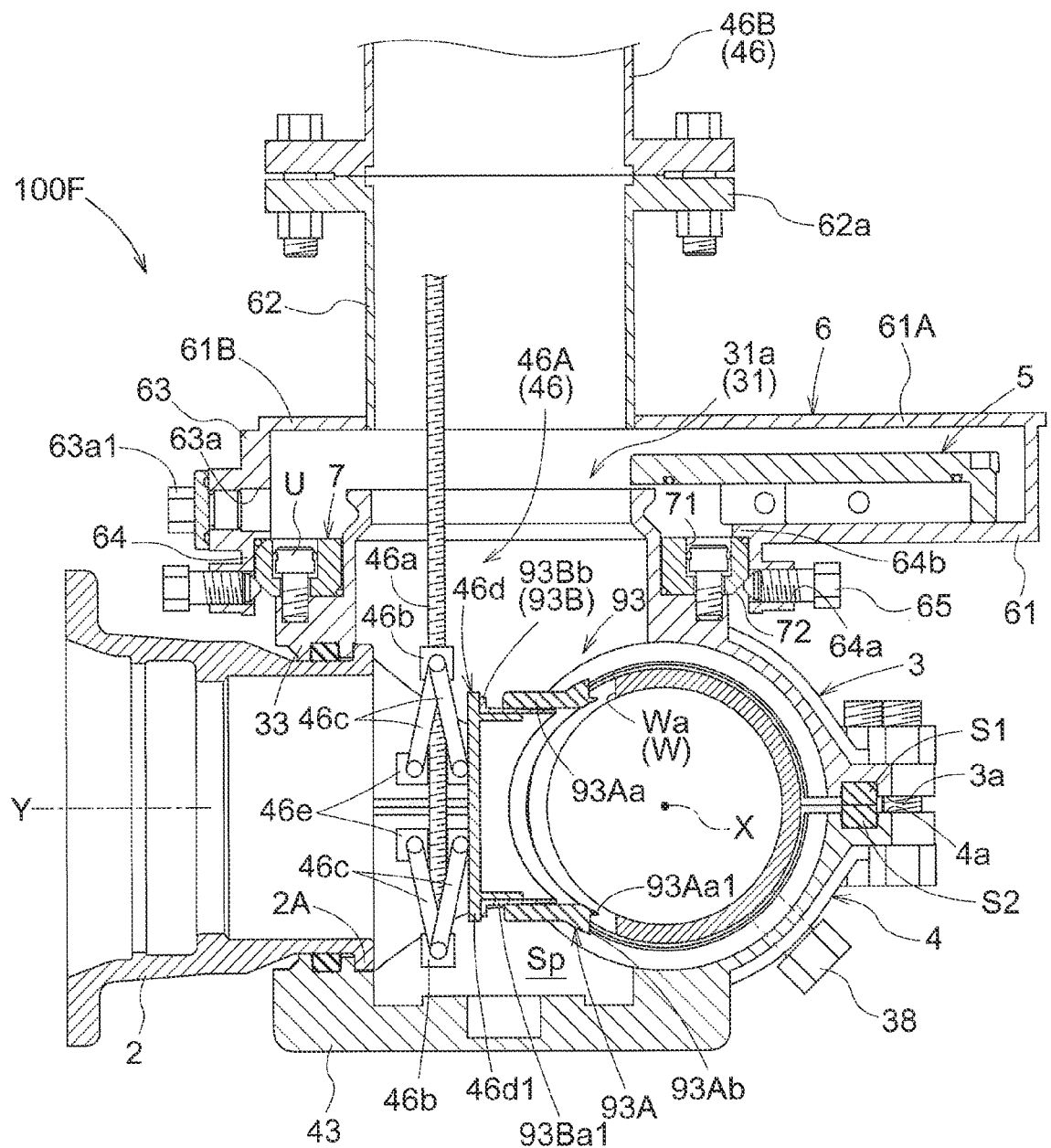
FIG. 31 is a sectional view illustrating a state before an anticorrosive member is fitted in a drilled hole by using a branch pipe forming apparatus in a different embodiment 7.
Figure 32:
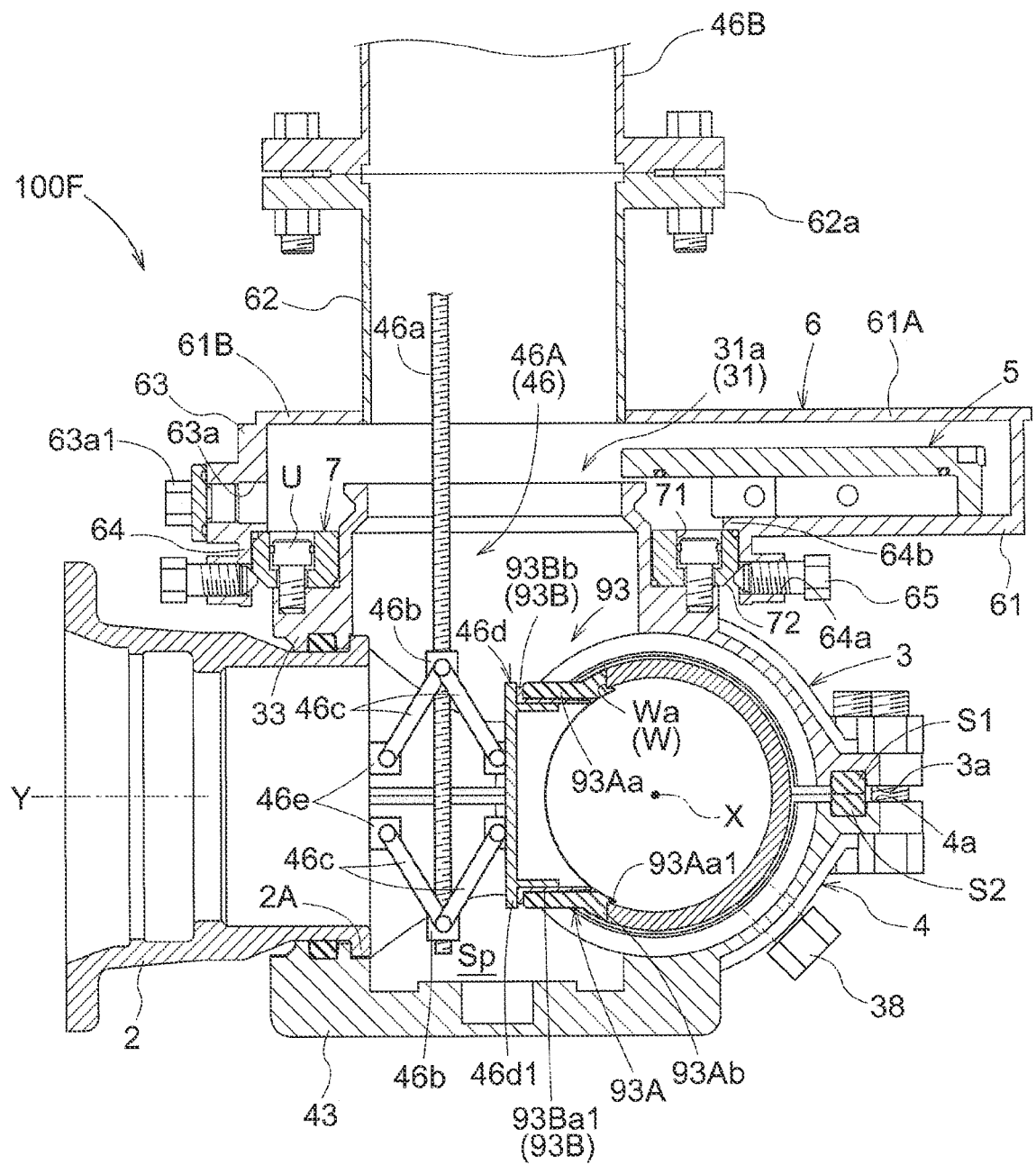
FIG. 32 is a sectional view illustrating a state where the anticorrosive member is attaching to a drilled hole by using the branch pipe forming apparatus in the different embodiment 7.
Figure 33:
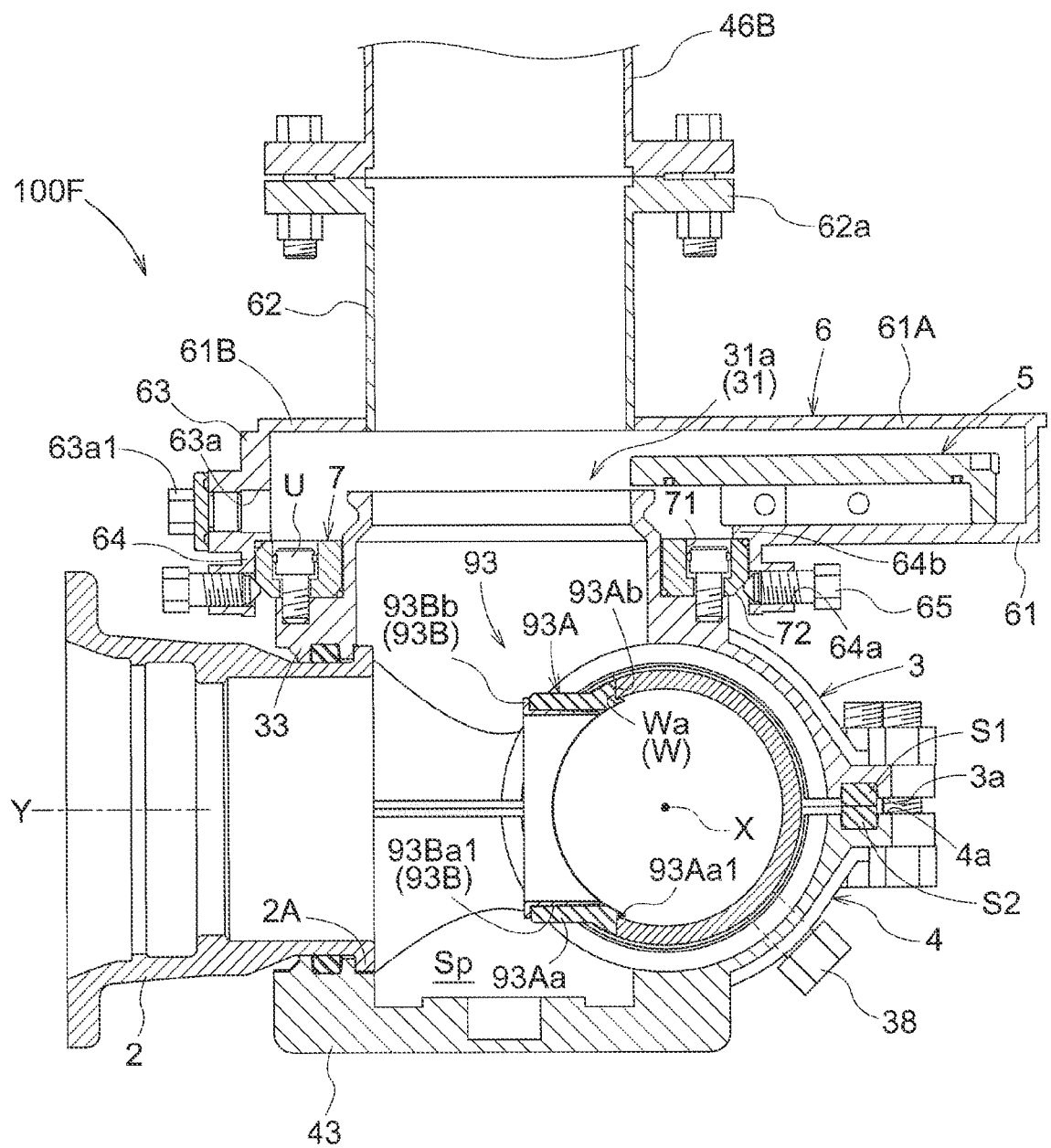
FIG. 33 is a sectional view illustrating a state where the anticorrosive member is already fitted in a drilled hole by using the branch pipe forming apparatus in the different embodiment 7.

Anticorrosive member fitting step of fitting the anticorrosive member 93 in the drilled hole Wa by the fitting tool 46 is carried out by removing the drilling machine 1 after the valve closing step in the foregoing branch pipe formation method. The valve closing step and the lid fixing step are carried out again after removing the fitting tool 46. As illustrated in FIG. 31, the fitting tool 46 is set so that the anticorrosive member 93 is opposite to the drilled hole Wa formed in the drilling step. Subsequently, as illustrated in FIG. 32, by a rotation operation of the control rod 46a, the upper movable block 46b moves down and the lower movable block 46b moves up. The expansion of the link member 46c causes the anticorrosive member 93 to move through the holding member 46d toward the drilled hole Wa, and causes the pair of abutting blocks 46e to abut against the end flange 2A of the branch pipe 2. Then, by the rotation operation of the control rod 46a in a state where the pair of abutting blocks 46e abut against the end flange 2A of the branch pipe 2, as illustrated in FIG. 33, the cylindrical portion 93Aa of the anticorrosive member 93 expands equally along the tapered surface 93Ba1 of the expansion member 93B, and the cylindrical portion 93Aa abuts against the annular base portion 93Bb of the expansion member 93B, so that the close contact portion 93Aa1 and the sealing portion 93Ab are in close contact with the drilled hole Wa and fixed thereto. Next, the fitting tool 46 is moved away from the anticorrosive member 93 configured with the annular anticorrosive seal 93A and the expansion member 93B, and the fitting tool 46 is removed.

Owing to the telescopic mechanism 46A included in the fitting tool 46 for fitting the anticorrosive member 93 to the drilled hole Wa as in the present embodiment, the coupling openings 33 and 43 (the end flange 2A of the branch pipe 2) opposite to the drilled hole Wa are useful to push the anticorrosive member 93 in the drilled hole Wa from the axial center Y direction of the branch pipe 2. It is therefore possible to surely fit the anticorrosive member 93. Additionally, the fitting tool 46 does not obstruct the flow path of the branch pipe 2 by using the telescopic mechanism 46A to move away and remove the fitting tool 46 from the anticorrosive member 93.

Figure 36:
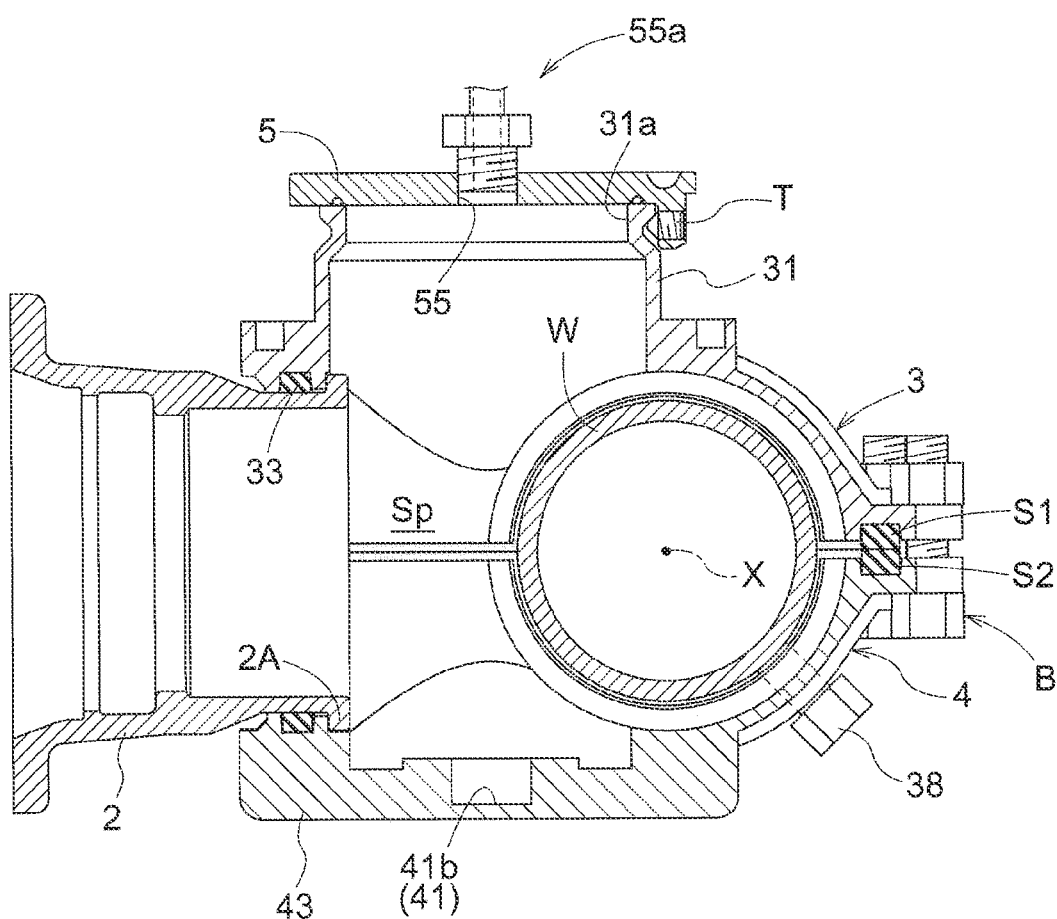
FIG. 36 is a sectional view illustrating a sealing test step in a different embodiment 8.
Figure 37:
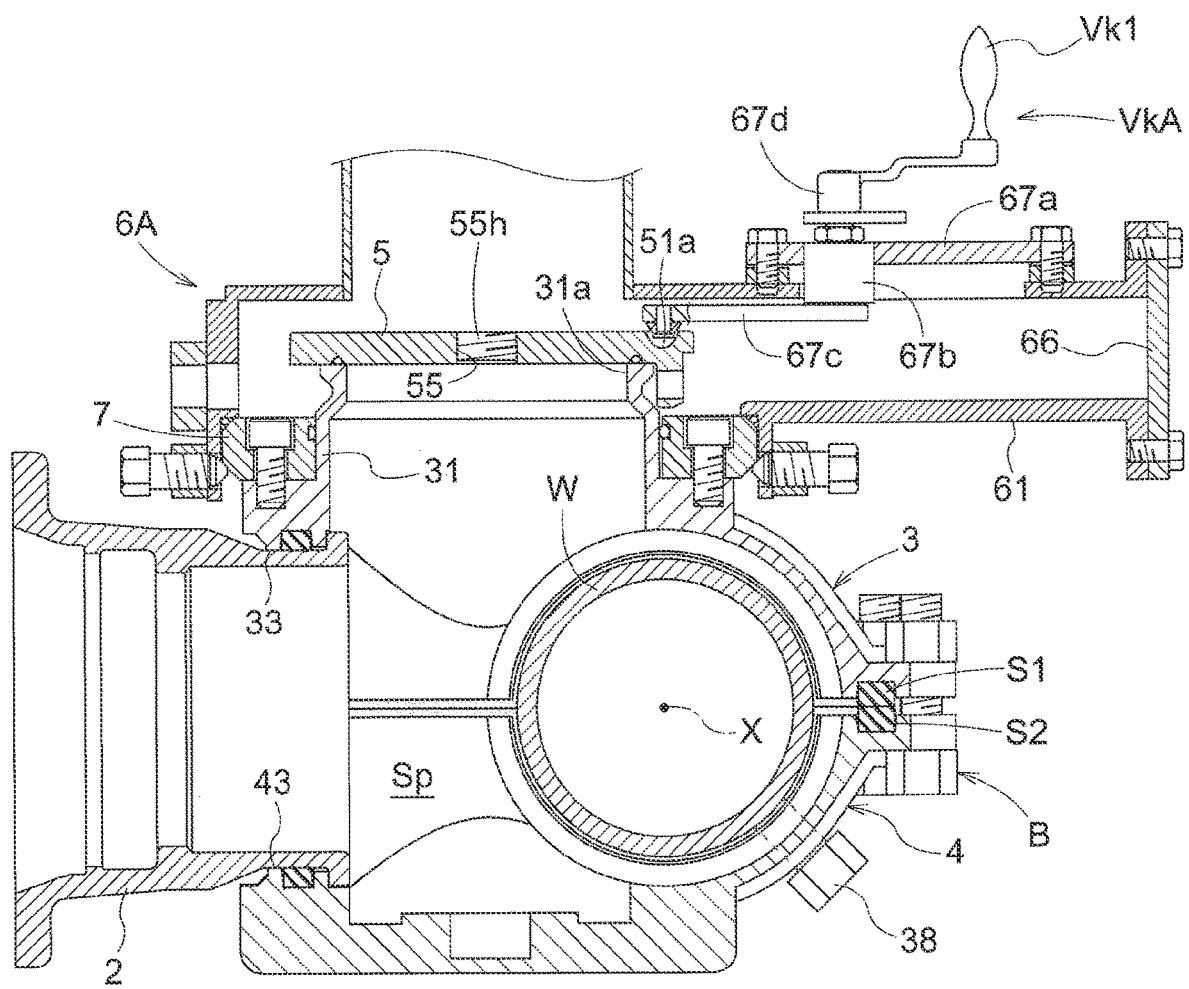
FIG. 37 is a sectional diagram illustrating a valve casing fitting step in a different embodiment 8.
Figure 38:
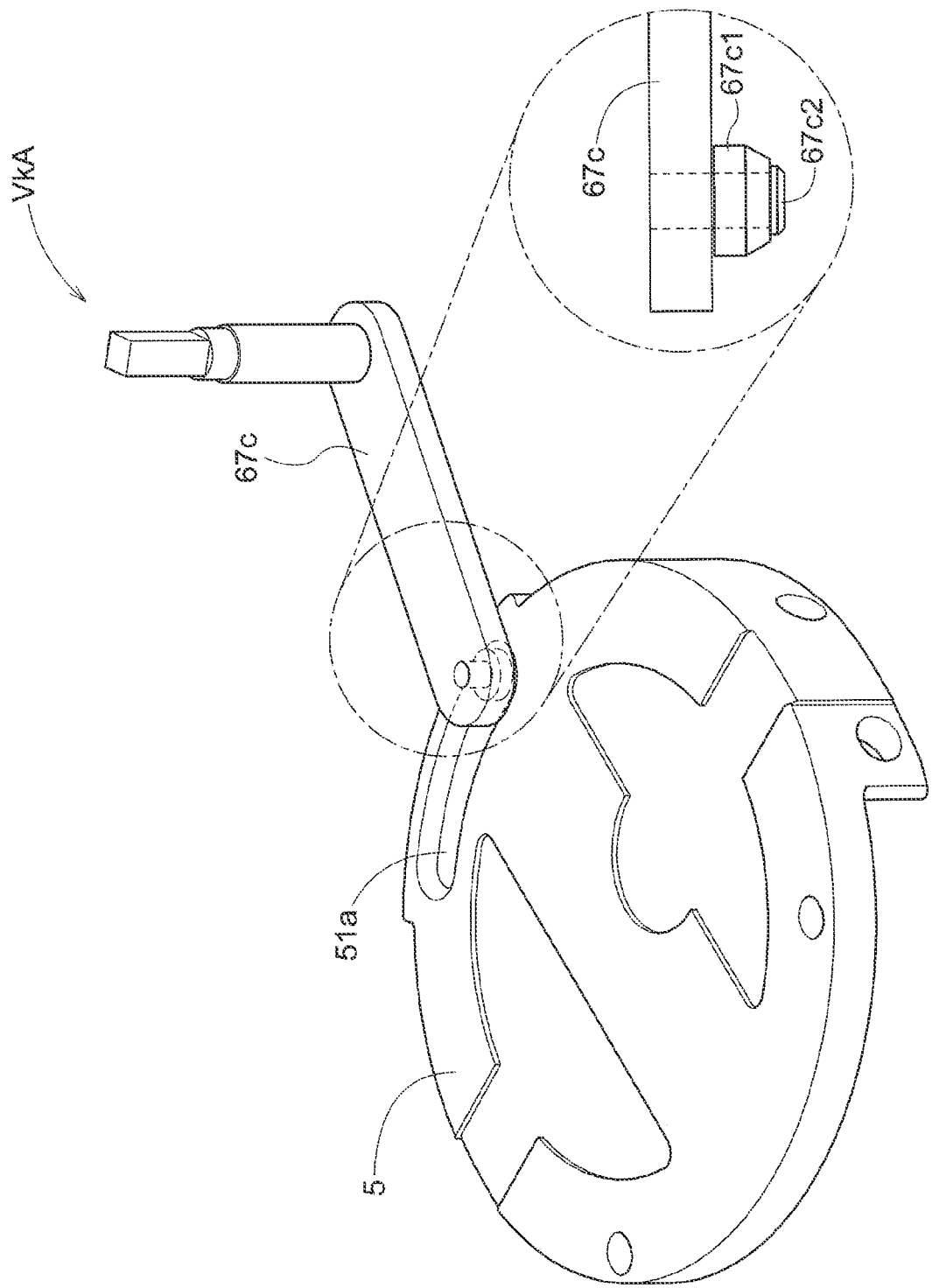
FIG. 38 is an enlarged perspective view illustrating a valve operation member in the different embodiment 8.

(13) FIGS. 36 and 37 are diagrams illustrating a sealing test step and a valve casing fitting step in a different embodiment 8. FIG. 38 also illustrates an end portion of a valve operation member VkA in the different embodiment 8. A branch pipe formation method in the present embodiment includes: the split member arrangement step and the split member connection step described above; the sealing test step of conducting a sealing test by fixing the lid member 5 to the tube part 31 of the first split member 3 with the abutting bolt T, and by supplying water (an example of fluid) to the interior of the first split member 3 and the second split member 4 (refer to FIG. 36); the valve casing fitting step of fitting the valve casing 6A by removing the abutting bolt T after discharging the water supplied in the sealing test step (refer to FIG. 37); the drilling machine fitting step and the branched flow path closing step as described above; and a drilled hole formation step described above, after forming the opening portion 31a (opening) of the tube part 31 by moving the lid member 5.

As illustrated in FIG. 36, in the sealing test step, the lid member 5 serving as the valve element and the closing lid is used as a sealing test by plugging the end portion of the branch pipe 2 (not illustrated), and by carrying out water injection and air release from the opening 31a, and the lid member 5 is previously fixed to the tube part 31 of the first split member 3. Subsequently, a water pressure coupler 55a is fitted in a water pressure hose connection port 55 of the lid member 5, and a sealed state of the first split member 3 and the second split member 4 and a sealed state of the lid member 5 are checked by loading a water pressure by the water pressure coupler 55a. After checking the sealed states, the water pressure coupler 55a is removed, and the water pressure hose connection port 55 is closed by a sunk head plug 55h. This makes it possible to conduct the sealing test before fitting the drilling machine 1 and the like. Alternatively, the water pressure hose connection port 55 may be omitted, and the water pressure may be loaded from the coupling openings 33 and 43 through the branch pipe 2.

Then, as illustrated in FIG. 37, the water in the interior of the first split member 3 and the second split member 4 is discharged from the coupling openings 33 and 43, and the abutting bolt T is removed from the lid member 5. After carrying out the attachment fitting step described above, the valve casing 6A is fitted on the attachment 7. This makes it possible to cause the lid member 5 to serve as the valve element and the closing lid, and the drilling step, the valve closing step, the lid fixing step, the valve casing removal step and the side wall piece fitting step are carried out. Thus, after the sealing test is carried out by fixing the lid member 5 to the first split member 3 with the abutting bolt T, the valve casing 6A is fitted by removing the abutting bolt T, and the lid member 5 is therefore also servable for the sealing test. Because the drilled hole Wa is formed by moving the hole saw 11 of the drilling machine 1 through the opening formed by moving the lid member 5, high operating efficiency is attainable. Additionally, there is no possibility of forgetting to set the lid member 5 into the valve casing 6A.

The valve casing 6A in the present embodiment includes a valve casing body 61 to accommodate the lid member 5 therein, a valve operation member VkA detachably connected to the valve casing body 61, and a closing plate 66 detachably connected to the valve casing body 61 on further outer side than the valve operation member VkA. As illustrated in FIGS. 37 and 38, the valve operation member VkA includes a plate member 67a fixed to the valve casing body 61 with a bolt, an operation tool attachment/detachment hole 67b with a through hole formed in the plate member 67a, a turning member 67c whose end portion is turned from one end of the long groove 51a to the other end, and an operation part 67d engaged with the turning member 67c to perform a turning operation. A rotation member 67c1 rotatable relative to a shaft 67c2 is fitted in an end portion of the turning member 67 in the present embodiment. A basal end side of the rotation member 67c1 has a columnar shape and a tip side thereof has a tapered circular truncated cone. Owing to the circular truncated cone, the turning member 67c is capable of moving the lid member 5 while the rotation member 67c1 smoothly rotating relative to the long groove 51a so as to reduce sliding resistance.

The valve casing 6A in the present embodiment includes the valve casing body 61, the valve operation member VkA and the closing plate 66 which individually have the split structure, it is therefore easy to ensure that the valve operation member VkA is engaged with the lid member 5 after the sealing test is conducted using the lid member 5 servable as the valve element and the closing lid.

(14) FIG. 39 is a diagram illustrating a lid replacement step in a different embodiment 9. If water cut-off performance of the lid member 5 is poor due to the valve closing step and the lid fixing step after the drilling step, it is necessary to replace the lid member 5. Therefore, a branch pipe formation method in the present embodiment further includes the lid replacement step using a flow path closing tool 75. In the lid replacement step, the lid member 5 is opened to cause a water stop seal 75a of the flow path closing tool 75 to be expanded due to compression deformation and fluid pressure or the like, so that an inner circumferential surface of the tube part 31 of the first split member 3 comes into close contact therewith. Subsequently, the closing plate 66, the valve operation member VkA and the lid member 5 described above are removed in this order. A new lid member 5 is prepared, and the lid member 5, the valve operation member VkA and the closing plate 66 are fitted therein in this order, and the water stop seal 75a of the flow path closing tool 75 is shrunk and moved up. Thereafter, water cut-off performance of the new lid member 5 is checked by the valve closing step and the lid fixing step. Because the closing plate 66 is detachably connected to the valve casing body 61 in the present embodiment, quick replacement is attainable even if there is a problem in the lid member 5.

(15) The configures disclosed in the foregoing embodiments can be combined partially or entirely.

INDUSTRIAL APPLICABILITY

The present invention is applicable to a branch pipe forming apparatus fitted on an existing pipe in order to form a branch pipe communicating with a drilled hole formed by drilling a part of an outer circumferential surface of the existing pipe in an uninterrupted flow state by using a drilling machine, a lid doubling as a valve element, a branch pipe forming apparatus including a lid doubling as a valve element, and a branch pipe formation method.

REFERENCE SIGNS LIST

1 drilling machine
2 branch pipe
2A end flange (end portion)
3 first split member
3*a* first split surface (split surface)
4 second split member
4*a* second split surface (split surface)
5 lid member (lid doubling as valve element)
6 valve casing
6A valve casing
7 attachment
8 guide tube
9 flat plate member
11 hole saw (cutter)
11*a* cutting tip
12 center drill
12*a*1 annular recess
15 damping member
15*a* elastic member
31 tube part (pipeline)
31*a* opening portion
31*a*1 annular recess (end outer circumferential surface)
31*c* columnar portion
31*c*2 seating surface
33 first coupling opening (coupling opening)
41 bottom part
41*a* accommodating recess
41*b* engaging recess
43 second coupling opening (coupling opening)
46 fitting tool
46A telescopic mechanism
51 bottom wall
51*a* long groove (engaging part)
51*b* through hole
52 side wall
52*a* screw hole
53 side wall piece
61 valve casing body
66 closing plate
82 protrusion
84*a* engaging member
84*a*1 tapered surface
84*b* compressive coil spring (urging member)
92 annular protrusion
93 anticorrosive member
93A annular anticorrosive seal
93B expansion member
93B*a*1 tapered surface
100 branch pipe forming apparatus
B fastening member
J axial center holding bolt (bolt)
K fixing bolt
Sp cutter accommodation space
T abutting bolt
V gate valve
Vk valve operation member
VkA valve operation member
W water pipe (existing pipe)
Wa drilled hole
X axial center
Y axial center
Z axial center

The invention claimed is:

1. A branch pipe forming apparatus configured to be fitted on an existing pipe through which a fluid flows, in order to form a branch pipe communicating with a drilled hole formed by drilling a part of an outer circumferential surface of the existing pipe, the branch pipe forming apparatus comprising:
a first split member and a second split member which comprise split surfaces along a plane including an axial center of the existing pipe and an axial center of the branch pipe and which are connected to each other in a sealed state by a fastening member; and
a tubular guide tube to guide a center drill of a drilling machine internally inserted into the guide tube,
wherein the first split member comprises a tube part with an opening to permit passage of a cutter of the drilling machine,
a cutter accommodation space is formed between the first split member and the second split member, the cutter accommodation space capable of accommodating the cutter at a position adjacent to the drilled hole formed along a direction perpendicular to the plane,
an axial center of the tube part is located between a portion of the branch pipe which portion is in the cutter accommodation space and the outer circumferential surface of the existing pipe in the cutter accommodation space,
the first split member and the second split member are coupled to each other at respective coupling portions with respective coupling openings opposite to each other across the drilled hole and the cutter accommodation space and holding therebetween an end portion of the branch pipe in a sealed state, and
a bolt configured to abut against a lower side in a vertical direction on the outer circumferential surface of the existing pipe, to prevent axis misalignment of the drilling machine, is screwed in the guide tube.

2. The branch pipe forming apparatus according to claim 1, wherein the cutter having a smaller diameter than an outer diameter of the existing pipe is accommodated in the cutter accommodation space.

3. The branch pipe forming apparatus according to claim 1 wherein
the guide tube, before guiding the center drill, has an end portion toward the opening of the tube part and located between the split surfaces and the opening.

4. The branch pipe forming apparatus according to claim 1, wherein
an axial center of the guide tube is perpendicular to the split surfaces.

5. A branch pipe formation method using the branch pipe forming apparatus according to claim 1, the method comprising:

arranging the first split member and the second split member on the existing pipe;

holding an end portion of the branch pipe between the first split member and the second split member and connecting the first split member and the second split member to each other in a sealed state by the fastening member;

fitting the drilling machine on the first split member;

closing a gate valve disposed in the branch pipe; and forming the drilled hole at a position adjacent to the cutter accommodation space by moving the cutter to the cutter accommodation space.

\* \* \* \* \*